(12) United States Patent
Sweetser et al.

(10) Patent No.: US 9,176,598 B2
(45) Date of Patent: *Nov. 3, 2015

(54) FREE-SPACE MULTI-DIMENSIONAL ABSOLUTE POINTER WITH IMPROVED PERFORMANCE

(75) Inventors: John Sweetser, San Jose, CA (US); Anders Grunnet-Jepsen, San Jose, CA (US)

(73) Assignee: ThinkOptics, Inc., San Jose, CA (US)

( * ) Notice: Subject to any disclaimer, the term of this patent is extended or adjusted under 35 U.S.C. 154(b) by 1465 days.

This patent is subject to a terminal disclaimer.

(21) Appl. No.: 12/115,251

(22) Filed: May 5, 2008

(65) Prior Publication Data

US 2008/0278445 A1 Nov. 13, 2008

Related U.S. Application Data

(60) Provisional application No. 60/916,730, filed on May 8, 2007.

(51) Int. Cl.
*G06F 3/03* (2006.01)
*G06F 3/0346* (2013.01)

(52) U.S. Cl.
CPC ............ *G06F 3/0325* (2013.01); *G06F 3/0346* (2013.01)

(58) Field of Classification Search
CPC .............................. G06F 3/0325; G06F 3/0346
USPC .......................... 345/156, 157, 158
See application file for complete search history.

(56) References Cited

U.S. PATENT DOCUMENTS

| 4,229,009 A | 10/1980 | Ohta |
| 4,285,523 A | 8/1981 | Lemelson |
| 4,395,045 A | 7/1983 | Baer |
| 4,745,402 A * | 5/1988 | Auerbach ...................... 345/158 |
| 4,813,682 A | 3/1989 | Okada |
| 4,955,812 A | 9/1990 | Hill |

(Continued)

FOREIGN PATENT DOCUMENTS

| CN | 1338961 A | 3/2002 |
| CN | 1559644 A | 1/2005 |

(Continued)

OTHER PUBLICATIONS

Danish Patent and Trademark Office, Novelty Search Dec. 20, 2006, SE2006 05704, 11 pages.

(Continued)

*Primary Examiner* — Towfiq Elahi
(74) *Attorney, Agent, or Firm* — Blakely, Sokoloff, Taylor & Zafman LLP

(57) ABSTRACT

According to one embodiment, a system includes a handheld device having a pixelated sensor, an optical filter for passing a predetermined frequency band of radiation to the sensor and a transmitter, an electronic equipment having a display, and at least two spaced-apart markers, where each of which are positioned proximate to the display. The markers provide radiation at the frequency band passed by the optical filter. The handheld device includes a processor coupled to receive image data of the markers from the sensor for computing coordinate data from the image data. The coordinate data requires less data than the image data. The processor is coupled to the transmitter to transmit the coordinate data to the electronic equipment. Other methods and apparatuses are also described.

19 Claims, 16 Drawing Sheets

Top (a) and side (b) views of the operational regions for a two-marker vision-based tracking system with (shaded) and without (dashed) a beam shaping element operable in the vertical dimension (e.g., a cylindrical lens). The range in the horizontal and over a portion of the vertical dimension is increased, as is the overall size (volume and surface area) of the operational region.

(56) References Cited

U.S. PATENT DOCUMENTS

| | | | |
|---|---|---|---|
| 4,959,721 A | 9/1990 | Micic et al. |
| 4,964,837 A | 10/1990 | Collier |
| 5,009,501 A | 4/1991 | Fenner et al. |
| 5,023,943 A | 6/1991 | Heberle |
| 5,027,132 A | 6/1991 | Manns |
| 5,045,843 A | 9/1991 | Hansen |
| 5,115,230 A | 5/1992 | Smoot |
| 5,130,693 A | 7/1992 | Gigandet |
| 5,170,002 A | 12/1992 | Suzuki et al. |
| 5,181,015 A | 1/1993 | Marshall et al. |
| 5,181,181 A | 1/1993 | Glynn |
| 5,187,540 A | 2/1993 | Morrison |
| 5,227,985 A | 7/1993 | DeMenthon |
| 5,237,617 A | 8/1993 | Miller |
| 5,297,061 A | 3/1994 | Dementhon |
| 5,309,137 A | 5/1994 | Kajiwara |
| 5,317,140 A | 5/1994 | Dunthorn |
| 5,319,387 A | 6/1994 | Yoshikawa |
| 5,353,042 A | 10/1994 | Klapman |
| 5,371,802 A | 12/1994 | McDonald et al. |
| 5,388,059 A | 2/1995 | DeMenthon |
| 5,394,326 A | 2/1995 | Liu |
| 5,396,281 A | 3/1995 | Maeda |
| 5,424,556 A | 6/1995 | Symosek |
| 5,457,478 A | 10/1995 | Frank |
| 5,502,459 A | 3/1996 | Marshall et al. |
| 5,502,568 A | 3/1996 | Ogawa |
| 5,504,501 A | 4/1996 | Hauck et al. |
| 5,506,605 A | 4/1996 | Paley |
| 5,510,811 A | 4/1996 | Tobey |
| 5,510,893 A | 4/1996 | Suzuki |
| 5,515,079 A | 5/1996 | Hauck |
| 5,557,690 A | 9/1996 | O'Gorman |
| 5,574,479 A | 11/1996 | Odell |
| 5,581,372 A | 12/1996 | Kerz |
| 5,594,807 A | 1/1997 | Liu |
| 5,608,528 A | 3/1997 | Ogawa |
| 5,627,565 A | 5/1997 | Morishita |
| 5,694,495 A | 12/1997 | Hara et al. |
| 5,707,237 A | 1/1998 | Takemoto et al. |
| 5,724,106 A | 3/1998 | Autry |
| 5,733,201 A | 3/1998 | Caldwell et al. |
| 5,736,947 A | 4/1998 | Imanaka |
| 5,736,974 A * | 4/1998 | Selker ............... 715/862 |
| 5,736,975 A | 4/1998 | Lunetta |
| 5,754,094 A | 5/1998 | Frushour |
| 5,793,353 A * | 8/1998 | Wu ............... 345/156 |
| 5,793,361 A | 8/1998 | Kahn et al. |
| 5,796,387 A | 8/1998 | Curran et al. |
| 5,805,165 A | 9/1998 | Thorne, III |
| 5,832,139 A | 11/1998 | Batterman |
| 5,835,078 A * | 11/1998 | Arita et al. ............... 345/158 |
| 5,860,648 A | 1/1999 | Petermeier |
| 5,883,569 A | 3/1999 | Kolefas |
| 5,900,863 A | 5/1999 | Numazaki |
| 5,917,472 A | 6/1999 | Perälä |
| 5,926,168 A | 7/1999 | Fan |
| 5,929,444 A | 7/1999 | Leichner |
| 5,953,077 A | 9/1999 | Honey |
| 5,963,145 A | 10/1999 | Escobosa |
| 5,973,618 A | 10/1999 | Ellis |
| 5,973,757 A | 10/1999 | Aubuchon |
| 5,983,161 A | 11/1999 | Lemelson et al. |
| 5,986,644 A | 11/1999 | Herder |
| 5,999,166 A * | 12/1999 | Rangan ............... 345/157 |
| 6,008,800 A | 12/1999 | Pryor |
| 6,008,899 A | 12/1999 | Trebino |
| 6,037,936 A | 3/2000 | Ellenby |
| 6,045,446 A | 4/2000 | Ohshima |
| 6,061,055 A | 5/2000 | Marks |
| 6,061,644 A | 5/2000 | Leis |
| 6,067,079 A | 5/2000 | Shieh |
| 6,091,378 A | 7/2000 | Richardson |
| 6,094,189 A | 7/2000 | Quillen et al. |
| 6,097,374 A | 8/2000 | Howard |
| 6,110,039 A | 8/2000 | Oh |
| 6,115,128 A | 9/2000 | Vann |
| 6,125,190 A | 9/2000 | Wen |
| 6,146,278 A | 11/2000 | Kobayashi |
| 6,184,863 B1 | 2/2001 | Sibert et al. |
| 6,188,388 B1 | 2/2001 | Arita et al. |
| 6,244,956 B1 | 6/2001 | Nakayama |
| 6,251,011 B1 | 6/2001 | Yamazaki |
| 6,252,720 B1 | 6/2001 | Haseltine |
| 6,259,431 B1 | 7/2001 | Futatsugi |
| 6,281,878 B1 | 8/2001 | Montellese |
| 6,287,198 B1 | 9/2001 | McCauley |
| 6,295,051 B1 | 9/2001 | Kanevsky et al. |
| 6,317,784 B1 | 11/2001 | Mackintosh et al. |
| 6,324,255 B1 | 11/2001 | Kondo |
| 6,324,296 B1 | 11/2001 | McSheery |
| 6,331,848 B1 | 12/2001 | Stove et al. |
| 6,373,961 B1 | 4/2002 | Richardson |
| 6,377,242 B1 | 4/2002 | Sweed |
| 6,404,416 B1 | 6/2002 | Kahn et al. |
| 6,429,856 B1 | 8/2002 | Omura |
| 6,445,409 B1 | 9/2002 | Ito |
| 6,456,892 B1 | 9/2002 | Dara-Abrams |
| 6,489,945 B1 | 12/2002 | Gordon |
| 6,515,651 B1 | 2/2003 | Berstis |
| 6,540,607 B2 | 4/2003 | Mokris |
| 6,545,661 B1 | 4/2003 | Goschy |
| 6,559,935 B1 | 5/2003 | Tew |
| 6,600,475 B2 | 7/2003 | Gutta et al. |
| 6,603,880 B2 | 8/2003 | Sakamoto |
| 6,618,076 B1 | 9/2003 | Sukthankar et al. |
| 6,641,269 B2 | 11/2003 | Kitazawa |
| 6,650,822 B1 | 11/2003 | Zhou |
| 6,660,475 B2 | 12/2003 | Jack et al. |
| 6,664,948 B2 | 12/2003 | Crane |
| 6,677,987 B1 | 1/2004 | Girod |
| 6,683,628 B1 | 1/2004 | Nakagawa et al. |
| 6,724,368 B2 | 4/2004 | Strubbe |
| 6,727,885 B1 | 4/2004 | Ishino et al. |
| 6,727,887 B1 * | 4/2004 | Levine et al. ............... 345/158 |
| 6,753,849 B1 | 6/2004 | Curran |
| 6,757,446 B1 | 6/2004 | Li |
| 6,765,555 B2 | 7/2004 | Wu |
| 6,765,608 B1 | 7/2004 | Himeda |
| 6,766,036 B1 | 7/2004 | Pryor |
| 6,766,066 B2 | 7/2004 | Kitazawa |
| 6,791,531 B1 | 9/2004 | Johnston |
| 6,795,068 B1 | 9/2004 | Marks |
| 6,811,489 B1 | 11/2004 | Shimizu |
| 6,844,871 B1 | 1/2005 | Hinckley et al. |
| 6,847,348 B2 * | 1/2005 | Rojewski ............... 345/156 |
| 6,881,147 B2 | 4/2005 | Naghi et al. |
| 6,890,262 B2 | 5/2005 | Oishi |
| 6,900,791 B2 | 5/2005 | Tanaka et al. |
| 6,924,809 B2 | 8/2005 | Chao et al. |
| 6,926,610 B2 | 8/2005 | Kobayashi |
| 6,955,598 B2 | 10/2005 | Hagiwara |
| 6,956,503 B2 | 10/2005 | Yokokohji |
| 6,973,202 B2 | 12/2005 | Mostafavi |
| 6,975,301 B2 | 12/2005 | Fan |
| 6,978,037 B1 | 12/2005 | Fechner et al. |
| 6,982,697 B2 | 1/2006 | Wilson |
| 6,990,639 B2 | 1/2006 | Wilson |
| 7,039,218 B2 | 5/2006 | Lin |
| 7,050,043 B2 | 5/2006 | Huang et al. |
| 7,053,798 B2 | 5/2006 | Popineau |
| 7,053,932 B2 | 5/2006 | Lin et al. |
| 7,061,468 B2 | 6/2006 | Tiphane |
| 7,064,742 B2 | 6/2006 | Navab |
| 7,069,516 B2 | 6/2006 | Rekimoto |
| 7,071,908 B2 | 7/2006 | Guttag |
| 7,091,949 B2 | 8/2006 | Hansen |
| 7,102,616 B1 | 9/2006 | Sleator |
| 7,105,795 B2 | 9/2006 | Cartlidge |
| 7,130,469 B2 | 10/2006 | Adachi |
| 7,133,031 B2 | 11/2006 | Wang |
| 7,136,053 B2 | 11/2006 | Hendriks |
| 7,139,983 B2 | 11/2006 | Kelts |
| 7,158,118 B2 | 1/2007 | Liberty |

(56) References Cited

U.S. PATENT DOCUMENTS

| | | |
|---|---|---|
| 7,158,181 B2 | 1/2007 | Cartlidge |
| 7,161,596 B2 | 1/2007 | Hoile |
| 7,170,492 B2 | 1/2007 | Bell |
| 7,176,905 B2 | 2/2007 | Baharav |
| 7,215,322 B2 | 5/2007 | Genc |
| 7,227,526 B2 | 6/2007 | Hildreth |
| 7,232,986 B2 | 6/2007 | Worthington et al. |
| 7,262,760 B2 | 8/2007 | Liberty |
| 7,268,774 B2 | 9/2007 | Pittel |
| 7,292,151 B2 | 11/2007 | Ferguson |
| 7,414,596 B2 | 8/2008 | Satoh |
| 7,414,611 B2 | 8/2008 | Liberty |
| 7,417,719 B2 | 8/2008 | Michelsson |
| 7,430,303 B2 | 9/2008 | Sefcik |
| 7,440,610 B1 | 10/2008 | Wirtz |
| 7,457,439 B1 | 11/2008 | Madsen |
| 7,542,072 B2 | 6/2009 | DeMenthon |
| 7,609,249 B2 | 10/2009 | Fouquet |
| 7,623,115 B2 | 11/2009 | Marks |
| 7,651,850 B2 | 1/2010 | Meiring |
| 7,665,041 B2 | 2/2010 | Wilson |
| 7,683,881 B2 | 3/2010 | Sun |
| 7,710,391 B2 | 5/2010 | Bell |
| 7,714,843 B1 | 5/2010 | Kong |
| 7,746,321 B2 | 6/2010 | Banning |
| 7,746,377 B2 | 6/2010 | Ito |
| 7,773,076 B2 | 8/2010 | Pittel |
| 7,787,992 B2 | 8/2010 | Pretlove |
| 7,796,116 B2 | 9/2010 | Salsman |
| 7,800,585 B2 | 9/2010 | Gordon |
| 7,852,317 B2 | 12/2010 | Grunnet-Jepsen |
| 7,859,523 B2 | 12/2010 | Kong |
| 7,864,159 B2 * | 1/2011 | Sweetser et al. ............... 345/158 |
| 7,869,618 B2 | 1/2011 | Thelen |
| 7,893,924 B2 | 2/2011 | Lieberman |
| 7,912,286 B2 * | 3/2011 | Ozaki et al. .................. 382/180 |
| 7,927,216 B2 | 4/2011 | Ikeda et al. |
| 7,940,986 B2 | 5/2011 | Mekenkamp |
| 8,095,200 B2 | 1/2012 | Quaid, III |
| 2001/0010514 A1 | 8/2001 | Ishino |
| 2001/0030668 A1 | 10/2001 | Erten |
| 2001/0045940 A1 | 11/2001 | Hansen |
| 2002/0011987 A1 | 1/2002 | Kitazawa |
| 2002/0056136 A1 | 5/2002 | Wistendahl |
| 2002/0078446 A1 | 6/2002 | Dakss et al. |
| 2002/0085097 A1 | 7/2002 | Colmenarez |
| 2002/0098887 A1 | 7/2002 | Himoto |
| 2002/0103617 A1 | 8/2002 | Uchiyama |
| 2002/0107069 A1 | 8/2002 | Ishino |
| 2002/0135565 A1 | 9/2002 | Gordon et al. |
| 2003/0017872 A1 | 1/2003 | Oishi |
| 2003/0048280 A1 | 3/2003 | Russell |
| 2003/0128187 A1 * | 7/2003 | Strubbe ........................ 345/157 |
| 2003/0144056 A1 | 7/2003 | Leifer |
| 2003/0189545 A1 | 10/2003 | Trajkovic et al. |
| 2003/0199324 A1 | 10/2003 | Wang |
| 2003/0216176 A1 | 11/2003 | Shimizu et al. |
| 2004/0004276 A1 | 1/2004 | Hsu et al. |
| 2004/0016939 A1 | 1/2004 | Akiba et al. |
| 2004/0017357 A1 | 1/2004 | Kinoshita et al. |
| 2004/0017473 A1 | 1/2004 | Marks |
| 2004/0046736 A1 | 3/2004 | Pryor |
| 2004/0046744 A1 | 3/2004 | Rafii et al. |
| 2004/0063481 A1 | 4/2004 | Wang |
| 2004/0095317 A1 | 5/2004 | Zhang et al. |
| 2004/0151218 A1 | 8/2004 | Branzoi |
| 2004/0160420 A1 | 8/2004 | Baharav |
| 2004/0169639 A1 | 9/2004 | Pate et al. |
| 2004/0174340 A1 | 9/2004 | Bruneau |
| 2004/0174569 A1 | 9/2004 | Karito |
| 2004/0196451 A1 | 10/2004 | Aoyama |
| 2004/0207597 A1 | 10/2004 | Marks |
| 2004/0222969 A1 | 11/2004 | Buchenrieder |
| 2004/0239670 A1 | 12/2004 | Marks |
| 2004/0246229 A1 | 12/2004 | Yamada |
| 2004/0266528 A1 | 12/2004 | Wang |
| 2004/0268393 A1 | 12/2004 | Hunleth et al. |
| 2005/0026689 A1 | 2/2005 | Marks |
| 2005/0028191 A1 | 2/2005 | Sullivan et al. |
| 2005/0052415 A1 | 3/2005 | Braun |
| 2005/0059488 A1 | 3/2005 | Larsen |
| 2005/0073525 A1 | 4/2005 | Chao et al. |
| 2005/0104632 A1 | 5/2005 | Lettvin |
| 2005/0104849 A1 | 5/2005 | Hoile |
| 2005/0137774 A1 | 6/2005 | Rupp |
| 2005/0168444 A1 | 8/2005 | Lin et al. |
| 2005/0200351 A1 | 9/2005 | Shimizu |
| 2005/0225536 A1 | 10/2005 | Hsieh et al. |
| 2005/0237303 A1 | 10/2005 | Yang |
| 2005/0244034 A1 | 11/2005 | Miyahara |
| 2005/0272502 A1 | 12/2005 | Marks |
| 2006/0007142 A1 | 1/2006 | Wilson et al. |
| 2006/0023111 A1 | 2/2006 | DeMenthon |
| 2006/0028442 A1 | 2/2006 | Bynum et al. |
| 2006/0047472 A1 | 3/2006 | Krumm |
| 2006/0049930 A1 | 3/2006 | Zruya |
| 2006/0082546 A1 | 4/2006 | Wey |
| 2006/0094286 A1 | 5/2006 | Lee et al. |
| 2006/0094428 A1 | 5/2006 | Jou et al. |
| 2006/0105842 A1 | 5/2006 | Kim |
| 2006/0108507 A1 | 5/2006 | Huang |
| 2006/0125932 A1 | 6/2006 | Lu et al. |
| 2006/0148563 A1 | 7/2006 | Yang |
| 2006/0152487 A1 | 7/2006 | Grunnet-Jepsen et al. |
| 2006/0152489 A1 | 7/2006 | Sweetser et al. |
| 2006/0267935 A1 | 11/2006 | Corson |
| 2006/0284841 A1 | 12/2006 | Hong et al. |
| 2007/0002037 A1 | 1/2007 | Kuroki |
| 2007/0060228 A1 | 3/2007 | Akasaka |
| 2007/0066394 A1 | 3/2007 | Ikeda et al. |
| 2007/0089915 A1 | 4/2007 | Ogawa |
| 2007/0124694 A1 | 5/2007 | Van De Sluis et al. |
| 2007/0155502 A1 | 7/2007 | Wu |
| 2007/0176908 A1 | 8/2007 | Lipman |
| 2007/0188447 A1 | 8/2007 | Wu |
| 2007/0211027 A1 | 9/2007 | Ohta |
| 2007/0298882 A1 | 12/2007 | Marks |
| 2008/0094354 A1 | 4/2008 | Thelen |
| 2008/0100574 A1 * | 5/2008 | Lou et al. ...................... 345/163 |
| 2008/0174550 A1 | 7/2008 | Laurila |
| 2008/0188959 A1 | 8/2008 | Kneissler |
| 2008/0204404 A1 | 8/2008 | Kneissler et al. |
| 2009/0085869 A1 | 4/2009 | Destura et al. |
| 2009/0128815 A1 | 5/2009 | Draaijer et al. |
| 2009/0295595 A1 | 12/2009 | Thelen et al. |
| 2009/0300535 A1 | 12/2009 | Skourup |
| 2010/0073289 A1 | 3/2010 | Kneissler |

FOREIGN PATENT DOCUMENTS

| | | |
|---|---|---|
| DE | 3930581 A1 | 3/1991 |
| DE | 19701374 A1 | 7/1997 |
| DE | 19648487 C1 | 6/1998 |
| DE | 19814254 A1 | 10/1998 |
| DE | 19937307 A1 | 2/2000 |
| DE | 10029173 A1 | 1/2002 |
| DE | 10241392 A1 | 5/2003 |
| DE | 10219198 A1 | 11/2003 |
| EP | 0728503 A1 | 8/1996 |
| EP | 0 852 961 A1 | 7/1998 |
| EP | 0 993 845 A2 | 4/2000 |
| EP | 1 062 994 A3 | 12/2000 |
| EP | 1 081 635 | 3/2001 |
| EP | 1081635 | 3/2001 |
| EP | 1279425 A2 | 1/2003 |
| EP | 1 293 237 A2 | 3/2003 |
| EP | 1 450 243 A2 | 8/2004 |
| GB | 1524334 | 9/1978 |
| GB | 2 244 546 A | 12/1991 |
| GB | 2 284 478 A | 6/1995 |
| GB | 2 307 133 A | 5/1997 |
| GB | 2 316 482 A | 2/1998 |
| GB | 2319374 A | 5/1998 |
| GB | 2381686 | 5/2003 |

(56) References Cited

FOREIGN PATENT DOCUMENTS

| | | |
|---|---|---|
| JP | 60-77231 | 5/1985 |
| JP | 62-14527 | 1/1987 |
| JP | 03-074434 | 7/1991 |
| JP | 03-059619 | 9/1991 |
| JP | 05-056191 | 5/1993 |
| JP | 06-050758 | 2/1994 |
| JP | 06-154422 | 6/1994 |
| JP | 06-190144 | 7/1994 |
| JP | 3000028 | 7/1994 |
| JP | 06-273058 | 9/1994 |
| JP | 06-308879 A | 11/1994 |
| JP | 07-028591 | 1/1995 |
| JP | 07-044315 | 2/1995 |
| JP | 07-107573 | 4/1995 |
| JP | 07-115690 | 5/1995 |
| JP | 07121293 | 5/1995 |
| JP | 07-146123 | 6/1995 |
| JP | 07-200142 | 8/1995 |
| JP | H7-230354 | 8/1995 |
| JP | 07-262797 | 10/1995 |
| JP | 07-302148 A | 11/1995 |
| JP | 07-318332 | 12/1995 |
| JP | 08-071252 A | 3/1996 |
| JP | 08-095704 | 4/1996 |
| JP | 08-106352 | 4/1996 |
| JP | 08-111144 | 4/1996 |
| JP | 08-114415 | 5/1996 |
| JP | 08-122070 | 5/1996 |
| JP | 08-152959 | 6/1996 |
| JP | 08-211993 | 8/1996 |
| JP | 08-292998 | 11/1996 |
| JP | 08-305355 | 11/1996 |
| JP | 08-335136 | 12/1996 |
| JP | 09-166417 A | 6/1997 |
| JP | 09-230997 | 9/1997 |
| JP | 09-265346 | 10/1997 |
| JP | 09-274534 | 10/1997 |
| JP | 09-319510 | 12/1997 |
| JP | 10-021000 | 1/1998 |
| JP | 10-033831 | 2/1998 |
| JP | 10-099542 | 4/1998 |
| JP | H10-154038 | 6/1998 |
| JP | 10-228349 A | 8/1998 |
| JP | H10-228349 * | 8/1998 |
| JP | 10-254614 | 9/1998 |
| JP | 11-053994 | 2/1999 |
| JP | 11-099284 | 4/1999 |
| JP | 11-114223 | 4/1999 |
| JP | 11-307243 | 5/1999 |
| JP | 2901476 | 6/1999 |
| JP | 11-305935 A | 11/1999 |
| JP | 2000-063230 | 2/2000 |
| JP | 2000-270237 | 9/2000 |
| JP | 2000-308756 | 11/2000 |
| JP | 2001-038052 | 2/2001 |
| JP | 2001-104643 | 4/2001 |
| JP | 3078268 B2 | 4/2001 |
| JP | 2001-175412 | 6/2001 |
| JP | 2001-236181 A | 8/2001 |
| JP | 2002-224444 | 8/2001 |
| JP | 3194841 B2 | 8/2001 |
| JP | 2001-306245 A | 11/2001 |
| JP | 3228845 B2 | 11/2001 |
| JP | 2001-356875 A | 12/2001 |
| JP | 2002-062981 | 2/2002 |
| JP | 2002-082751 | 3/2002 |
| JP | 2002-091642 A | 3/2002 |
| JP | 3273531 | 4/2002 |
| JP | 2002-153673 | 5/2002 |
| JP | 2002-202843 | 7/2002 |
| JP | 2002-232549 | 8/2002 |
| JP | 2002-233665 | 8/2002 |
| JP | 2004-139206 | 10/2002 |
| JP | 2002/032770 | 11/2002 |
| JP | 2003-053038 | 2/2003 |
| JP | 2003044220 | 2/2003 |
| JP | 2003-083715 | 3/2003 |
| JP | 2003-140823 | 5/2003 |
| JP | 3422383 | 6/2003 |
| JP | 2003-208260 | 7/2003 |
| JP | 2005-040493 A | 7/2003 |
| JP | 2013-208260 * | 7/2003 |
| JP | 2003-279799 A | 10/2003 |
| JP | 2003-325974 | 11/2003 |
| JP | 2004-062774 | 2/2004 |
| JP | 2004-070502 A | 3/2004 |
| JP | 3517482 B2 | 4/2004 |
| JP | 2004/139206 | 5/2004 |
| JP | 2004-191906 A | 7/2004 |
| JP | 2004-310074 | 11/2004 |
| JP | 2004-313492 | 11/2004 |
| JP | 2004-348459 | 12/2004 |
| JP | 2005-025170 | 1/2005 |
| JP | 2005-040493 A | 2/2005 |
| JP | 2005-063230 | 3/2005 |
| JP | 2006-113019 | 4/2006 |
| JP | 2006-136694 | 6/2006 |
| JP | 2007-083024 A | 4/2007 |
| JP | 2007-283134 A | 11/2007 |
| NL | 9300171 A | 8/1994 |
| RU | 2 125 853 C1 | 2/1994 |
| RU | 2 126 161 C1 | 2/1999 |
| RU | 2 141 738 C1 | 11/1999 |
| WO | WO 94/02931 | 2/1994 |
| WO | WO-95/19031 | 7/1995 |
| WO | WO 95/19031 | 7/1995 |
| WO | WO 96/05766 | 2/1996 |
| WO | WO 97/09101 | 3/1997 |
| WO | WO 97/12337 | 4/1997 |
| WO | WO 97/17598 | 5/1997 |
| WO | WO 97/28864 | 8/1997 |
| WO | WO 97/32641 A1 | 9/1997 |
| WO | 9741502 | 11/1997 |
| WO | WO 97/41502 | 11/1997 |
| WO | WO 98/11528 | 3/1998 |
| WO | WO 99/58214 A1 | 11/1999 |
| WO | WO 00/33168 | 6/2000 |
| WO | WO 00/35345 | 6/2000 |
| WO | WO 00/47108 | 8/2000 |
| WO | WO-0060534 | 10/2000 |
| WO | WO 01/87426 A2 | 11/2001 |
| WO | WO 01/91042 A3 | 11/2001 |
| WO | WO 02/17054 A1 | 2/2002 |
| WO | WO 03/015005 A2 | 2/2003 |
| WO | WO 03/056505 A1 | 7/2003 |
| WO | WO 03/088147 A1 | 10/2003 |
| WO | WO 03/107260 A2 | 12/2003 |
| WO | WO-2004012130 | 2/2004 |
| WO | WO 2004/039055 A2 | 5/2004 |
| WO | WO-2004038328 | 5/2004 |
| WO | WO 2004/051391 A2 | 6/2004 |
| WO | WO 2005/013115 | 2/2005 |
| WO | WO-2005013115 | 2/2005 |
| WO | WO 2005/040493 A1 | 5/2005 |
| WO | 2005073838 A2 | 8/2005 |
| WO | WO 2006/076557 A2 | 7/2006 |
| WO | WO 2006/076557 A3 | 7/2006 |
| WO | WO 2007/063449 A1 | 6/2007 |
| WO | 2007063449 A1 | 7/2007 |
| WO | 2007105132 A1 | 9/2007 |
| WO | 2007105133 A2 | 9/2007 |
| WO | WO 2007/105132 A1 | 9/2007 |
| WO | WO 2007/105133 A1 | 9/2007 |
| WO | 2008065579 A2 | 6/2008 |
| WO | 2008065601 A2 | 6/2008 |
| WO | WO 2008/065579 A2 | 6/2008 |
| WO | WO 2008/065601 A2 | 6/2008 |

OTHER PUBLICATIONS

International Preliminary Report on Patentability, Written Opinion of the International Searching Authority for International Application No. PCT/US2008/005820, mailed Nov. 19, 2009, 6 pages.

(56) References Cited

OTHER PUBLICATIONS

Vellgdan, J., "Unique Interactive Projection Display Screen", BNL-64780, U.S. Air Force P.R.A.M. office and by D.A.R.P.A, pp. 9.
International Search Report mailed Sep. 2, 2008, for related International Application No. PCT/US08/05820, filed May 6, 2008, 2 pages.
European Office Action, 06718289.9 mailed Jul. 19, 2011, 6 pages.
Third Office Action of Chinese Patent Application 200680006415.3, mailed Aug. 12, 2011, 5 pages.
Office Action for counterpart Japanese Patent Application JP 2007-551393 mailed Sep. 15, 2011, 2 pages, Office Action and English summary.
Office Action from U.S. Appl. No. 11/187,387, Mailed Feb. 4, 2010, 17 pages.
PCT International Search Report and Written Opinion of the International Searching Authority, Mailed Oct. 30, 2006. 14 pages.
PCT International Search Report and Written Opinion of the International.Searching Authority, Mailed Jul. 17, 2007, 11 pages.
Sukthankar, R., et al., "Smarter Presentations: Exploiting Homography in Camera-Projector Systems," Proceedings of International Conference on Computer Vision, 2001., 7 pages.
Madritsch, F., "CCD-Camera Based Optical Tracking for Human-Computer Interaction." Proceedings 1st European Conference on Disability, Virtual Reality and Associated Technologies Maidenhead, 1996, pp. 161-170.
Olsen, Jr, D., et al., "Laser Pointer Interaction," Proceedings of the SIGCHI Conference on Human Factors in Computing Systems, 2001, Seattle, WA., 7 pages.
Myers, B., et al., "Interacting at a Distance: Measuring the Performance of Laser Pointers and Other Devices," vol. 4: Issue 1, Proceedings of CHI Apr. 2002, Minneapolis, Minnesota, pp. 33-40.
Agilent Technologies, "Agilent ADNB-6031 and ADNB-6032 Low Power Laser Mouse Bundles: Datasheet," http://www.agilent.com/semiconductors. May 27, 2005, pp. 1-45, Agilent Technologies.
Agilent Technologies, Agilent ADNK-2623 Optical Mouse Designer's Kit: Product Overview, http://www.agilent.com/semiconductors. Jul. 3, 2003. Agilent Technologies, 4 pages.
3D Connexion, "SpaceMouse Plus: Premium Motion Controller," www.3Dconnexion.com, 2003, 2 pages.
Gyration, Inc., MicroGyro MG1101, http://www.byration.com, pp. 1-18, 2005, DEO1300-001, Data Sheet, MicroGyro MG1101, Rev A.
Smarthome, "Philips ProntoPro NG Fully Programmable Remote Control #TSU7000," Printed Sep. 22, 2006, www.smartphone.com/8196.html. pp. 4.
Owens, R., "Optical Mouse Technology," pp. 15, Printed on Sep. 22, 2006, www.mstarmetro.net/~rlowens/OpticalMouse/.
Gyration, Gyration Home, pp. 2, printed on Sep. 22, 2006, www.gyration.com/en-US, Gyration, "Gyro Technology," pp. 2, printed on Sep. 22, 2006, www.gyration.com/en-US/GyroTech.html.
Intersense, Inc., "The New Standard in Motion Tracking," pp. 2, printed on Sep. 22, 2006, www.intersense.com.
Prentke Romich Company, HeadMouse Extreme, pp. 1, printed on Sep. 22, 2006, http://store.prentrom.com/cgi-bin/store/HE-X.html.
International Preliminary Report on Patentability, Written Opinion of the International Searching Authority for International Application No. PCT/US2008/005820 (7416P006PCT), mailed Nov. 19, 2009, 6 pages.
Second Office Action from foreign counterpart China Patent Application No. 200680006415.3 mailed Oct. 8, 2010, pp. 6.
Odell, D., FAM 18.5, "An Optical Pointer for Infrared Remote Controllers", IEEE, 1995, pp. 324-325.
Aihara, T., et al., "Wireless Pointing Device", IBM Technical Disclosure Bulletin, vol. 36, No. 06B, Jun. 1993, pp. 345-346.
Office Action for counterpart European Patent Application No. 06718289.9, mailed Nov. 11, 2007, 7 pages.
Office Action for counterpart European Patent Application No. 06718289.9, mailed Dec. 10, 2010, 6 pages.
3rdTech, Inc. , "HiBallTM-3000 Wide-Area Tracker and 3D Digitizer", 2002, 2 pages.
Billinghurst, M. & Hirokazu Kato, "Collaborative Augmented Reality", Communications of the ACM, vol. 45, No. 7, 64-70 Jul. 2002.

Billinghurst, M. & Hirokazu Kato, "Real World Teleconferencing", CHI EA'99, pp. 5, May 15-20, 1999.
Bishop, G. Ph.D. , "Self-Tracker: A Smart Optical Sensor on Silicon ", dissertation, U.N.C. Chapel Hill, 1984, 65 pages.
Foxlin, E. et al., "FlightTracker: A Novel Optical/Inertial Tracker for Cockpit Enhanced Vision ", IEEE/ACM ISMAR 2004 Nov. 2-5, 2004.
Foxlin, E. & Leonid Naimark, "VIS-Tracker: A Wearable Vision-Inertial Self-Tracker", IEEE VR2003, Mar. 22-26, 2003, 8 pages.
Gordon, G. et al., "The Use of Dense Stereo Range Data in Augmented Reality", IEEE/ACM ISMAR 2002, 10 pages.
Gottschalk, S. & John Hughes, "Autocalibration for Virtual Environments Tracking Hardware ", SIGGRAPH '93, U.N.C. Chapel Hill, pp. 65-72 1993.
Howard, B. et al., "Lightglove: Wrist-Worn Virtual Typing and Pointing", Lightglove, Inc. Ubiquitous Computing Enabled By Optical Reflectance Controller 2004, Proc. 5th IEEE Int'l Symposium on Wearable Computers (ISWC '01), pp. 172-73 2001.
Jobbagy, A., "Centre Estimation in Marker Based Motion Analysis ", Department of Measurement and Instrument Engineering Technical University of Budapest, N. TUB-TR-93-EE04, Budapest, Apr. 15, 1993, Technical Report, Ser. Elec. Eng'g, pp. 95.
Kato, H. & Mark Billinghurst, "Marker Tracking and HMD Calibration for a Video-based Augmented Reality Conferencing System", Proc. 2nd IEEE/ACM Int'l Workshop on Augmented Reality (IWAR '99), 1999, 10 pages.
Kato, H. et al., "The Effect of Spatial Cues in Augmented Reality Video Conferencing", Proc. 9th Int'l Conf. on Human-Computer Interaction (HCI Int'l 2001) Aug. 5-10, 2001, pp. 4.
NaturalPoint, Inc. TrackIR Software Version 3.10 Manual 2004, 35 pages.
NaturalPoint, Inc. TracklR Software Version 4.0.020 User's Manual Getting Started Jan. 9, 2005, pp. 35.
Welch, G. et al., "High-Performance Wide-Area Optical Tracking—The HiBall Tracking System", SIGGRAPH 2001, Course 11 Feb. 2001, pp. 22.
Welch, G. & Eric Foxlin, "Motion Tracking: No Silver Bullet, but a Respectable Arsenal", IEEE Computer Graphics, vol. 22, No. 6, pp. 24-38 Nov.-Dec. 2002.
Welch, G. & Gary Bishop, "SCAAT: Incremental Tracking with Incomplete Information", SIGGRAPH 2001, Course 11 2001, 12 pages.
Welch, G. et al. "The HiBall Tracker: High-Performance Wide-Area Tracking for Virtual and Augmented Environments", Proc. ACM Symposium on Virtual Reality Software & Technology Dec. 20-22, 1999, pp. 1-11.
Wilson, A. & Steven Shafer, "XWand: UI for Intelligent Spaces", Proc. SIGCHI Conf. on Human factors in computing systems (CHI '03), pp. 545-52, Apr. 5-10, 2003.
Wilson, A., "Wireless User Interface Devices for Connected Intelligent Environments", Ubicomp Workshop on Multi-Device Interfaces for Ubiquitous Peripheral Interaction , 2003, 3 pages.
Wilson, D. & Andy Wilson, "Gesture Recognition Using the XWand", Tech. Report CMU-RI-TR-04-57, Robotics Institute, Apr. 2004, 13 pages.
Wormell, D. & Eric Foxlin Proc. Workshop on Virtual Environments (EGVE '03), pp. 47-56 Advancements in 3D Interactive Devices for Virtual Environments May 22-23, 2003.
Zuech, N., "Smart Vision Sensors, Consultancy", AIA Vision Online Sep. 13, 2003, 10 pages.
Dementhon, U.S. Appl. No. 60/591,892, filed Jun. 2, 2009.
Re-examination U.S. Appl. No. 95/002,114, filed Aug. 31, 2012, Part 1, 303 pages.
Re-examination U.S. Appl. No. 95/002,114, filed Aug. 31, 2012, Part 2, 176 pages. (Total 479 pages).
Re-examination U.S. Appl. No. 95/002,116, filed Aug. 31, 2012, Part 1, 302 pages.
Re-examination U.S. Appl. No. 95/002,116, flied Aug. 31, 2012, Part 2, 231 pages. (Total 533 pages).
Re-examination U.S. Appl. No. 95/002,118, filed Aug. 31, 2012, Part I 300 pages.
Re-examination U.S. Appl. No. 95/002,118, filed Aug. 31, 2012, Part 2, 242 pages. (Total 542 pages).

(56) References Cited

OTHER PUBLICATIONS

Baca, A, Spatial reconstruction of marker trajectories from high speed video image sequences, Jun. 1997, 19 Med. Eng. Phys., pp. 367-374.
3rdTech, Inc. HiBall-3100™ Wide-Area, High-Precision Tracker and 3D Digitizer 2003, 3 pages.
Cameron, A. et al. Proc. SPIE: Helmet-and Head-Mounted Displays and Symbology Design Reqs. II, vol. 2465, pp. 281-95 Helmet Trackers—The Future 1995.
Grunnet-Jepsen, A. et al. Applied Optics, vol. 35, No. 20, pp. 3874-3879 Convolution-kernel-based optimal trade-off filters for optical pattern recognition Jul. 10, 1996.
Havelock, D. IEEE Transactions on Pattern Analysis & Machine Intelligence, vol. 11, No. 10, 1065-75 Geometric Precision in Noise-Free Digital Images Oct. 1989, pp. 381-392.
Hogue, A. Ph.D. thesis, York Univ., Canada Marvin: a Mobile Automatic Realtime Visual and INertial tracking system May 15, 2003, 229 pages.
DeMenthon, D. (Principal Investigator) National Science Foundation Award Abstract #961576:SBIR Phase I: High Performance Three Dimensional Mouse and Head Tracker 1996, 2 pages.
Nitzan, D. et al. NSF Grant DAR78-27128 Machine Intelligence Research Applied to Industrial Automation Nov. 1980, 208 pages.
Solymar, L. et al. Oxford Series in Optical and Imaging Sciences, Clarendon Press The Physics and Applications of Photorefractive Materials 1996, 3 pages.
Tew, A. Med. & Biol. Eng. & Comput., vol. 26, pp. 68-74, The Oxford Optical Pointer: a direction-sensing device with proportional electrical output Jan. 1988.
Van de Velde, G. & Björn Van de Vondel IWT/HOBU Project, De Nayer Instituut Inventory of Embedded Systems for Image Processing Oct. 8, 2004, 39 pages.
Van de Velde, G. & Björn Van de Vondel IWT/HOBU Project, De Nayer Instituut Sub-pixel edge detection Oct. 2004, 7 pages.
Selectech, Ltd.'s AirMouse™ Remote Control System ("AirMouse"), 29 pages, 1991.
NaturalPoint's TrackIR™ "3-Pro: Put Your Head in the Game", 2 pages, 2003, (located at Internet archive's wayback machine) http://web.archive.org/web/20040619225900/http://www.naturalpoint.com.
NaturalPoint's TrackIR™, "Reviews and Interviews", 9 pages, 2002 http://www.naturalpoint.com/trackir/02-products/product-reviews.html.
NaturalPoint's TrackIR2™ "How It Works", 3 pages, 2003, (located at Internet archive's wayback machine) http://web.archive.org/web/20040610203639/http://www.naturalpoint.com.
Nalwa, V. Addison-Wesley Publishing Co. A Guided Tour of Computer Vision 1993.
Final Office Action from U.S. Appl. No. 11/187,435, mailed Dec. 30, 2008, 17 pages.
Final Office Action from U.S. Appl. No. 11/187,435, mailed Dec. 10, 2009, 1 page.
Office Action from U.S. Appl. No. 11/187,435, mailed Aug. 20, 2008, 25 pages.
Office Action from U.S. Appl. No. 11/187,435, mailed May 11, 2009, 15 pages.
Office Action from U.S. Appl. No. 12/983,554, mailed Feb. 23, 2011, 54 pages.
Notice of Allowance from U.S. Appl. No. 12/983,554, mailed Dec. 20, 2012, 12 pages.
Notice of Allowance from U.S. Appl. No. 12/983,554, mailed Feb. 29, 2012, 18 pages.
Notice of Allowance from U.S. Appl. No. 12/983,554, mailed Jun. 11, 2012, 11 pages.
Notice of Allowance from U.S. Appl. No. 12/983,554, mailed Apr. 1, 2013, 24 pages.
Decision of Rejection Office Action from foreign counterpart China Patent Application 200680006415.3 mailed Feb. 17, 2012, 10 pages.
Office Action from foreign counterpart Europe Patent Application 06718289.0 mailed Jul. 19, 2011, 6 pages.
Summons from counterpart European Patent Application No. 06718289.9, mailed Dec. 4, 2012, 8 pages.
Final Office Action from foreign counterpart Japanese Patent Application JP 2007-551393 mailed Oct. 16, 2012, 3 pages.
Office Action from counterpart Japanese Patent Application JP 2007-551393 mailed Jan. 16, 2013, 11 pages.
Notice of Allowance from foreign counterpart Japanese Patent Application JP 2007-551393 mailed Feb. 26, 2013, 2 pages.
Final Office Action from U.S. Appl. No. 11/187,405, mailed Dec. 30, 2008, 30 pages.
Office Action from U.S. Appl. No. 11/187,405, mailed Aug. 20, 2008, 33 pages.
Final Office Action from U.S. Appl. No. 11/187,405, mailed Dec. 17, 2009, 19 pages.
Office Action from U.S. Appl. No. 11/187,405, mailed May 13, 2009, 18 pages.
Notice of Allowance from U.S. Appl. No. 11/187,405, mailed Apr. 29, 2010, 19 pages.
Final Office Action from U.S. Appl. No. 11/187,397, mailed Dec. 15, 2008, 24 pages.
Office Action from U.S. Appl. No. 11/187,397, mailed Aug. 19, 2008, 25 pages.
Office Action from U.S. Appl. No. 11/187,397, mailed May 13, 2009, 22 pages.
Final Office Action from U.S. Appl. No. 11/187,397, mailed Feb. 4, 2010, 18 pages.
Notice of Allowance from U.S. Appl. No. 11/187,397, mailed Apr. 29, 2010, 6 pages.
Notice of Allowance from U.S. Appl. No. 11/187,397, mailed Aug. 23, 2010, 9 pages.
Office Action from U.S. Appl. No. 11/777,073, mailed Mar. 28, 2012, 27 pages.
Office Action from U.S. Appl. No. 11/777,073, mailed Mar. 31, 2011, 22 pages.
Final Office Action from U.S. Appl. No. 11/777,073, mailed Jan. 29, 2013, 14 pages.
Office Action from U.S. Appl. No. 11/777,078 mailed Sep. 29, 2009, 11 pages.
Final Office Action from U.S. Appl. No. 11/777,078 mailed Jun. 10, 2010, 12 pages.
Office Action from U.S. Appl. No. 11/777,078 mailed Nov. 21, 2011, 24 pages.
Final Office Action from U.S. Appl. No. 11/187,387, mailed Feb. 4, 2010, pp. 17.
Final Office Action from U.S. Appl. No. 11/187,405, mailed Dec. 17, 2009, 18 pages.
Office Action from U.S. Appl. No. 11/777,073, mailed Apr. 29, 2010, 13 pages.
Notice of Allowance from U.S. Appl. No. 11/187,435, mailed May 3, 2010, 13 pages.
Notice of Allowance from U.S. Appl. No. 11/187,387, mailed Apr. 29, 2010, 14 pages.
Notice of Allowance from U.S. Appl. No. 11/187,405, mailed Apr. 29, 2010, 18 pages.
Final Office Action from U.S. Appl. No. 11/777,078, mailed Jun. 10, 2010, 13 pages.
Notice of Allowance from U.S. Appl. No. 11/187,387, mailed Aug. 23, 2010, 9 pages.
Notice of Allowance from U.S. Appl. No. 11/187,435, mailed Sep. 2, 2010, 11 pages.
Danish Patent and Trademark Office, Novelty Search Dec. 20, 2006, SE2006 05704, (Dec. 20, 2006), 11 pages.
Office Action from U.S. Appl. No. 11/187,387, mailed May 13, 2009, 22 pages.
Office Action from U.S. Appl. No. 11/187,405, mailed Sep. 29, 2009, 9 pages.
Moore, Stan, "Optimal Pixel Size", http://www.stanmooreastro.com/pixel_size.htm, 2004, pp. 1-5.
Final Office Action from U.S. Appl. No. 11/187,435, mailed Dec. 10, 2009, 19 pages.
Danette, A., et al. "Tracking: Beyond 15 Minutes of Thought", SIGGRAPH 2001 Course 11, U.N.C. Chapel Hill, ACM, Inc., pp. 8/12-8/17, 2001.

(56) References Cited

OTHER PUBLICATIONS

Billinghurst, M. et al., "The MagicBook—Moving Seamlessly between Reality and Virtuality", IEEE Computer Graphics and Applications, vol. 21, No. 3, pp. 6-8, May 6, 2001.
Browse, R. et al., Proc. ISP Conf. on the Engineering Reality of Virtual Reality Controlling graphic objects naturally: use your head, 6 pages, 1997.
Förstner, W., "On the Geometric Precision of Digital Correlation", ISPRS Symposium on Mathematical Models, Accuracy Aspects and Quality Control, vol. 24, No. 3, pp. 176-89, 1982.
Havelock, D., "Geometric Precision in Digital Images", Int'l Archives of Photogrammetry & Remote Sensing, vol. XXV part A3, pp. 381-92, 1984.
Kato, H. et al., "Virtual Object Manipulation on a Table-Top AR Environment", Proc. Int'l Symposium on Augmented Reality (ISAR 2000), pp. 111-119, 2000.
Kim, D. et al., "An Optical Tracker for Augmented Reality and Wearable Computers", Proc. 1997 Virtual Reality Annual Int'l Symposium (VRAIS '97), pp. 146-150, 1997.
O'Gorman, L. et al., "A Comparison of Fiducial Shapes for Machine Vision Registration", IAPR Workshop on Machine Vision Applications (MVA '90), pp. 253-56, Nov. 28-30, 1990.
Savvides, M. et al., "Face Verification using Correlation Filters", Proc. 3rd IEEE Workshop. On Automatic Identification Advanced Technologies, pp. 56-61, Mar. 2002.
Smith, S. California Technical Publishing the Scientist and Engineer's Guide to Digital Signal Processing, pp. 503-534, 1997.
Stern, A. et al., "Shannon number and information capacity of three-dimensional integral imaging", J. Opt. Soc. Am. A, vol. 21, No. 9, pp. 1602-1612, Sep. 2004.
Tian, Q., et al., "Algorithms for Subpixel Registration", Computer Vision, Graphics, and Image Processing, vol. 35, pp. 220-33, 1986.
Tjan, B. et al., "Digital Sign System for Indoor Wayfinding for the Visually Impaired", 2005 IEEE Computer Science Conf. on Computer Vision and Pattern Recognition (CVPRW'05), 8 pgs. Jun. 20-26, 2005.
Wilson, A, et al., "Demonstration of the XWand Interface for Intelligent Spaces", 2 pgs., 2002.
Woods, E. et al. Proc. 1st Int'l Conf. on Computer Graphics and Interactive Techniques, MagicMouse: an Inexpensive 6-Degree-of-Freedom Mouse, pp. 285-86, 2003.
Office Action from Re-examination U.S. Appl. No. 95/002,116, mailed Oct. 22, 2012, 15 pages.
Office Action from Re-examination U.S. Appl. No. 95/002,118, mailed Oct. 4, 2013, 126 pages.
Office Action from Re-examination U.S. Appl. No. 95/002,114, mailed Oct. 15, 2012, 15 pages.
Office Action from U.S. Appl. No. 11/777,078 mailed Oct. 10, 2012, 11 pages.
Office Action from U.S. Appl. No. 11/777,078 mailed Nov. 22, 2011, 17 pages.
Office Action from Foreign Counterpart China Patent Application No. 200680006415.3, mailed Jul. 22, 2009, 2 pages.
Office Action for counterpart European Patent Application No. 06718289.9, mailed Nov. 9, 2007, 7 pages.
Office Action for counterpart European Patent Application No. 06718289.9, mailed Sep. 7, 2009, 5 pages.
Exam Report from foreign counterpart Europe Patent Application 06718289.0 mailed Oct. 12, 2010, 5 pages.
Final Office Action from U.S. Appl. No. 11/777,073, mailed Oct. 4, 2011, 19 pages.
Final Office Action from U.S. Appl. No. 11/777,073, mailed Nov. 24, 2010, 16 pages.
Final Office Action from U.S. Appl. No. 11/187,435, mailed Dec. 10, 2009, 1 pages.
Final Office Action from foreign counterpart Japanese Patent Application JP 2007551393 mailed Oct. 16, 2012, 2 pages.
Notice of Allowance for U.S. Appl. No. 11/777,078 mailed Jul. 22, 2013, 11 pages.
Notice of Allowance for U.S. Appl. No. 11/777,073 mailed Sep. 17, 2013, 8 pages.
Notice of Allowance for U.S. Appl. No. 11/777,073 mailed Aug. 15, 2013, 55 pages.
Bishop, G. Ph.D.,"Self-Tracker: A Smart Optical Sensor on Silicon", dissertation, U.N.C. Chapel Hill, 1984, 65 pages.
Smartnav, "Assistive Technology-NaturalPoint head tracking for people with special needs," pp. 6, printed on Sep. 22, 2006, http://rjcooper.com/smartnav/index.html.
Air Mouse Go Plus with MotionSense™, Gyration, 2009, 2 pages.
AirMouse™ Remote Control System Model AM-1 User's Guide, Selectech, Ltd., 1991, 29 pages.
Billinghurst, M. et al., "The MagicBook-Moving Seamlessly between Reality and Virtuality", IEEE Computer Graphics and Applications, vol. 21, No. 3, pp. 6-8, May-Jun. 2001.
Cantzler, H. et al., "A Novel Form of a Pointing Device," Vision, Video, and Graphics, 2003, pp. 1-6.
Forstner, W., "On the Geometric Precision of Digital Correlation," Proceedings of the ISPRS Symposium *Mathematical Models, Accuracy Aspects and Quality Control*, Finland 1982, International Archives of Photogrammetry, vol. 24, No. 3, 1982, pp. 176-189.
Havelock, D. "Geometric Precision in Noise-Free Digital Images," IEEE Transactions on Pattern Analysis & Machine Intelligence, vol. 11, No. 10, pp. 1065-1075. Oct. 1989.
Hogue, A., "MARVIN: A Mobile Automatic Realtime Visual and Inertial Tracking System," Technical Report Cse-2003-13, PH.D. Thesis, York University, Canada, May 15, 2003, 229 pages.
Howard, B. et al., "Lightglove: Wrist-Worn Virtual Typing and Pointing", Lightglove, Inc. Ubiquitous Computing Enabled by Optical Reflectance Controller 2004, Proc. 5th IEEE Int'l Symposium on Wearable Computers (ISWC '01), pp. 172-73, 2001.
Rose, E. et al., "Annotating Real-World Objects Using Augmented Reality," Technical Report ECRC-94-41, 21 pages (also published in CG International '95 Proceedings, Leeds, UK, Jun. 1995, pp. 357-370).
*ThinkOptics, Inc.* v. *Nintendo of America et al.*, "Defendant Nyko Technologies. Inc. and Intec. Inc. Invalidity Contentions Exhibit A," Civ. Action No. 6:11-cv-0045S-LED, US. Dist. Ct of Tx., Eastern Dist. Filed Aug. 14, 2012, 78 pages.
*ThinkOptics, Inc.* v. *Nintendo of America et al.*, "Invalidity Contentions Pursuant to P.R. 3-3 and 3-4 of Defendants Nintendo of America Inc. And Nintendo Co. Ltd. Exhibit C," Civ. Action No. 6:11-cv-00455-LED, US. Dist. Ct of Tx., Eastern Dist. Filed Aug. 14, 2012, 521 pp.
*ThinkOptics, Inc* v. *Nintendo of America et al.*, "Imation Corp's 3-3 and 3-4 Disclosures" Civ. Action No. 6:11-cv-00455-LED, US. Dist. Ct of Tx, Eastern Dist. Filed Aug. 14, 2012, 56 pp.
*ThinkOptics, Inc* v. *Nintendo of America et al.*, "Defendant Nyko Technologies, Inc. and Intec, Inc. Invalidity Contentions Exhibit D," Civ. Action No. 6:11-cv-00455-LED, US. Dist. Ct of Tx., Eastern Dist. Filed Aug. 14, 2012, 3 pages.
*ThinkOptics, Inc* v. *Nintendo of America et al.*, "Defendant Nyko Technologies. Inc. and Intec. Inc. Invalidity Contentions Exhibit B," Civ. Action No. 6:11-cv-00455-LED, US. Dist. Ct of Tx., Eastern Dist. Filed Aug. 14, 2012, 55 pages.
*ThinkOptics, Inc* v. *Nintendo of America et al.*, "Imation Corp's 3-3 and 3-4 Disclosures," Exhibit A. Civ. Action No. 6:11-cv-00455-LED, US. Dist. Ct of Tx., Eastern Dist. Filed Aug. 12, 2012, 116 pp.
*ThinkOptics, Inc* v. *Nintendo of America et al.*, "Invalidity Contentions Pursuant to P.R. 3-3 and 3-4 of Defendants Nintendo of America Inc. and Nintendo Co. Ltd. Exhibit A.," Civ. Action No. 6:11-cv 00455-LED, US. Dist. Ct of Tx., Eastern Dist. Filed Aug. 14, 2012, 583 pp.
*ThinkOptics, Inc* v. *Nintendo of America et al.*, "Invalidity Contentions Pursuant to P.R. 3-3 and 3-4 of Defendants Nintendo of America Inc. and Nintendo Co. Ltd. Exhibit B.," Civ. Action No. 6:11-cv-00455-LED, US. Dist. Ct of Tx., Eastern Dist. Filed Aug. 14, 2012, 367 pp.
*ThinkOptics, Inc.* v, *Nintendo of America et al.*, "Defendant Nyko Technologies. Inc. and Intec. Inc, Invalidity Contentions Exhibit C," Civ. Action No. 6:11-cv-00455-LED, US. Dist. Ct of Tx., Eastern Dist. , Filed Aug. 14, 2012, 64 pages.

(56) References Cited

OTHER PUBLICATIONS

*ThinkOptics, Inc.* v. *Nintendo of America et al.*, "Invalidity Contentions Pursuant to P.R. 3-3 and 3-4 of Defendants Nintendo of America Inc. and Nintendo Co. Ltd." Civ. Action No. 6:11-cv-00455-LED, US. Dist. Ct of Tx. Eastern Dist. Filed Aug. 14, 2012 393 pp.
*ThinkOptics, Inc.* v. *Nintendo ofAmerica et al.*, "Defendant Nyko Technologies. Inc. and Intec. Inc. Invalidity Contentions," Civ. Action No. 6:11-cv-00455-LED, US. Dist. Ct of Tx., Eastern Dist. Filed Aug. 14, 2012, 9 pages.
Welch, G., et al., "Motion Tracking: No Silver Bullet, but a Respectable Arsenal," IEEE computer Graphics and Applications, vol. 22, No. 6, Nov./Dec. 2002, pp. 24-38.
Welch, G., et al., "SCAAT: Incremental Tracking with Incomplete Information," republished as appended paper to SIGGRAPH 2001, Course 11, ACM, Inc., Aug. 12-17, 2001, 12 pages.
Wilson, D. et al., "Gesture Recognition Using the XWand", Tech. Report CMU-RI-TR-04-57, Robotics Institute, Carnegie Mellon University, Apr. 2004, 10 pages.
Naimark, L., et al., "Encoded LED System for Optical Trackers," Proceedings of the 4th IEEE/ACM Int'l Symposium on Mixed and Augmented Reality, Oct. 5-8, 2005, pp. 1-4.
Vicci, L., "Quaternions and Rotations in 3-Space: the Algebra and Its Geometric Interpretation," Technical Report TR01-014, UNC Chapel Hill, Department of Computer Science, pp. 1-11, republished as appended paper to SIGGRAPH 2001, Course 11, ACM, Inc., Aug. 12-17, 2001.
Robinette, W. et al., "the Visual Display Transformation for Virtual Reality," TR94-031, Sep. 1994, pp. 1-30, re-published as appended paper to SIGGRAPH 2001, Course 11, ACM, Inc., Aug. 12-17, 2001.
Yang, H., et al., "Illumination Insensitive Model-Based 3D Object Tracking and Texture Refinement," Proceedings of the 3rd Int'l Symposium on 3D Data Processing, Visualization, & Transmission, 2006, 8 pages.
Random House Webster's College Dictionary, see p. 273 (Random House, 2d ed. 2000), 3 pages, ISBN 0-375-42560-8 or ISBN 0-375-42561-6 (Deluxe Edition).
Hobbs, Phillip, C.D., "Building Electro-Optical Systems Making It All Work", Second Edition, Wiley, A John wiley & Sons, Inc., Publication, copyright page, see p. 29, 2009, ISBN 978-0-470-40229-0, 3 pages.
Decision of Rejection Office Action from foreign counterpart Japanese Patent Application JP 2007-551393 mailed Apr. 3, 2012, 2 pages.
Response to Office Action from Foreign Counterpart China Patent Application No. 200680006415.3, dated Dec. 2009, 27 pages.
Response to Second Office Action from Foreign Counterpart China Patent Application No. 200680006415.3, dated Feb. 2011, 33 pages.
Response to Third Office Action from Foreign Counterpart China Patent Application No. 200680006415.3, dated Oct. 2011, 21 pages.
Response to Decision of Rejection Office Action from Foreign Counterpart China Patent Application No. 200680006415.3, mailed Jun. 2012, 28 pages.
International Preliminary Report on Patentability and Written Opinion of the International Searching Authority mailed Jan. 30, 2008, for International Patent Application No. PCT/US07/15955, 9 pages.
Response to Office Action for counterpart European Patent Application No. 06718289.9 mailed Nov. 9, 2007, dated May 9, 2008, 25 pages.
Response to Office Action for counterpart European Patent Application No. 06718289.9 mailed Sep. 7, 2009, dated Mar. 17, 2010, 27 pages.
Response to Examiners Report from Foreign counterpart European Patent Application No. 06718289.9, mailed Dec. 10, 2010, dated Jun. 8, 2011, 29 pages.
Response to Office Action for counterpart European Patent Application No. 06718289.9 dated Jan. 5, 2012, 30 pages.
Response to Summons to Attend Oral Proceedings for counterpart European Patent Application No. 06718289.9 mailed Dec. 4, 2012, filed Jan. 18, 2013, 25 pages.
Petition for Appeal to Office Action from foreign Counterpart Japanese Patent Application JP 2007-551393, filed Aug. 1, 2012, 32 pages.
Amendment to Office Action from foreign Counterpart Japanese Patent Application JP 2007-551393, filed Nov. 20, 2012, 17 pages.
PCT International Search Report and Written Opinion of the International Searching Authority from PCT Patent Application No. PCT/US2006/001198, mailed Oct. 30, 2006, 14 pages.
PCT International Search Report and Written Opinion of the International Searching Authority from PCT Patent Application No. PCT/US2006/001198 mailed Jul. 17, 2007, 11 pages.
Office Action from foreign counterpart Chinese Patent Application No. 200680006415.3 mailed Nov. 20, 2013, 5 pages (No English Translation).
Final Office Action from U.S. Appl. No. 11/777,078, mailed May 2, 2014, 11 pages.
Office Action from Re-examination U.S. Appl. No. 95/002,118 mailed Nov. 9, 2012, 13 pages.
Notice of Allowance from U.S. Appl. No. 11/777,073 mailed Apr. 24, 2014, 12 pages.
Notice of Allowance from U.S. Appl. No. 12/983,554 mailed Jul. 15, 2014, 21 pages.
Notice of Allowance from U.S. Appl. No. 12/983,554 mailed Mar. 19, 2014, 15 pages.
Final Office Action from U.S. Appl. No. 12/983,554 mailed Jul. 26, 2011, 16 pages.
Notice of Allowance from U.S. Appl. No. 12/983,554 mailed Nov. 14, 2011, 13 pages.
Notice of Allowance from U.S. Appl. No. 12/983,554 mailed Dec. 5, 2013, 26 pages.
Issue Notification from foreign counterpart Japan Patent Application No. 2007-551393 mailed Apr. 15, 2013, 4 pages.
Notice of Allowance from U.S. Appl. No. 11/077,073 mailed Apr. 24, 2014, 12 pages.
Notice of Allowance from U.S. Appl. No. 11/077,073 mailed Jan. 19, 2014, 18 pages.
Final Office Action from U.S. Appl. No. 11/777,078 mailed May 2, 2014, 11 pages.
Fourth Office Action from foreign counterpart Chinese Patent Application No. 2006800006415.3 mailed Oct. 23, 2014, 10 pages.
Notice of Allowance from U.S. Appl. No. 11/777,073 mailed Jul. 29, 2014, 17 pages.

\* cited by examiner

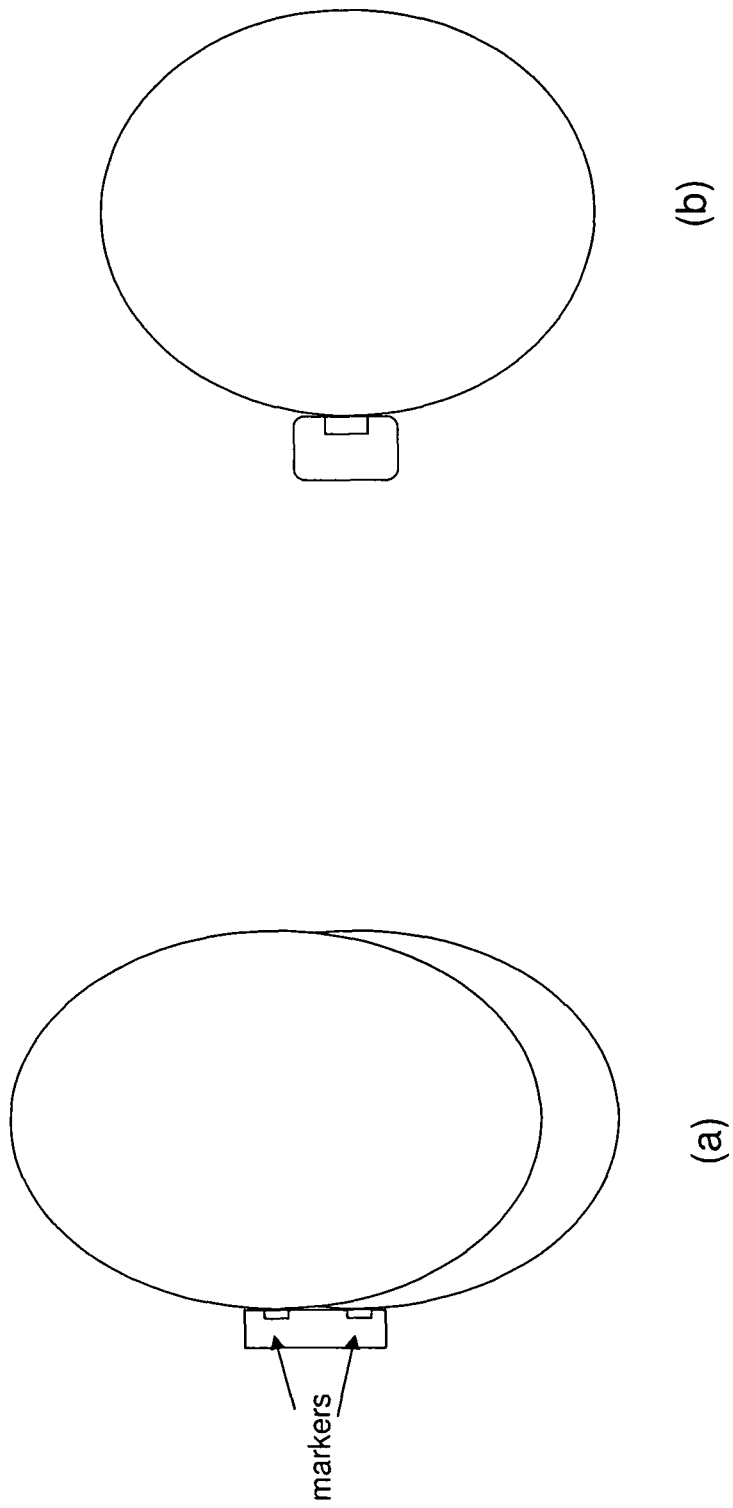
Figure 6  Top (a) and side (b) views of the operational region (shaded) for a two-marker vision-based tracking system. The emission has a half angle of ~60° in all dimensions and the source power follows an approximately cosine angular distribution.

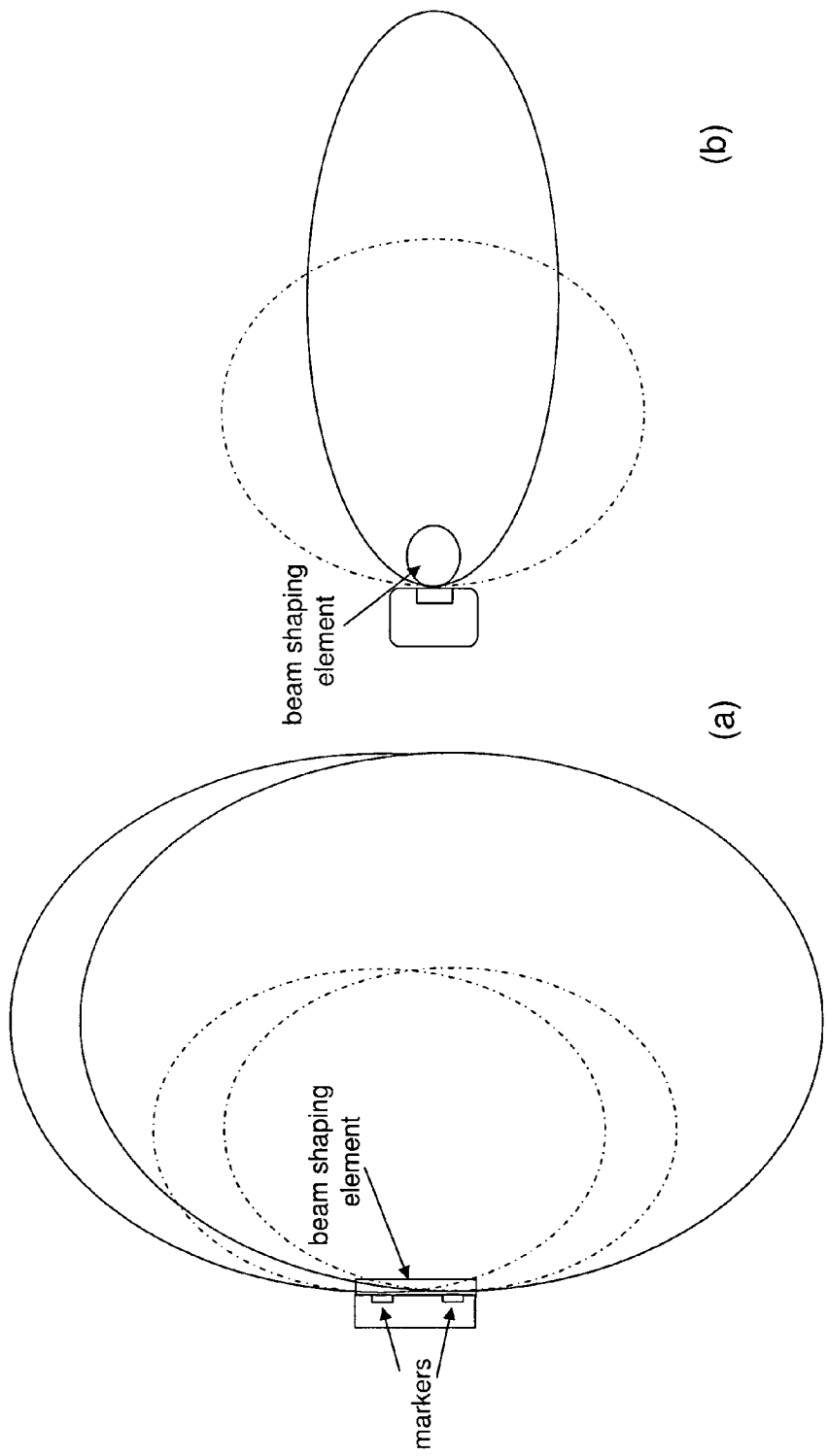

Figure 7 Top (a) and side (b) views of the operational regions for a two-marker vision-based tracking system with (shaded) and without (dashed) a beam shaping element operable in the vertical dimension (e.g., a cylindrical lens). The range in the horizontal and over a portion of the vertical dimension is increased, as is the overall size (volume and surface area) of the operational region.

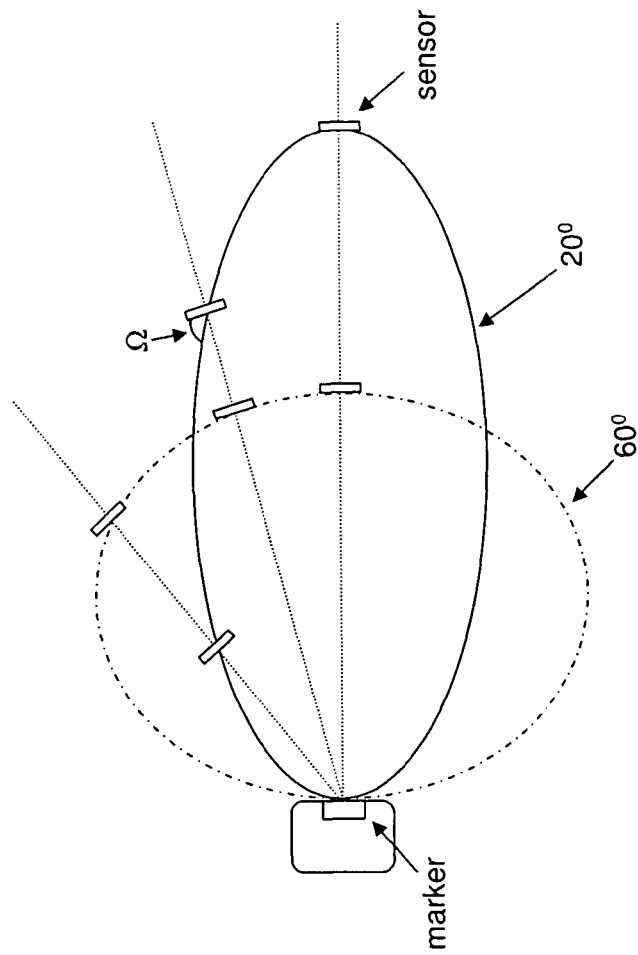

Figure 8  Illustrating the effect of the emission distribution on the operational region in one dimension. The orientation of the sensor at three different locations along the surface of the operational region is shown for each distribution. The narrower the distribution, the larger the angle, $\Omega$, at each location. The size of the operational region is proportional to $1/\cos(\Omega)$ averaged over the surface.

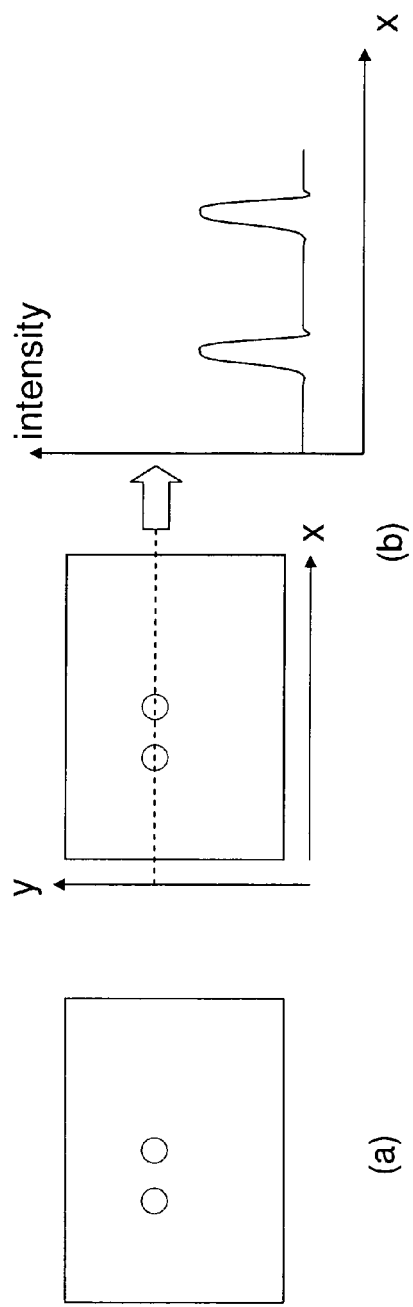
Figure 10 a) An idealized image of what the embedded optical sensor detects, b) a cross-sectional profile of the spots.
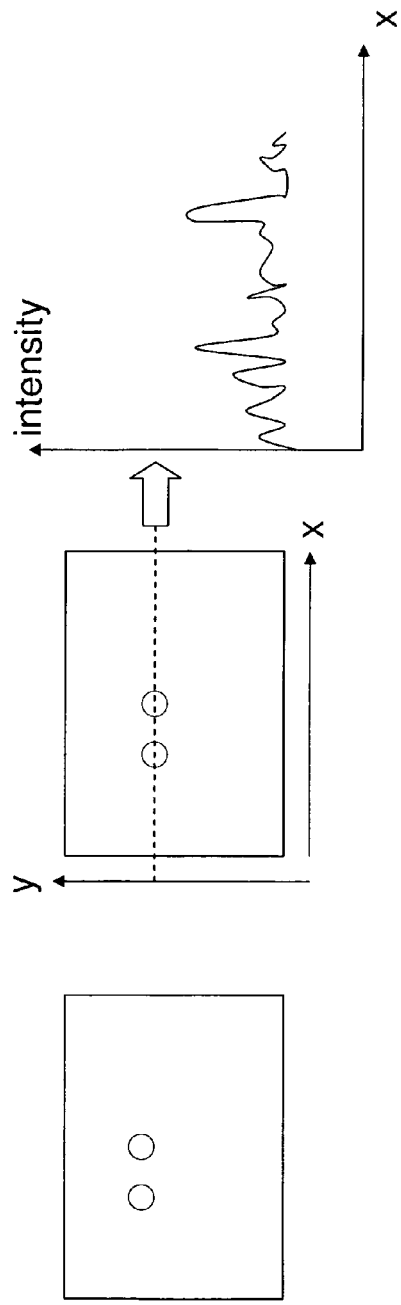
Figure 11 a) An non-ideal image of what the embedded optical sensor detects in the presence of background light, b) a cross-sectional profile of the spots shows that spot tracking will be more difficult.

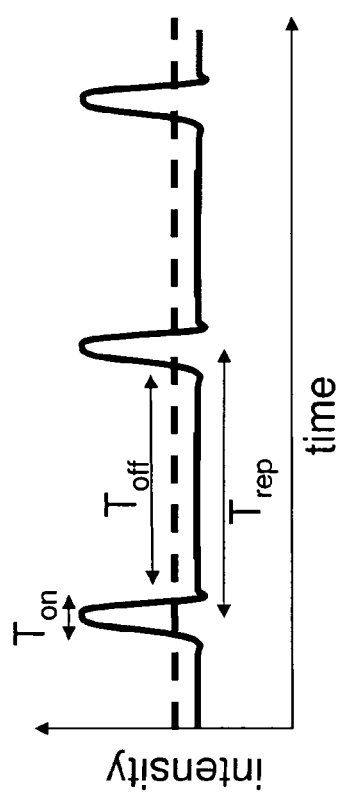
Figure 12 Comparison of the light emitted from a DC-driven LED (dashed line) and a pulsed LED (solid line) plus any ambient background light.
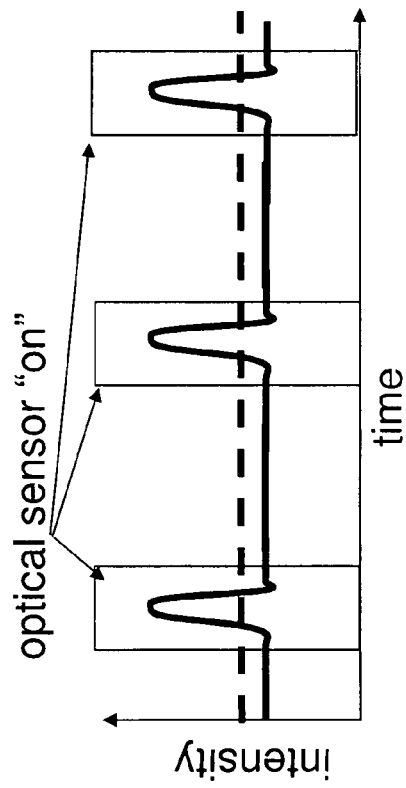
Figure 13 By synchronizing the sensor to the pulsed LEDs, it is possible to detect only high-power LED pulses while shutting out all light during the remainder of time. This can greatly improve the SNR.

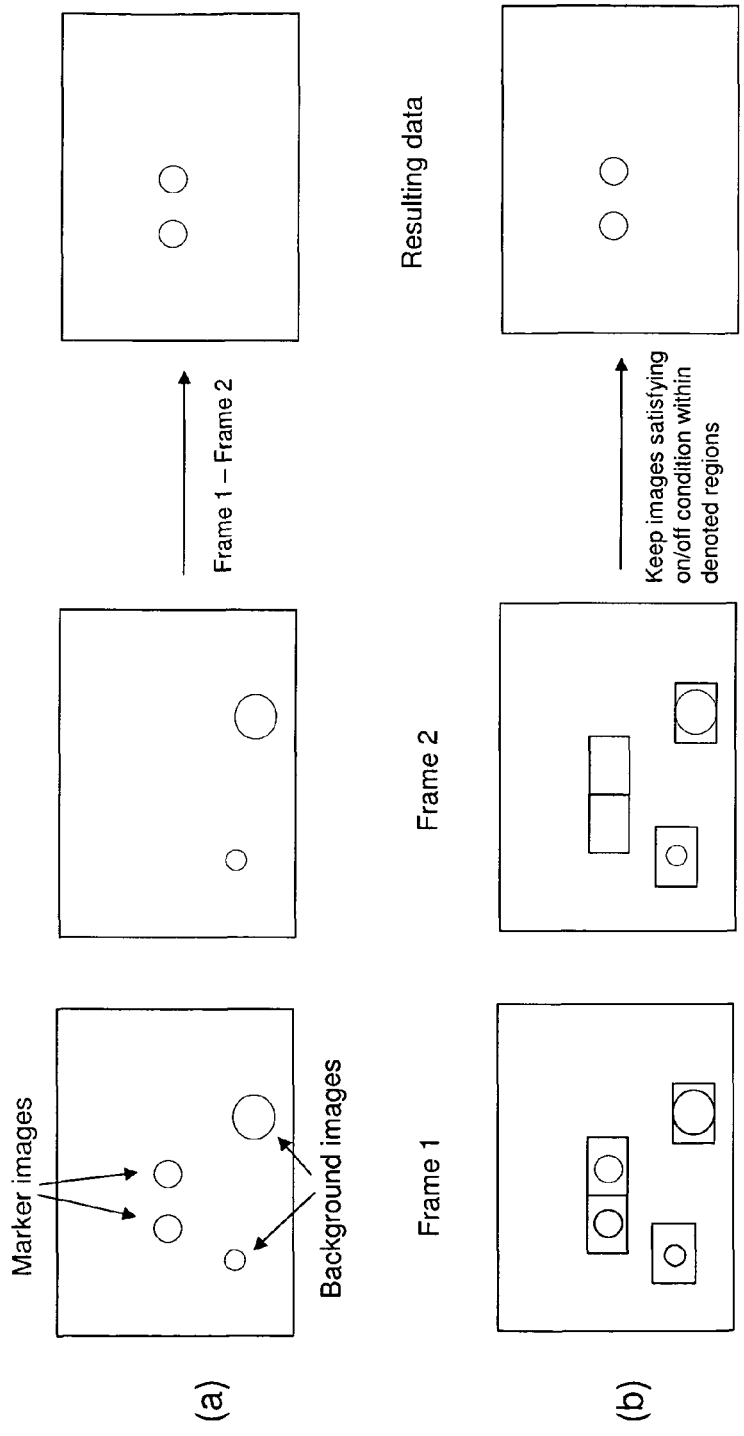
Figure 14 Temporal modulation methods for reducing background light. Marker emission is turned on and off in synchrony with reading of image sensor frames: a) frame subtraction and b) small regions around each detected image are checked for on/off condition. Only images satisfying the condition are retained.

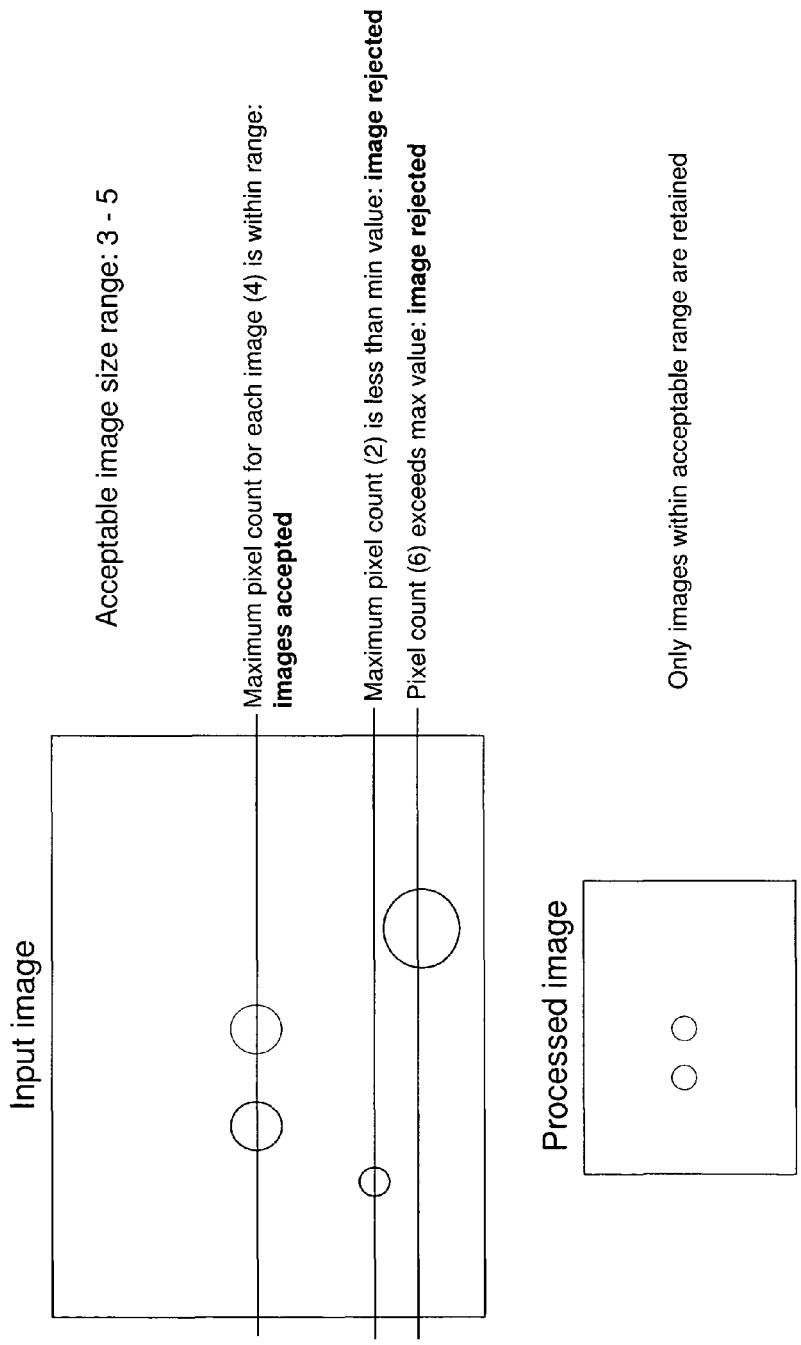

Figure 15 Example of use of image size/signal strength for background reduction. Each row of pixels is scanned. Row data is checked for consecutive pixels containing image signals. If the maximum length of consecutive pixels for any image falls outside the predetermined range for proper marker images (3 – 5 in this example), then the corresponding image is rejected. The processed image contains only images that satisfy the condition.

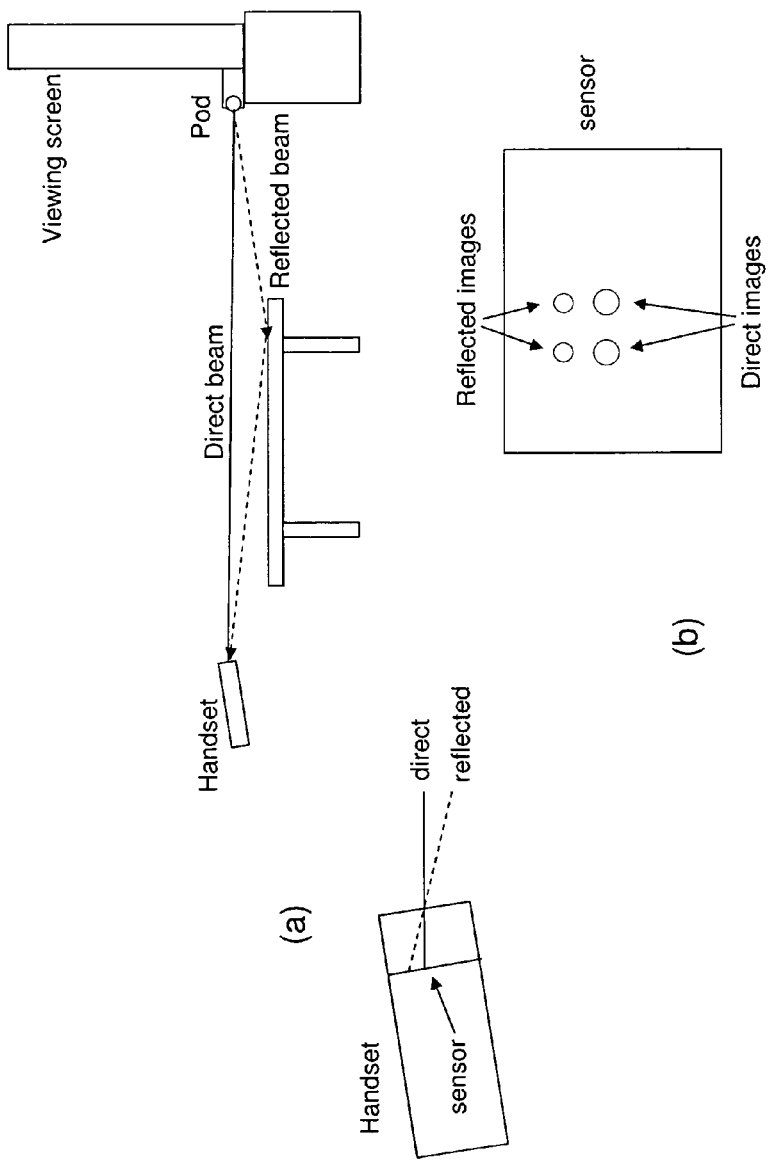

Figure 16 Typical scenario for marker reflections: a) The Handset is pointed at a screen, below which is placed the Pod. With a reflecting surface (e.g., table) between the Pod and the Handset, it is possible for reflected light from the two markers to enter the optical system within its field of view in addition to the direct beam; b) images of the markers on the sensor from both direct and reflected beams.

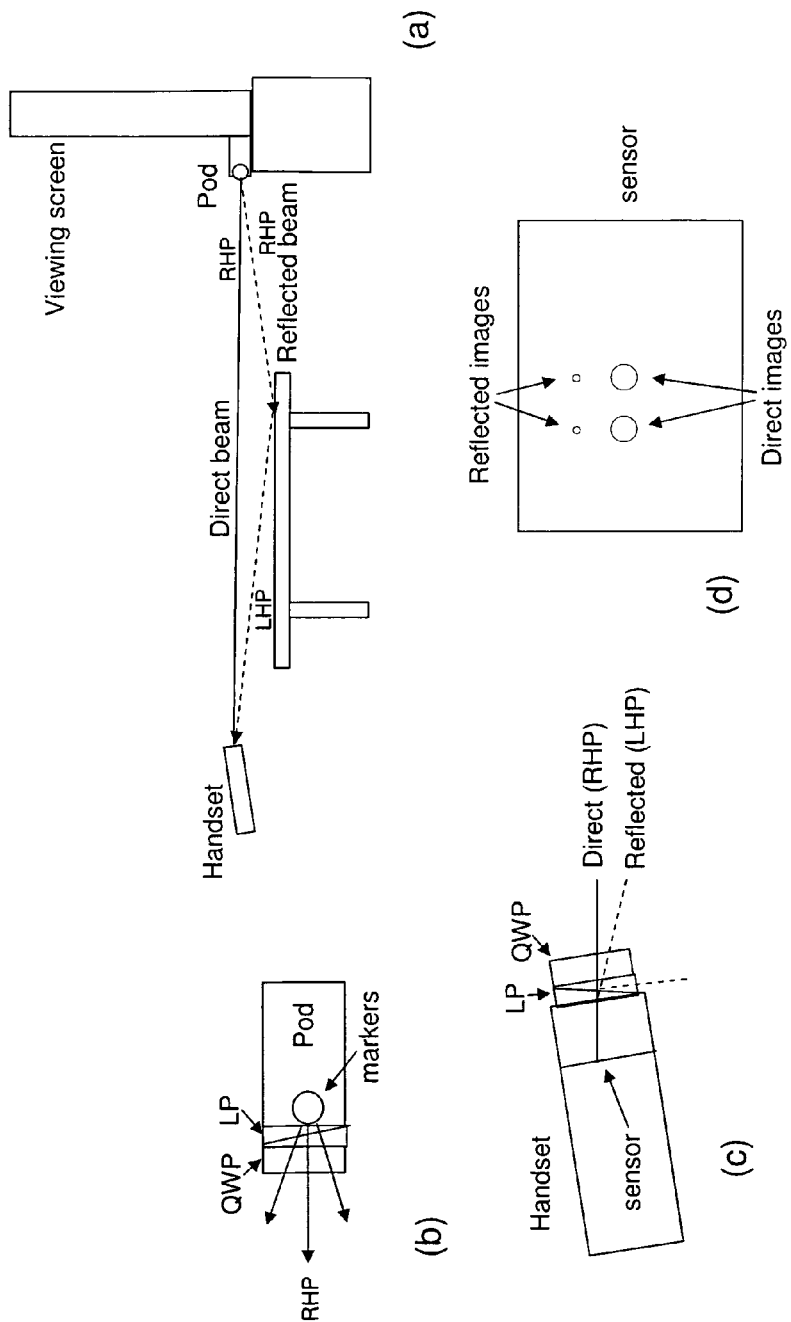

Figure 17 Example of the use of polarization to suppress marker reflections: (a) Light from the markers is circularly polarized - right-hand polarization (RHP) in this example. Light reflected from the table becomes left-hand polarized (LHP); b) a circular polarizer (CP) consisting of a linear polarizer followed by a quarter-wave plate is placed in front of the Pod; c) a complementary CP consisting of a QWP followed by a LP is placed in front of the aperture of the Handset and oriented to pass RHP and reject LHP; d) the strength of the reflected images on the sensor is greatly reduced.

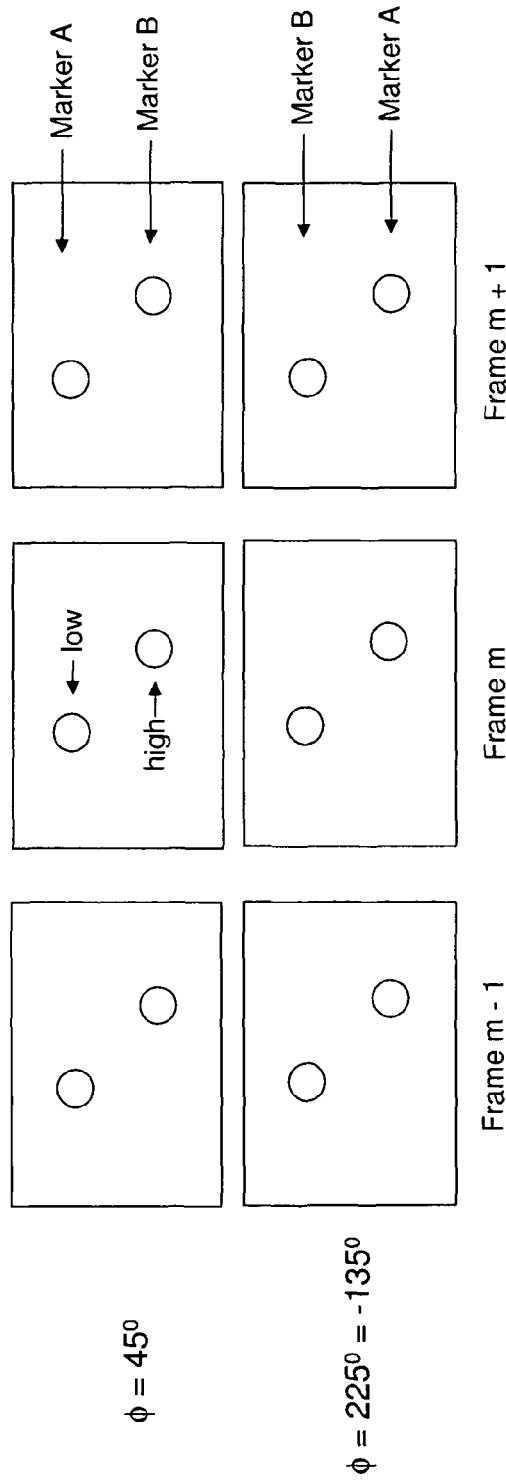

Figure 20 Marker configurations for the elimination of roll ambiguities: a) Asymmetric markers with different orientations; b) addition of a third marker (C) placed asymmetrically between A and B.

Figure 21 The use of temporal modulation for marker identification. The marker images on the sensor are shown for three consecutive frames. The power of marker A is reduced (or turned off) for one frame period every $m^{th}$ frame. Once marker A is identified, the proper roll angle is calculated based on the marker image coordinates. In this example, $45°$ is distinguished from $225°$ (= $-135°$).

FREE-SPACE MULTI-DIMENSIONAL ABSOLUTE POINTER WITH IMPROVED PERFORMANCE

RELATED APPLICATION

This application claims the benefit of U.S. Provisional Patent Application No. 60/916,730, filed May 8, 2007, which is incorporated by reference herein in its entirety.

FIELD OF THE INVENTION

The present invention relates generally to electronic system arts. More particularly, this invention relates to free-space multi-dimensional absolute pointers.

BACKGROUND

Among the several handheld devices that exist for remotely controlling electronic equipment, the free-space multi-dimensional absolute pointer stands to bring unprecedented ease of use by unifying control of nearly all devices under one simple operational paradigm that includes simple and intuitive actions such as pointing, twisting, and zooming. The underlying technology for the multi-dimensional absolute pointing device is a vision-based tracking system described in co-pending applications U.S. Ser. Nos. 11/187,387, 11/187,405, and 11/187,435, hereafter referred to as '387', '405', and '435', respectively. In the same way that the mouse and the graphical user interface brought unprecedented simplicity and user-friendliness to the PC platform in the early 1970s, with its "point-and-click" paradigm, the world of the digital living room is now seeing a rapid convergence of electronic equipment and feature sets that are overwhelming the control capabilities of traditional interfaces, such as universal IR remote controls. This is becoming ever more evident with several key consumer trends: 1) strong sales of large screen digital TVs, 2) strong demand for digital video recording (DVR) functionality (e.g., TiVo) and intelligent and interactive TV viewing, 3) pervasiveness of the internet in all aspects of human life (e.g., search, travel, purchase/sales, banking, etc.), 4) nearly complete adoption of digital cameras and camcorders, and 5) increased demand for gaming for recreational purposes (e.g., on-line games, casual games, multi-player games, etc.). As these trends converge in the living room, the need arises for a simple device and user paradigm to manage and navigate this flood of content from a sofa or chair (the so-called "ten-foot interface"). The free-space absolute pointer, henceforth referred to as the WavIt, provides such a tool by combining simple 3D pointing with a graphical user interface.

In addition to the 10-foot interface living room functions such as TV navigation and video gaming, there are many other compelling applications of the same basic technology. Conference room situations in which a presenter can remotely point to, control, and interact with a displayed presentation is one such example. Highlighting areas of a slide, drawing on the screen, moving and manipulating objects, and switching between documents are examples of the types of functions that can be performed using a direct, absolute pointing device. Other examples of applications include target (fixed or moving) shooting toys and games, remote control of moving objects (e.g., toy vehicles and planes), and precise measurement and sensing applications. In short, any application in which accurate, short range pointing and/or tracking is important is a potential candidate for the basic technology described here.

When used as an input device, the WavIt is an absolute pointer, i.e., the cursor or screen indicator always appears at the intersection of the straight line between the device face and the screen, much like a laser pointer. It works on all typical display types (e.g., CRT, DLP, RPTV, LCD, plasma) and requires only an initial simple calibration step. The WavIt also tracks other degrees of freedom, such as the user's wrist angle in absolute space, and the user's absolute distance from the screen. Some versions also track the user's location in the room. All this takes place in real time, and multiple users can be using devices at the same time, which is of particular interest for multi-player gaming and presentation environments.

SUMMARY OF THE DESCRIPTION

According to one embodiment, a system includes a handheld device having a pixelated sensor, an optical filter for passing a predetermined frequency band of radiation to the sensor and a transmitter, an electronic equipment having a display, and at least two spaced-apart markers, where each of which are positioned proximate to the display. The markers provide radiation at the frequency band passed by the optical filter. The handheld device includes a processor coupled to receive image data of the markers from the sensor for computing coordinate data from the image data. The coordinate data requires less data than the image data. The processor is coupled to the transmitter to transmit the coordinate data to the electronic equipment.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 6 shows top and side views of a 2-marker arrangement in a vision-based tracking system according to one embodiment.

FIG. 7 shows the emission pattern and operational region from the two markers after the addition of an optical element according to one embodiment.

FIG. 8 shows the emission pattern and operational region according to one embodiment.

FIG. 10 shows an idealized picture of what the pre-filtered imaging system would see, namely only the two spots.

FIG. 11 shows an example of the similar non-idealized image that would normally appear when there is poor rejection of the background and hence a poor SNR.

FIGS. 12-13 are timeline diagrams illustrating intensities of cursors for detection purposes according to certain embodiments.

FIGS. 14-15 are block diagrams illustrating a process for reducing background light according to certain embodiments.

FIGS. 16-17 are block diagrams illustrating various system effects according to certain embodiments.

FIGS. 20-21 are diagrams illustrating techniques to measure locations of markers according to one embodiment.

DETAILED DESCRIPTION

Figure 1:
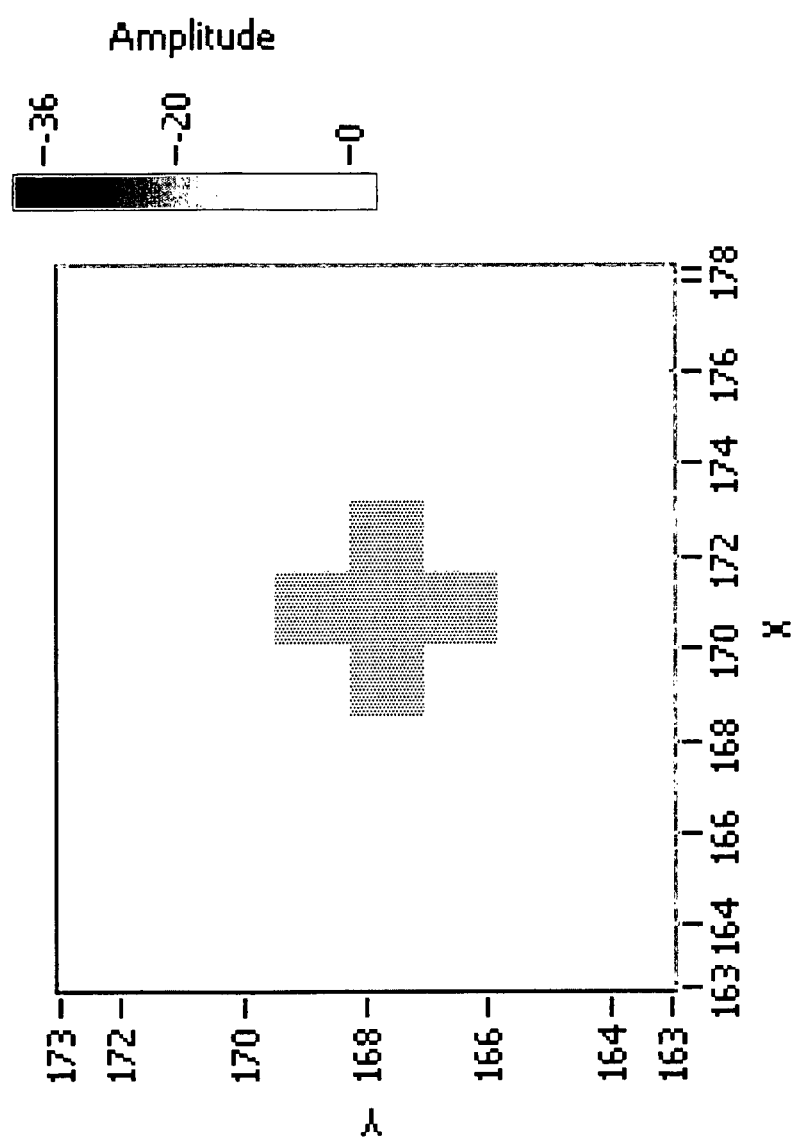
FIG. 1 is a single shot image of a typical handheld pointing device.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Overview

This disclosure describes how the core technology summarized above can be improved with key performance-enhancing features. The overall solution consists of a very sophisticated pointing device that can control all devices in a digital living room. For many applications, the solution also consists of a program that has a very intuitive User Interface (UI) to help the end-user to control various electronic devices and navigate and manipulate digital content.

On the hardware front, the enabling technology has been condensed into a handheld remote control device which at a high level acts like an absolute pointer with some properties akin to a laser pointer. In addition, the device tracks multiple degrees of freedom in absolute space, meaning that it detects where you are pointing, whether you are twisting your wrist, leaning forward, or sitting to the side of the room. The overall behavior of the system can be thought of as a combination of a localized GPS device to track where you are with respect to the TV screen, a laser-pointer to know where you are pointing, and a tilt sensor to know how much your wrist is twisted. The world of TV navigation, for example, can now be simplified into just pointing and surfing content from the lean-back position of the couch.

In one embodiment, a complete solution includes four components:

A remote control device hereafter referred as the Handheld that the end user uses as a pointing device. This device tracks the POD and calculates its own multi-dimensional coordinates. This device sends various data (including coordinates) to the POD using wireless technologies. The handheld can also receive RF commands from the POD.

A receiving device hereafter referred as the POD (Photonic Origin Designator) that receives the data from the Handheld using wireless technology. This device is attached to a computer via a USB Port (version 1.1/2.0). The receiver channels the data from the Handheld into the computer. The POD also contains the emitting reference markers (e.g., LEDs) that the Handheld uses to determine its pointing and location coordinates. The POD also has the ability to "blast" infrared (IR) signals to all other devices in the room. In this way, it may control, for example, the TV volume or the DVD playback.

The Computer (or set-top box) receives the data from the POD. This is handled by a driver, which communicates with the Handheld using the USB port. The driver will, based on the data sent, calculate coordinates and read the button presses and use these to control the PC and specific programs or environments.

All interaction happens via a Large Screen (TV or projection). This is the screen on which the content, i.e. movies or internet pages, will be displayed. It is also where additional graphical overlays may appear as dictated by the UI. The screen size is ideally between 30" and 60", which appears to be the emerging consumer sweet-spot for living-room TVs. Also, in the living room, the screen is preferably a digital TV with a good picture quality to display text as well as movies.

As described above, the solution also consists of a software program to help the end user control the pointing device. This program has been developed for the Windows and Mac platforms and communicates directly with the driver to control the device. Other operating systems, such as Linux, can be supported as well.

Basic Operations

In this section we will focus on introducing all the underlying operational principles, including how the system works, how to communicate with the handheld, and how to optimally move a cursor around on a PC screen.

1. Background:

In one embodiment, two (or more) spots are detected by the Handheld's hardware. These spots represent images of the two LEDs that are mounted inside the POD which is placed on top of or near the TV screen. A typical single spot, as seen by the handheld image sensor, is shown in FIG. 1.

Figure 2:
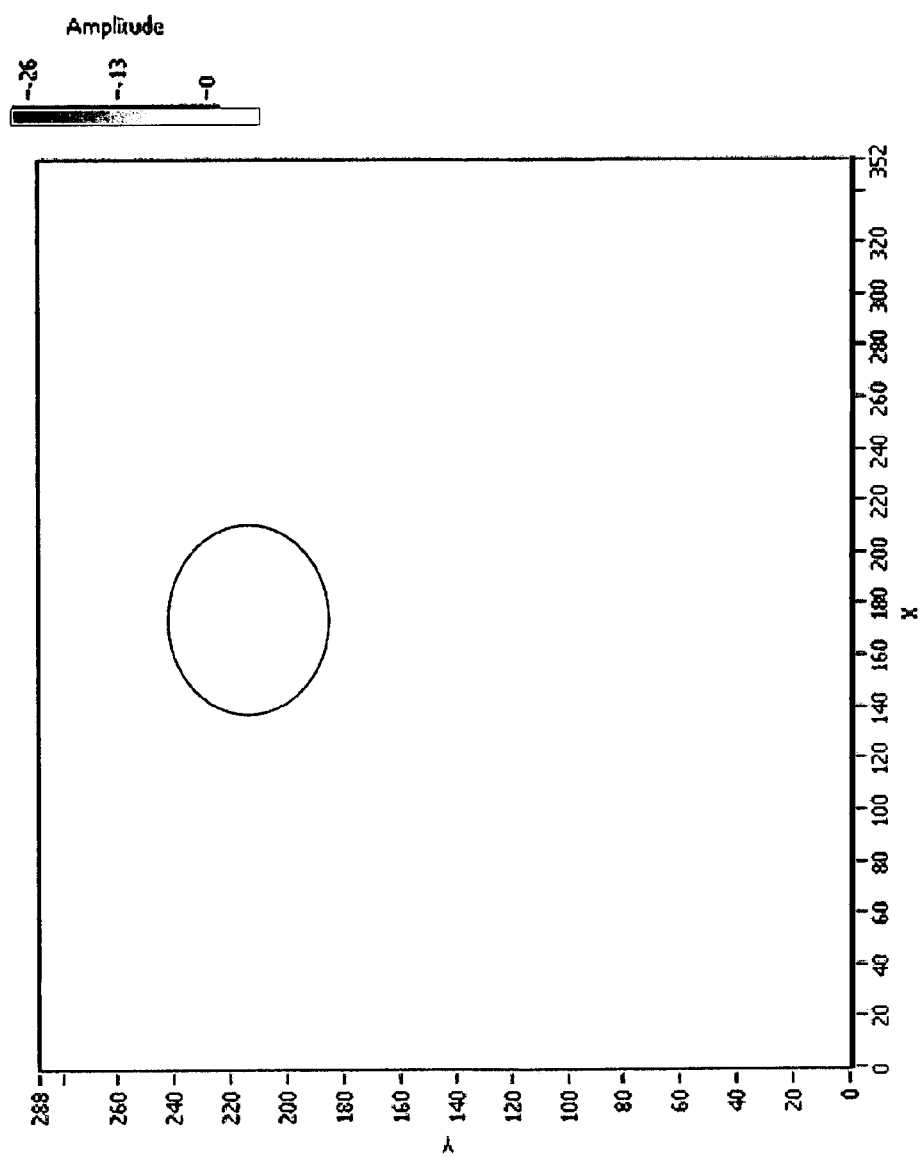
FIG. 2 is a two shot image of a typical handheld pointing device.

A set of two (or more) spots are internally processed by the handheld unit for the following information: their respective coordinates on the handheld sensor and their respective power levels or signal strengths. In addition, information regarding the on/off states of the buttons is processed. All of this information is subsequently sent to the POD which then transmits this data to the computer. A typical two spot image as it appears on the sensor is shown in FIG. 2. As is evident in FIGS. 1 and 2, the system is designed such that the sensor detects only the reference markers.

In this case, the array size in pixels is 352×288, but fractional coordinates exist and can be determined through interpolation algorithms, i.e., a spot can have a location of (251.23, 122.57). In this case, the effective resolution can be ~38800× 35200 pixels. Of course, other camera resolutions can be employed.

2. Protocol:

The Handheld hardware transmits the following:

(Key code, User Number, Battery Power, X1, Y1, P1, X2, Y2, P2)

Key code: The key press code—a number indicating which keys are being pressed.

User Number: A number (e.g., 0 to 3) corresponding to which user the data stream is related.

X1, Y1, X2, Y2: The x and y sensor coordinates of each of the two spots.

P1, P2: The signal strength corresponding to spot 1 and spot 2, respectively.

As soon as a spot is detected, the coordinates and power signals will indicate actual, updated values. Note that in some implementations there is no guarantee that spot 1 is always on the left, and spot 2 is always on the right, for example. To achieve full 360 degree unambiguous Roll data this information is required (see Roll below). Other terms that are used in the system are:

X-Pos: This is the mid-point between X1 and X2: X_POS=(×2+X1)/2. This will be used to set the mouse cursor location in conjunction with scaling and rotation transformations tailored to the physical display screen.

Y-Pos: This is the mid-point between Y1 and Y2: Y_POS=(Y2+Y1)/2. This will be used to set the mouse cursor location in conjunction with scaling and rotation transformations tailored to the physical display screen.

Distance: The approximate distance between the Handset and the POD is calculated from:

$$\text{Distance}=D_0/\text{sqrt}((C_{pixel}(X2-X1))^2+(Y2-Y1)^2)$$

where $D_0$ is a calibration scale factor that is set to a constant value that depends on system parameters such as the lens focal length, sensor pixel size, and the POD marker separation. Note that the spot separation depends also on user's viewing angle as $\cos(\theta)$. Therefore the above equation for the distance is an accurate estimate for small angles. For larger $\theta$, this equation will need to be modified based on additional view angle information.

Roll: This is the Handheld's twist angle in absolute space. The twist angle is calculated as the angle, in degrees, between the spots:

$$\text{Roll}=180/\pi*\text{Arctan}((Y2-Y1)/C_{pixel}((X2-X1))).$$

This equation applies in the standard configuration where the markers are aligned along the X-axis (horizontally). Other marker arrangements would require appropriate modifications to the Roll formula, as described in pending applications 387, 405, and 435. Here $C_{pixel}$ is the aspect ratio of the pixels on the camera, $d_x/d_y$. For example, if the individual pixels are 6 microns wide and 5 microns tall, then $C_{pixel}=6/5$.

Viewing Angle This is the angle at which the user is sitting relative to the center of the TV screen. In one implementation of the product, the viewing angle, $\theta$, may be determined by physically angling the two markers (e.g., LEDs) slightly away from each other inside the POD and then measuring each of their powers as observed by the camera. For example, when the user is right in front of the screen, both spots have the same power and the ratio is 1. When the user goes to the right, the ratio would fall, while if he moves to the left the ratio would increase. An approximate formula for the viewing angle is:

$$\theta=k*\ln(P2/P1)$$

where k is a system constant that depends on the angle between the two markers and the angular spread of the emission from the markers and may be determined empirically. This equation is exact for the case of two markers with equal powers, emission distributions that are Gaussian, and a linear detection system, where the measured signal strength is linearly proportional to the actual optical power. The above equation can be modified in cases where these conditions are not present once the system is characterized (e.g., the power and emission distributions of each of the markers). For example, in the common case where the emission distribution from the two markers is Lambertian (vs Gaussian), their optical powers are equal, and the detection system is linear, then the formula for view angle becomes:

$$\tan(\theta)=(1/\tan(\theta_0)*(P1-P2)/(P1+P2)$$

where $\theta_0$ is the angle that each of the markers is tilted from pointing straight ahead, i.e., one marker is tilted at $+\theta_0$ and the other at $-\theta_0$. In cases where the detection is not linear, then the actual powers, P1 and P2, may be inferred from the measured signals using data from an independent calibration of the system's signal versus optical power behavior. For example, in some detection systems in which the there are saturation and/or threshold levels, then the signal may take on a non-linear (e.g., logarithmic) character versus power.

However, in many practical situations, a simple formula provides a good estimate of $\theta$, especially for small view angles.

Performance Enhancements

Several features that affect the final performance of the system are discussed in this section.

1. Update Rate and Frame Rate:

The update rate (or frame rate) of the WavIt is normally hardwired at ~25-30 frames per second (fps) depending on the clock oscillator frequency and the sensor (typically CMOS) used inside the Handheld unit. Higher rate (e.g., 60 fps) operation is generally also possible. This is the rate at which information packets containing the coordinates are sent to the POD. This is perfectly adequate for providing the impression of immediate response (see also the next section on Lag time). However, to provide a visually smoother experience, it is important to introduce sub-frame updating. This is similar to techniques used in cinematography, where it has been recognized that the human vision system is more sensitive to jitter and flicker than to motion recognition. In cinematography this has led to frame rates of 24 fps with duplication of every image to give an effective rate of 48 fps. Other frame rate-related effects may be relevant in some systems, such as color break-up in projection systems in which time-sequential color (RGB) images, used for example in DLP projection systems, need to be updated at above 1000 fps to reduce the so-called "rainbow" effect. Since most typical video screens do not update at much above 60-75 fps, we only need to introduce 2 to 3 extra sub-frames between each coordinate update, although more may be used for other reasons. There are two ways to do this:

Sub-frame interpolation: This approach takes the last known cursor position ($X_{last}$, $Y_{last}$) and the most recently updated position ($X_{new}$, $Y_{new}$) and divides by the number of sub-frames, e.g., 3. With a well-known frame period, of, e.g., 36 ms, the cursor position can now be updated every 36/3 ms=12 ms with coordinates that are linear interpolations from $X_{last}$ to $X_{new}$ and $Y_{last}$ to $Y_{new}$. This approach works very well, but introduces an artificial delay of up to one frame period. This slight delay is not noticeable in many applications, and therefore this simple method is the approach of choice for a variety of applications.

Figure 3:
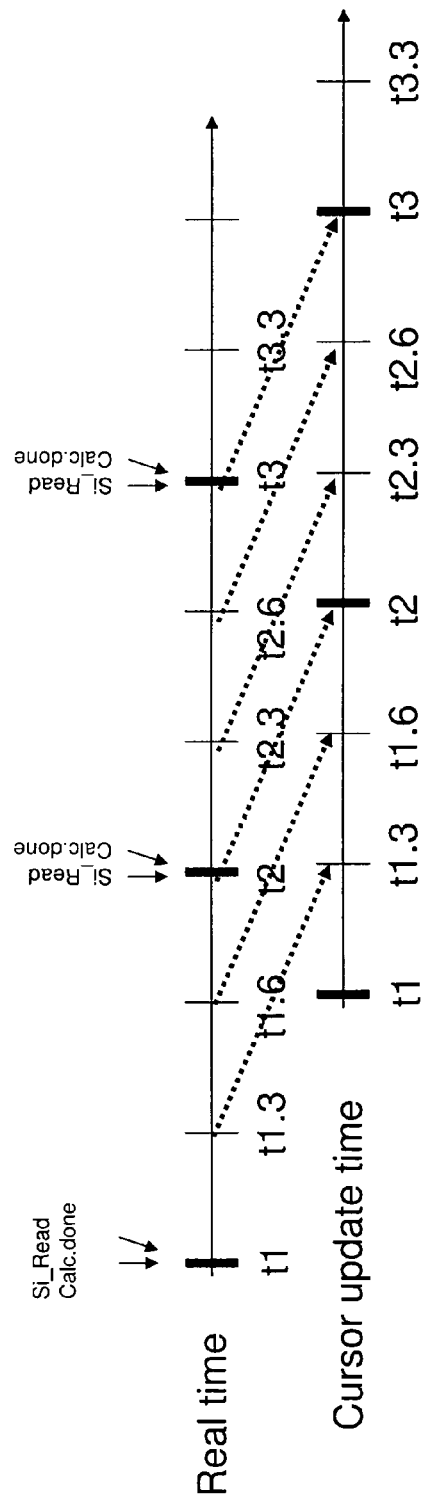
FIG. 3 is a timeline diagram illustrating a response time of a handheld pointing device according to one embodiment.

As shown in FIG. 3, for N=3, the time-lag is approximately (1−1/N)*(frame period), or ~24 ms. The larger the N the more the time delay (as it approaches 1 frame period), but the smoother the cursor moves. It should be noted that a typical PC cursor updates every 8 ms and a typical Laptop Touchpad updates every 12 ms. Therefore, there is rarely a need to have the effective frame period be less than 8 to 10 ms.

The algorithm for calculating position is:

$$X_{Diff}=X_{New}-X_{Old}$$
$$\text{For } (i=1, N) \; X(i-1)= X_{Old} + (i/N)* X_{Diff}$$

And when setting position:

$$\text{For } (i=0, N-1)$$
$$\{$$

```
         SetCursorX(i)
         Wait(Frametime/N)
    }
```

Note that Frametime should be equal to or, preferably, less than the real frame period to avoid buffer overflow, e.g., 28 ms as opposed to 35 ms.

Sub-frame extrapolation: A potentially better approach to increasing the effective frame rate is to estimate where the cursor is going. While second order polynomial or spline fits may be preferred, the first level approach is to simply use the last two readings to predict the future location. Thus, assuming that during a frame period all motion is in a straight line, we have that $\Delta X = X_{new} - X_{last}$, and $X_{future} = X_{new} + \Delta X = 2X_{new} - X_{last}$. Now, we can use the same approach as in sub-frame interpolation, and place the cursor at regular intervals between point $X_{new}$ and $X_{future}$. As an example, at time t1 we place cursor at $X_{new}$, its real position at its real time. At t1+12 ms, the cursor is placed at $X_{new} + \Delta X/3$. At t1+24 ms, we place the cursor at $X_{new} + 2\Delta X/3$. And finally at t1+36 ms, we start over with the next X position. The same equations apply for the Y coordinate of course.

2. Lag Time:

Another aspect of the responsiveness of the WavIt is the delay (or lag time) between the Handheld unit's real motion and the final updating of cursor movement on the screen. The total lag time includes delays due to image acquisition, the coordinate calculation by the micro-controller, the wireless transmission (including on-chip buffering), the communication from the wireless chip to the micro-controller to the USB chip, the USB transmission to the computer (e.g., PC), and the final operating system (e.g., Windows) driver reading and displaying of the cursor. It is desirable for the total lag time to be as small as possible, and, in general less than 10 ms is acceptable. Therefore, every step in this chain should be optimized.

One of the biggest contributors to the lag time is the artificial lag induced by the interpolation process described above. The best way to improve this is to remove or minimize the need for interpolation. This can be done by increasing the frame rate to, e.g., 60 or 90 fps, provided that the hardware permits such rates. The imager needs to support the higher frame rate and the micro-controller and image analysis needs to be able to keep pace with the faster frame rate. Both of these are technically feasible, but may incur somewhat higher cost and power consumption, and the optimal solution depends on finding the right system compromises depending on the application. For gaming applications, for example, it is conceivable that faster response (shorter lag time) is needed, but for simple TV navigation and remote control, this is not as important. Finally, it should be noted that there is typically no need to reduce the lag time below 15 to 30 ms since the user will be unable to discern anything faster than the update rate of the screen.

3. Pointing Stability:

The degree to which a user can hold his hand stable while pointing at a small object varies from user to user. In general though, some degree of variable or dynamic stability enhancement is desirable. However, this has to be balanced against the user's desire to have immediate response, especially during tasks that require fast moving from one side of the screen to another. In order to stabilize the cursor, some form of filtering of the coordinate data is required. Various types of filters may be used, including finite (FIR) and infinite (IIR) impulse response, and the choice and design of the filter typically involves some degree of tradeoff between stability and responsiveness. This balance can be achieved in the following way. Running averages, a simple type of FIR filter, of the coordinates may be implemented in order to stabilize the coordinates. The ideal implementation employs some form of dynamic running averaging of the coordinates. As a specific example, when the Handheld unit, and thus the cursor, moves fast, there should be little or no averaging, but when the Handheld/cursor moves slowly, it is assumed that the user is trying to point at a specific object on the screen. In this case, a running average of the coordinates over several frames is introduced. This corresponds to an averaging time that can be approximately hundreds of milliseconds.

In one embodiment, the dynamic averaging algorithm introduces two parameters—the "viscosity" and the "threshold". When the Handheld/cursor motion is below a certain threshold speed, the running average algorithm will start accumulating data points until it reaches the viscosity frame number, i.e., the number of frames chosen for the averaging, or equivalently, the averaging time. For example, if the threshold is set to 2 sensor pixels per frame period, then when the pointing motion falls below this value (2 pixels/frame), a running average will begin and continue for every frame until it reaches the preset viscosity number of, for example, 7. At this point, the cursor position is actually an average of the cursor positions during the 7 most recent frames. The cursor will continue to be displayed as the average of the 7 most recent frames until the user starts moving the Handheld (by either pointing or displacing the unit) such that the cursor moves faster than the threshold rate. At this point the number of frames of averaging is reduced by 1 for every subsequent frame until there is no averaging at all. This algorithm has been found to give a good balance between immediate response and pointing stabilization, without introducing artifacts such as jerkiness or overshooting/undershooting.

Beyond the cursor position, there are other parameters that may be stabilized or averaged over time. The best stabilization parameters are generally functions of the specific task being performed and an algorithm can be constructed to adaptively adjust these parameters. For example, the determination of distance to the screen may need to be averaged over ~10 frames, while the roll may need only 3 to 4 averages. The view angle may require even more averaging of up to 30 frames. Also, it should be noted that both the averaged and raw values should be accessible by all parts of the driver program. This is important because it may be necessary to use averaged values for things like continuous recalibration of pointing based on the user's location in the room, while simultaneously using raw values for quick joystick-like lateral motions.

4. Virtual Key Presses and Screen Boundaries:

Key presses are typically updated at the frame rate of ~25-30 times per second. This has been deemed sufficient. In addition to the buttons, other actions may be treated as virtual buttons. These include pointing below (or above/right/left of) the screen while pressing a specific "control" button. Similarly, for example, if the handheld unit is twisted (i.e. rolled) greater than 20 degrees and the "control" button is pressed, then this may also be registered as a virtual button press. Also, if the handheld unit is moved closer to the screen (or pulled away from it) while holding the "control" button, then this may be registered as a virtual button press. By using pointing and waving actions and the "control" (or some other specified button) modifier button in this way, the number of effective (physical plus virtual) buttons can be increased.

It is possible to have many more virtual buttons and actions. Each physical button could act as a modifier or "Midas Touch Prevention" button for a new set of actions. In one embodiment, pressing the upper right hand button on the Handheld while pointing above the screen corresponds to the "PC Volume Up" function, while the same physical button with a left-twist virtual button can be linked to the "Browser back" command. The center button can be linked to the "left click" button of a standard mouse, and in general it is best to have this permanently assigned to this function.

In general, two more aspects of button presses should be monitored: 1) how long have they been pressed, and 2) have they been pressed twice (i.e., "double-clicked"). The first is commonly used in, for example, determining whether to drag-and-drop an item that has been selected with the center ("left-click") button. Conversely, the double-clicking is a common method for activating programs or opening folders in a PC environment.

Finally, the actions the button presses are linked to are fully programmable in the following hierarchy: Operator-Mode-Action. Thus, each Operator (e.g., John, Anders, babysitter, Guest, etc.) can program multiple Modes (e.g., Media Center, Presentation, PC, Browsing, Battlefield 2, etc). In each Mode the buttons can mean different things. For example, pressing the center button may mean "left mouse click" when Operator John is in PC Mode, or it may mean keyboard press "w" when Anders is in "Battlefield 2" Mode.

In summary, a utility or UI program needs to track button presses, how long they have been pressed, and whether they have been double clicked. It also associates each button press to a programmable action or series of actions.

5. Key Presses and Mouse Clicks:

One of the difficulties that the user experiences when using a remote pointing device such as the WavIt is that the free hand is inherently somewhat unstable, even when some degree of stabilization is employed. Some aspects of pointing stability are addressed in Section 3 but another aspect involves the act of point-and-select (or clicking on) an item on the screen. Operating systems such as Windows are configured to look for "clicking" and "dragging". Unfortunately, unless the user has a very stable hand or the software stabilization settings are set very high, there is a high probability that a user's "click" on a small object can get interpreted as a "drag" due to small motion during the "click" action. This unintended consequence is clearly an undesirable user experience. Furthermore, double-clicking an object relies on both clicks being done in rapid succession, in very close proximity to each other. Thus, double-clicking is even more difficult than single clicking. These issues can be addressed in the following way:

Click-still: One way to solve the double-click problem is to introduce a "Click-still" functionality. This basically stops all movement of the cursor for a predetermined period of time, e.g., 300 ms, after an initial click by setting the Windows command Mouse_on=False (or SetActivateCursor(false)). This allows enough time to double-click. An alternative method is to have the driver software look for two temporally close clicks and actually send a "double-click" command to the operating system.

It should be noted that this "click-still" approach may be undesirable when some activities, such as game play, which may require rapid point-and-shoot functions, or when drawing on the screen. This may be accommodated by programming the "click-still" function to be an externally settable option (on/off). More advanced methods may be implemented. For example, the software running the UI may recognize when a user is attempting to click or double-click an object (e.g., by monitoring the dynamic stabilization settings) and then automatically set the "click-still" function accordingly.

Figure 4:
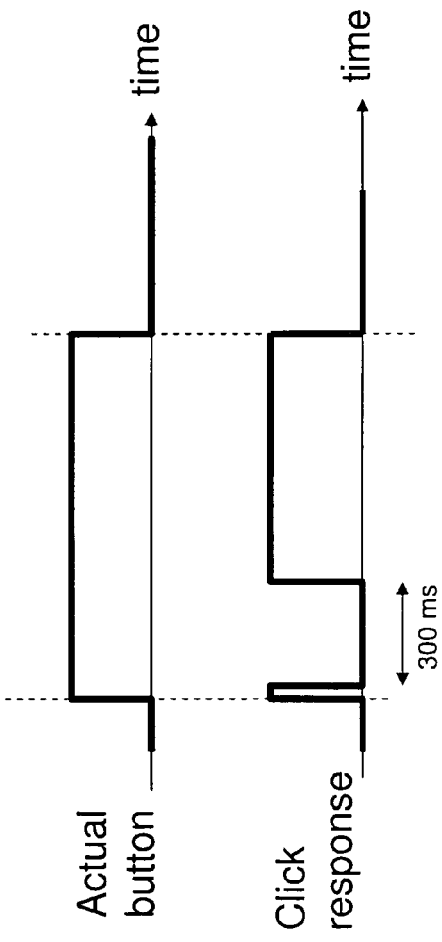
FIG. 4 is a timeline diagram illustrating a response time of a handheld pointing device according to one embodiment.

Click-wait-hold: To avoid false detection of "dragging" when the user is trying to click, the function shown in FIG. 4 is applied when a Left-Mouse button equivalent is pressed.

When the button is pressed, it causes a Windows Mouse_event to be set to down-up. This ensures that there will never be a misinterpretation of "dragging" when trying to click to select. If the user continues to hold down the button, it signals that he was actually intending to drag. After a predetermined period of time, e.g., ~300 ms, holding down the key, a follow-on command is sent which is the Mouse_event down. When the button is released it is Mouse_event up.

6. Absolute and Relative Operation Modes:

As described previously and in co-pending applications '387', '405', and '435', the vision-based pointing and tracking system, upon which the WavIt device is based, is inherently an absolute sensing system. This means that all of the degrees of freedom tracked by the system are determined in absolute spatial coordinates. There are a total of six degrees of freedom (DOFs) required to completely and uniquely define an object's location and orientation in three-dimensional space—three each for location (e.g., x, y, z) and orientation (e.g., $\theta_x$ or pitch, $\theta_y$ or yaw, $\theta_z$ or roll). These may be transformed into other, equivalent, coordinate systems, and, for the WavIt, they correspond to the location and pointing data about the device. Depending on the specific system configuration, any number of the 6 DOFs may be tracked. In general, the system complexity increases with the number of DOFs to be tracked. Therefore, the system is typically designed and optimized for the specific DOFs required for the application(s) of interest.

An absolute coordinate system is one in which the coordinates are determined relative to one or more fixed reference points (e.g., a map, GPS navigation, or many vision systems). In contrast, a relative coordinate system is one in which either the reference points are not fixed and only have relevance on a local scale or for a brief period of time or reference points do not exist. In such systems, an object's coordinates are typically tracked as changes—there is no sense of its global position or orientation, only how its coordinates have changed over some time period.

Most traditional input and pointing devices used for navigation of a UI are inherently relative in nature. The standard mouse (optical and mechanical) as well as devices such as "trackpads" and "touchpoints", based on, for example, capacitive sensing, are all relative devices. More advanced technologies used, or suggested, for "free-space" pointers, such as inertial sensors and some optics-based approaches (using for example image correlations), are also typically relative. In practice, this means that, for such devices, there is no unique relationship between the pointing device's specific coordinates (position and orientation) and the cursor location or the user's interaction with the UI. Sensors such as accelerometers that sense acceleration or gyroscopes that sense rates of rotation are examples of relative devices that have no spatial reference points—they are in essence blind and only detect motion or changes in motion. Optical mice, on the other hand, typically use displacement (via spatial correlations) of low resolution images versus time to gauge motion. Each image serves as the reference for subsequent images; however, since the reference images are constantly changing, the tracked motion of the mouse is, in effect, relative.

For many applications and UI environments, it is desirable for the user to have a more direct and intuitive interaction with the displayed content. Direct pointing at a screen (like with a laser pointer, for example) is one clear example where some degree of absolute tracking is desirable or necessary. Functions that require, or may benefit from, knowledge of a device's tilt (with respect to the earth, for example) or its position (including distance) with respect to a fixed object (such as a screen) are other examples where absolute tracking is useful. The vision-based pointing and tracking system described here and in '387', '405', and '435' is one such system that permits absolute tracking. For some other applications, it may be useful or desirable to operate in a relative mode. For example, some programs and games are designed and optimized for inherently relative input devices where all that matters is the user's relative motion.

A key point is that any absolute sensing device can be made to behave as a relative sensing device, but the converse is not true—relative sensing devices can never operate in an absolute sensing mode. This fact is an inherent potential advantage of absolute sensing devices, and thus of the vision-based pointing and tracking system, i.e., VisiTrac. Described here are methods, by which VisiTrac and systems based on it, such as the WavIt, can operate in both absolute and relative modes, simultaneously or sequentially.

As described above, the VisiTrac system inherently operates in an absolute mode. The marker coordinates on the sensor that are tracked and used to determine all absolute position and orientation data are referenced to fixed points in space. At any point in time, the tracking can become effectively relative by simply comparing the current (absolute) coordinates with those at some known previous time or series of times. The change in coordinates can then be used to determine the change in any or all of the measured DOFs over the specified time period. In essence, there are now two references—a global, fixed reference (the physical markers), and a local, moving reference (the marker images moving on the sensor). In practice, these two modes correspond to tracking the actual coordinates of the marker images (x, y) and the change in the coordinates of the marker images ($\Delta x$, $\Delta y$) over time. Thus, the relative mode of operation is similar to the "moving reference" (versus "no reference") type of relative tracking since a visual reference is always required.

Figure 5:
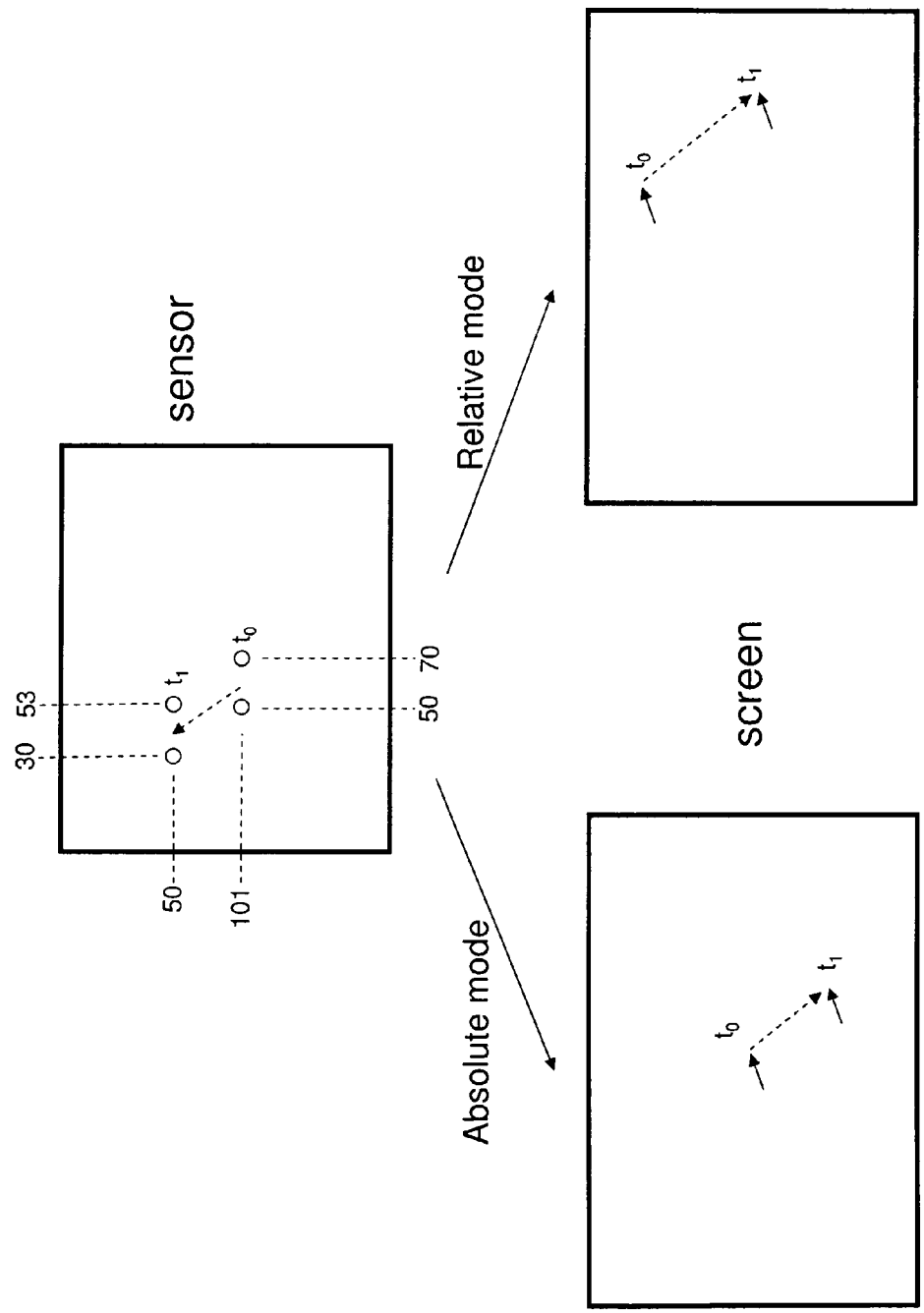
FIG. 5 is block diagram illustrating different operating modes of a handheld pointing device according to one embodiment.

As a specific example, the user is, at some time, $t_0$, pointing the Handheld unit such that the image coordinates of the two markers on the sensor are (50, 101) and (70, 101), and then at $t_1$ have moved to (30, 50) and (53, 50), respectively. Note that, in this simple example, the user's pointing (in both x and y) and distance from the markers have changed, but the roll angle of the Handheld has not changed from to t1. Also note that integer pixel coordinates are used here for simplicity; in practice, fractional pixel resolution is possible, and is normally used to achieve higher pointing resolution, as described in '387', '405', and '435'. These coordinates are then transmitted to the receiver and computer, processed and translated into the corresponding pointing and tracking data. FIG. 5 illustrates this example.

In the normal (absolute) mode of operation, the pointing and tracking data correspond to unique parameters (the cursor position on the screen, the distance from the screen, and the roll angle of the Handheld). With proper calibration, this results in direct pointing and absolute measures of roll and distance. In relative mode, it is the change in the coordinates that matter, i.e., one set of coordinates serve as the reference for the subsequent set. Therefore, in the above example, ($\Delta x$, $\Delta y$)=(−20, −61) and (−17, −61) are the relative coordinates for each of the two images, respectively, during the time period $t_1$-$t_0$. These relative coordinates now represent the changes in the pointing and tracking parameters of interest.

Here, there is no unique correspondence between the relative coordinates and the actual location and orientation of the Handheld unit. FIG. 5 illustrates the two modes of operation for this example. This property is similar to the way a conventional mouse works. By processing the relative coordinates, the changes in pointing can be determined. However, the changes in the other DOFs (distance, roll) cannot be accurately determined from only ($\Delta x$, $\Delta y$). This is because both of these quantities depend on the actual marker image separation at each time point, information that's lost in the conversion to ($\Delta x$, $\Delta y$).

An alternative, and equivalent, method for converting the image coordinates to relative mode that permits continuous tracking of changes in all DOFs is to simply track (versus time) the absolute DOFs corresponding to the image coordinates. Of course, this is what is done in the absolute mode of operation. In this case, all DOFs are computed at each time point and the difference in the DOFs of interest from $t_0$ to $t_1$ can be easily determined. In general, when only relative pointing is desired (e.g., the 1-marker configuration), then both methods will work and are effectively equivalent; however, when relative changes in the additional DOFs (distance, roll, location of Handheld) are desired (i.e., multi-marker configurations), then one calculates the absolute DOFs from the image coordinates first and, from these, determine the relative DOFs. The additional computation required for this method is fairly small and thus this is the preferred embodiment for relative mode operation. The example used here used (FIG. 5) two points in time, but the procedure can be extended to N points depending on the duration of relative mode operation.

In general, the relative mode operates in the following way. A time series of absolute DOFs are defined as follows: [X, Y, L, $\phi$]($t_0$), [X, Y, L, $\phi$]($t_1$), . . . , [X, Y, L, $\phi$]($t_n$), where (X, Y) are the screen coordinates corresponding to the marker image coordinates (x, y), L is the absolute distance from the markers/screen, and $\phi$ is the roll angle of the Handheld. Additional DOFs, such as location or view angle of the Handheld may also be included in the set if they are measured. The relative DOFs for this example would simply be: [$\Delta X$, $\Delta Y$, $\Delta L$, $\Delta \phi$]($t_n$), where $\Delta X(t_n)=X(t_n)-X(t_{n-1})$, $\Delta Y(t_n)=Y(t_n)-Y(t_{n-1})$, $\Delta L(t_n)=L(t_n)-L(t_{n-1})$, and $\Delta \phi(t_n)=\phi(t_n)-(t_{n-1})$, for n>0. The relative DOFs at each point in time are determined simply by how each has changed since the previous time. Typically, the time period ($\Delta t=t_n-t_{n-1}$) is one sensor or display screen frame period. Note that this example pertains to the reference DOFs lagging one time period, $\Delta t$, behind the current DOFs. In general, the reference DOFs can be the set of DOFs at any point in time preceding the current one.

Because in the relative mode of operation there is no direct or absolute connection between any particular absolute DOF and the corresponding relative one, it also possible to incorporate scale factors or offsets that can be used, for example, to reduce or enhance the sensitivity of a control. The general expression for the scaled relative mode is $M_x(\Delta X)+\Delta X_0$, where $M_x$ is the scale factor which can, in principle, take on any value, and $\Delta X_0$ is any offset in $\Delta X$ that may be desired. The other DOFs have corresponding expressions. For example, a small value of $M_x$ (e.g., 0.1) represents a reduced sensitivity for pointing in the X direction, a value of 1 represents direct pointing in X, and a larger value (e.g. 10) represents an increased sensitivity in X. Note that the scale factors and offsets do not have to be constants, but could vary as functions of time, coordinates, or some other parameter. These scaling properties of the relative mode are analogous to the speed and acceleration settings in a standard computer mouse. It is also possible to use non-linear functions of the DOFs as the inputs to some action or control (i.e., $M_x(\Delta X)$ becomes $M_x(\Delta X)^n$, where n any number). Also note that the scaling and offset factors may also be applied to the absolute DOFs instead of the relative ones (by essentially replacing, for example, $\Delta X$ with X in the scaling expressions). This represents another mode of operation which is best described as absolute, but non-direct, since the actions and controls are mapped to scaled and offset functions of the absolute DOFs. Finally, note that the scaling and offset factors are effectively equivalent to a generalized version of the calibration factors required in the standard absolute operation mode.

Having described above how the relative mode works, next is a discussion of applications or scenarios where it may be useful. As described above, the relative mode may apply to any or all of the DOFs that are detected. Here are a few examples of how some of the DOFs could be used in a relative mode. The pointing-related DOFs (X and Y) operating in relative mode might be employed in situations where it is desirable to emulate a standard (though free-space) mouse. Many software programs, including most PC-based video games, are designed to operate with a mouse as the input device. Therefore, it may be preferable to transition to a relative mode when using such applications. The transition to relative mode could be enabled by, for example, the user holding down a button or selecting this mode from an on-screen menu. The press/release of a button, for example, could be analogous to the act of lifting (or disengaging) an optical mouse. Recall the VisiTrac requirement that the user's pointing remain within the sensor's field-of-view (FOV) of the reference markers. This aspect could also be used as a mechanism to disengage the relative (or absolute, non-direct) motion of the cursor. For example, when the pointing reaches a predetermined threshold close to the edge of the FOV, the cursor becomes disengaged. When the user then points back to the screen (or within the usable FOV) and presses a button, the cursor re-engages starting from its last position. This is similar to the behavior of a mouse when it reaches the end of a surface. Note that, because absolute coordinates are always tracked, the user could resume absolute or direct mode operation at any time.

Similar ideas can be applied to the other DOFs. The sensing of roll, or tilt, can be mapped to a "virtual dial" function, where the user twists the Handheld unit while pointing in the vicinity of the screen. In the normal (absolute) mode, there is a one-to-one correspondence between the roll angle and some action or function (e.g., volume level). This has some inherent advantages since, unlike a physical dial, there is no need to turn it through the intermediate angles to change the setting. However, in some situations, it may be beneficial to have a virtual dial that operates more like a physical dial. In this case, a relative mode for the roll DOF could be used. For example, the reference could be the initial setting (e.g., volume level or tilt angle in a flight simulation), and when the user engages the control (for example, by pressing a button), the setting changes relative to the initial value as the user's roll angle changes. Of course, scale factors (linear and non-linear) and offsets may be included, as needed.

Distance sensing may also be used in a relative mode. In fact, for many applications, it is natural to tie functions to the user's relative distance from the screen. A zooming function on a picture or web site for example may be enabled by the user moving the Handheld unit closer to or further from the screen while holding the appropriate modifier button. In this case, it is generally the change in the distance (referenced to the distance detected upon button initialization) that is of interest and thus relative mode operation would be used. On the other hand, for some other applications, such as precision measurement or some interactive video games where a player's actual distance from the screen is used as input to the game, absolute distance sensing is important. Again, both modes are accessible, either alternately or simultaneously.

There are many other instances where a relative or perhaps non-direct mode may be applicable. An example where it may be desirable to have absolute operation, but with an offset that creates non-direct pointing, is where the POD (which contains the markers) is placed far from the screen such that the sensor's FOV does not permit direct pointing at the screen. In this case, it may be useful to have the user point away from the screen, in the direction of the POD, yet still have an absolute (one-to-one) connection between the motion of the Handheld unit and the movement of the screen cursor. This type of operation, though it involves non-direct pointing is typically handled using the offsets generated in the calibration procedure for normal operation.

Another situation where a relative or non-direct mode may be useful is when the user is trying to point at small objects or targets on a screen. A standard method to aid in this task is to apply some degree of time averaging to the coordinates, as described in the section on pointing stability. This has the effect of smoothing any fluctuations or shaking of the user's hand, but also slows the response of the pointing. Another approach is to use some form of relative and/or non-direct pointing to aid with precision pointing tasks.

In one embodiment, when the user is trying to point at a specific object, a button is pressed that indicates that the mode should be switched to relative. At that point, the cursor position is determined only by changes in the user's pointing. Furthermore, the scale factors for X and Y can be reduced in order to reduce the sensitivity and improve the stability of the pointing. This is effectively equivalent to changing the calibration constants as if a larger screen is being pointed at. Note that, as the scale factors or calibration constants are changed, the offsets also change in order to compensate and leave the cursor at the same location but with a reduced sensitivity to pointing. Various methods for transitioning in and out of this relative mode exist. A simple one is to have the mode transition tied to a specific button press—when the button is pressed, the user is in relative mode, and when released, the user reverts to absolute mode. In some cases, it may be preferable to not have to hold a button. Here, the user can toggle or click a button to enable relative mode. At that point, the system will remain in relative mode while the user is pointing within some predefined region around the sensor coordinates at the time of the button click.

In yet another embodiment, the transition to relative mode can be made to be dynamic or automatic as opposed to the user having to manually enable the transition. For example, in most cases when a user is trying to hit a target (e.g., in order to click on or open a file), the speed at which the cursor is moved is reduced. Once the cursor slows enough to cross a speed threshold, then the system can automatically move into the reduced sensitivity, relative mode. This is equivalent to the user effectively zooming in to the target region making it easier to select the object of interest (even though the displayed objects do not change size). A limiting example of this type of relative mode of operation is one where the cursor stops moving completely (i.e., minimum sensitivity) when the "virtual" cursor (i.e., the absolute cursor coordinates as determined by the Handheld unit) has slowed below the predetermined threshold speed. When the virtual cursor speeds back up above the same, or perhaps different, threshold, the system may revert to normal absolute pointing. There are several ways in which the system can transition out of the relative mode once the Handheld unit's pointing coordinates change faster than the threshold. In one embodiment, when the virtual cursor speed exceeds the threshold, the screen cursor coordinates transition to those for absolute pointing immediately (or within a few screen frame periods). This method presents the fastest transition back to the absolute pointing mode, but it can result in sudden jumps of the screen cursor, especially if the virtual cursor coordinates are changing rapidly as the system transitions out of relative mode. In another embodiment, the system may more gradually have the screen cursor "catch up" to its absolute coordinates over several or more screen frame periods after the virtual cursor speed crosses the threshold for absolute pointing. This method has the advantage that the screen cursor will not jump rapidly to its new absolute location but will gradually catch up over some pre-determined time period (e.g., 0.5 to 1 second) or number of frames (e.g., 15 to 30). However, it also has the property that the cursor will lag behind its true direct pointing coordinates during the catch-up period. In another embodiment, the cursor essentially remains in a relative mode when the virtual cursor speed is greater than the threshold by moving the screen cursor only in response to detected changes in the absolute pointing coordinates without regard to the actual true pointing direction. This method has the advantage that the screen cursor will transition out of the low sensitivity (or stopped) mode and into the standard sensitivity (though still relative) mode more smoothly and thus may permit more controlled small movements of the screen cursor. It has the disadvantage of any relative pointing mode that the connection between the direct pointing of the Handheld unit and the screen cursor may be lost. In some embodiments, this connection may be re-established by adjusting the screen cursor coordinates (and thus moving the cursor) when the virtual cursor coordinates correspond to some specific reference screen coordinates, such as a screen boundary or screen center. This serves the purpose of re-positioning the screen cursor with the true pointing coordinates of the Handheld unit, but may also have the effect of causing the cursor to move suddenly during this re-positioning period. These general approaches have similarities with dynamic averaging for pointing stability mentioned earlier, but have the advantage of not introducing a lag time to the operation. These concepts may be applied to the other DOFs such as distance and roll.

7. Cursor Locking and Anchoring:

In some use scenarios, it may be desirable to temporarily disable or hide the screen cursor during certain tasks. During these periods the absolute pointing and tracking properties, while still enabled, may not be apparent to the user. The concept is simple—when the cursor-locking function is enabled, the cursor freezes on the screen regardless of the user's actions with the Handheld unit. Essentially, the driver that updates the screen cursor is turned off so that the cursor does not move during the cursor-locking period. This procedure is equivalent to the calibration constant being set to zero so that the cursor sensitivity is also zero. Once the cursor-locking mode is exited, the cursor may either immediately jump to the current direct-point location, or begin moving relative to its locked location.

The most obvious scenarios where cursor locking would be used are those situations where the user is not interested in pointing while performing some other task. For example, during a twisting or rolling operation, such as changing the volume, it is generally not important to indicate exactly how the Handheld is pointed. In this case, cursor locking may be useful. Another scenario involves the distance sensing DOF, L. For example, if the user is zooming in or out on a displayed scene using a push/pull action with the Handheld unit (thereby changing L), in many cases, the exact pointing direction is not of interest and showing it via the cursor may even be a distraction. This is a case where cursor locking may be enabled during the zooming operation. In general, any action, whether it is based on DOFs, button presses, or some other input, may incorporate the cursor-locking feature.

Related to cursor locking is the concept of anchoring in which the cursor remains in a substantially fixed location but may move slightly based on user actions. For example, the user may be able to drag the cursor in specific directions by exaggerated pointing gestures. The implementation of this effect is essentially the same as that for achieving reduced sensitivity or sluggish response in relative mode operation described in the previous section. This effect may also be achieved in some embodiments by using signal processing methods such as filtering and averaging, as described in section 3, to slow the response and create a dragging effect on the cursor. The extreme limit of anchoring in which the cursor does not move at all is equivalent to cursor locking.

Another concept related to disabling the cursor is one where the cursor itself is made to disappear entirely from the screen during some action, such as twisting or zooming for example. In some situations, this may be preferable to just locking or anchoring the cursor.

Depending on the operation mode, the cursor would re-appear after the end of the action. The mechanism by which the cursor function (locking, anchoring, or vanishing) is enabled or disabled may be either manual (through pressing or toggling certain buttons) or automatic (e.g., when the user begins to twist the Handheld unit, the cursor automatically locks or disappears). Finally, the concepts described here for the screen cursor also apply to other screen objects or icons that may be manipulated by the user.

8. Dynamic Sensor and Marker Control:

One of the key elements in the VisiTrac system is the image sensor. Its primary purpose is to detect and track the coordinates of the marker images as the user points and moves the Handheld unit. Some of the key properties that describe the operation of the sensor are its sensitivity and dynamic range. These parameters determine basic operational characteristics of the system such as range, as well as discrimination against background signals and noise. In general, there are three main settings that are used to adjust the sensor properties: exposure, gain, and threshold.

In the simplest mode of operation, these settings are fixed. Ideally, they are optimized for normal operating conditions and then set at the appropriate levels. However, one consequence of this approach is that the system's operational range and robustness to changes in ambient conditions are limited. By incorporating some degree of adjustability (either manual or preferably dynamic) of the sensor settings, the system's overall performance can be enhanced. For example, as a user moves away from the markers, the optical power reaching the sensor decreases. If static settings are used, then the user will reach the end of the operation range for those settings at the point where the signal level falls below the system's minimum detectable signal. By increasing the gain and or exposure settings, the sensor's sensitivity, and thus signal level at a given distance, is increased, thereby increasing the operating range. Similarly, as the user moves closer to the markers, the sensitivity can be decreased to keep the signal below the system's maximum detectable signal (e.g., saturation), thereby permitting operation closer to the markers or screen. In another example where the ambient lighting conditions change over time, the threshold setting may be adjusted to compensate for the changing background signal levels. In some cases, it may be necessary to also adjust the exposure and gain settings to obtain optimum performance that is robust against changing ambient conditions.

The adjustments of the settings require some form of input signal(s) that is used to determine the degree and direction of the required changes. In one embodiment, the "input signal" is simply the user observing the functionality of the system and then manually making the required adjustments. For example, the user moves far from the screen, close to the system's nominal maximum operating distance. In this region, the performance degrades (e.g., the cursor response is sluggish or intermittent), and the user then increases the sensitivity through specific buttons or on-screen menus so that the performance improves and the range increases. A similar manual procedure could be employed when the user is close to the screen and the sensitivity may be reduced. Although this procedure works in principle, it may be inconvenient to use in practice.

A preferred embodiment is one in which the sensor settings are adjusted automatically by the system's central processor or control unit. In this case, one or more signals are used as inputs in conjunction with an algorithm to determine how the settings should be adjusted. There are many types of signals and combinations of signals that could be used as inputs to implement dynamic sensor control. A simple and obvious one is the detected marker signal itself. In some detection schemes, described elsewhere in this disclosure, the signal strength is effectively proportional to the size of the marker images (spots) on the sensor. In other detection schemes, the signal is linearly proportional to the optical power on the sensor. Regardless of the detection method, the signal strength can be used as input to an algorithm that computes how the settings should be adjusted in order to optimize performance (e.g., increase range, reduce interference). Those adjustments are made to the appropriate settings of the sensor controls by the Handheld's microcontroller. A simple, yet effective, example of dynamic sensor control is one where the input to the sensor control algorithm is the average of the signals from the two or more spots. In some cases, it may be preferable to use the larger or smaller of the two signals as the input. As long as this input signal remains within a certain predefined range, then the sensor settings are left unchanged.

When the signal drops toward the lower end of the range, the electronic gain and/or the exposure levels of the sensor are increased as needed (up to certain maximum levels) in order to keep the input signal within the acceptable range. When the input signal moves toward the upper end of the range, the sensor settings (gain, exposure) are decreased to keep the signal within the specified range. At some point (e.g., when the user is close to the screen), the sensor settings reach their minimum values and the user may not be able to move much closer before the signal reaches its maximum level where the optical power is too high, the spots are too large, or the spot separation exceeds an acceptable FOV for the camera. If the minimum operating distance is limited by signal strength, then it is possible to reduce this distance further by reducing the power of the markers (e.g., LEDs). This could be achieved, for example, by sending a signal from the Handheld unit to the POD to reduce the current driving the LEDs which in turn will reduce the input signal at the sensor. In general, any combination of the sensor's settings can be adjusted in this manner in order to improve the performance (e.g., increased range or more robust operation) of the system. Also note that dynamic sensor control can apply to each Handheld unit operating in a multi-user environment.

Related to the sensor control methods described above is the concept of controlling the optical power and/or duty factor of the POD markers. In addition to optimizing the performance of the system, as described above, dynamic control of the marker properties can improve the overall efficiency of the system and reduce power consumption. As briefly mentioned above, if the user moves too far or too close to the markers, a signal may be sent from the Handheld to the POD to increase or decrease, respectively, the optical power emitted by the markers, by, for example, changing the current or voltage that drive the LEDs. Alternatively, since the signal strength data for each marker is transmitted from the Handheld unit to the POD, the decision to adjust the marker power can be made in the POD control unit or the main CPU connected to the POD. This may be done in addition to or instead of dynamic sensor control in order to keep the input signal within a certain specified range. Aside from optimizing the operating range, this method also can help to reduce or optimize the overall efficiency of the system by consuming no more electrical power than is necessary. This can be important under some operating conditions, for example, when the POD is powered from batteries. Another technique that can help to reduce power consumption in the POD is one where the markers are effectively turned off or set to very low power when the Handheld unit is not in use. In some embodiments, the Handheld unit shuts down or goes into a reduced current "sleep" mode after some predetermined period (e.g., 5 seconds) of inactivity (e.g., no detected change in sensor coordinates). This is generally done in order to preserve the Handheld unit's battery life. At the same time that the Handheld goes to "sleep", a signal may be sent to the POD to shut down the markers, thereby reducing power consumption (and extending the life) of the POD. When the user wishes to resume operation, a button is pressed that wakes the system up by turning on both the Handheld unit's electronics and the marker power.

One potential complication with controlling the markers in this way occurs in cases when more than one user is interacting simultaneously with the same POD (see multi-user implementation below). In these cases, it is not feasible to turn the markers off unless all handheld's become inactive. However, some degree of marker control may be employed when multiple users are active. For example, if multiple users are operating simultaneously, the marker power may be set to the proper level for the unit furthest from the POD or with the weakest signal. This simple approach will work under most normal conditions. Potential problems may occur when more than one Handheld is active at opposite ends of the nominal operating range. In such cases, the preferred mode of operation is one where the marker power is set to somewhere between the optimum for each unit (e.g., in the middle of the range or the average of the powers for all active units) and each Handheld's sensor is optimized for its own conditions. If all but one unit become inactive, then the marker power can adjust to the remaining active unit.

By using a combination of dynamic sensor and marker control, the overall system performance can be optimized with respect to operating range and robustness.

9. Beam Shaping Optical Elements for Enhanced Performance:

In this section, the use of one or more optical elements placed near the reference markers in order to produce a modified spatial emission pattern of radiation for the tracking and pointing in a vision-based remote control system is described. Conventional refractive or diffractive (e.g., Fresnel lens structures) elements may be used. A primary example (preferred embodiment) is a cylindrical lens or rod-shaped element placed in close proximity to IR emitting devices (IREDs) which are used as reference markers for the tracking and pointing in a vision-based remote control system.

In a vision-based remote control system using emissive markers as fixed references, the emission patterns of the native emitters are typically spatially symmetric with respect to their surface. However, for many tracking and pointing applications, the pattern desired for optimal illumination is not symmetric. For example, in a room (e.g., living room or conference room) where the use of the handheld remote control/pointing device is confined primarily to a horizontal plane, very little, if any, optical or IR radiation is needed outside a fairly narrow range of heights or vertical emission angle. On the other hand, it is desirable for the system to have a wide operational range in the horizontal plane, i.e., a wide view angle. It is also generally desirable for the system to have a long operational range in the "z" direction (distance from the viewing screen or reference markers), i.e., a long range. Thus, any light emitted by the markers that is not detected by the sensor in the handheld unit over its normal operating range of distances and view angles will limit both range and view angle. In order to optimize the operational range and make the most efficient use of the available optical energy from the markers, optical elements may be placed in appropriate locations with respect to the markers such that the light emitted by the markers is redirected into only those directions needed for normal operation.

An example of a typical scenario in which the vision-based tracking system can benefit from the addition of optical elements is illustrated in FIGS. 6 and 7. FIG. 6 shows top and side views of a 2-marker arrangement in a vision-based tracking system. The shaded region depicts the operational regions for the system. In a typical system, the markers emit radiation in a spatially symmetric pattern characterized by an emission half-angle—the angle at which the optical power falls to half of its peak value. The shaded region represents an effective operational range extending in horizontal and vertical planes with respect to the plane defined by the markers. In principle, the optical power falls off smoothly as the user moves away from the markers in each direction. However, in practice, there is a threshold power below which the sensor in the vision-based tracking system has little or no response. The region in which the optical power is above the detection threshold is the operational range represented by the shaded region in FIG. 6.

Types of Optical Elements: Because the optimal or desired operation range is typically not symmetric, a more efficient system would result from reshaping the emission pattern. FIG. 7 shows the emission pattern and operational region from the two markers after the addition of an optical element. In the preferred embodiment, a simple cylindrical rod is placed adjacent to the markers such that the radiation from the markers passes through the side of the rod. The properties of the rod, specifically its index of refraction and diameter, along with the emission pattern and location of the markers relative to the rod, determine the emission pattern of the radiation exiting the rod. In general, the use of cylindrical optics will transform a symmetric emission pattern into an asymmetric pattern, as shown in FIG. 7. The resulting asymmetric pattern creates an increased operational range for the system since much of the radiation previously emitting into regions of space that are not useful is redirected by the optical element into more useful regions. For the case depicted in FIG. 7, the radiation intensity is increased in all directions in the horizontal plane by collecting and redirecting some the radiation emitted in the vertical plane with the result that the operational distance and view angle are extended. In addition, for vertical angles close to the horizontal plane, the range is also extended. The increase in the operational range in the horizontal plane is proportional to the decrease in the effective emission angle in the vertical plane.

For example, in the case where the optical element is a cylindrical rod with an index of refraction of ~1.5 placed in close proximity to the marker, the emission half-angle (determined by view angle at which the measured power falls to half of its maximum) of the marker is reduced from ~60° to ~20° in the vertical dimension and essentially unchanged the horizontal dimension. The power detected at a point in the horizontal plane will increase by a factor of ~3, resulting in a range increase in all directions in the horizontal plane by a factor of ~1.7. In the vertical plane, the power level falls off more rapidly as the user moves away from the horizontal plane. Note that in FIGS. 6 and 7 are not drawn to scale, so that the slight displacement of the operation ranges for the two markers is exaggerated for purposes of illustration. In a typical arrangement, the operation range is much larger than the marker separation so that the displacement between the operation ranges is negligible compared with the operation range.

Other optical elements or combinations of optical elements may be used to modify the marker emission pattern. The optical elements useful for emission pattern modification generally fall into two classes—those that collect light and reduce the effective angular spread of the input radiation (positive element), and those that disperse light and increase the effective angular spread of the input radiation (negative element). In most situations of interest for pointing and tracking, the change in the angular spread of the source radiation will be operable in one dimension only, as in the case of the rod, or possibly asymmetric (stronger in one dimension than the perpendicular one). However, there are some situations in which a symmetric element (e.g., a standard lens or spherical element) can be used. Examples include situations where the markers' emission pattern has the correct asymmetry but it is desirable to modify the view angles in both directions by approximately the same amount or where a symmetric pattern with a different angular spread is desired. Optical elements (both positive and negative) can be refractive (e.g., cylindrical rods, refractive Fresnel and standard lenses), diffractive (e.g., diffractive Fresnel lenses), dispersive (e.g., light shaping diffusers), or reflective (e.g., mirrors and total internal reflection-based devices) in nature. Examples of refractive optical elements include the full cylindrical rod described above, fractional rod (in which the rod is cut along its length, including a half-rod), full sphere, fractional sphere, standard cylindrical, spherical and ball lenses, and conventional refractive Fresnel lenses. Examples of diffractive optical elements include holographic and diffractive optical elements and diffractive Fresnel lenses. Examples of dispersive elements include conventional diffusers (e.g., ground glass), refractive-type diffusers (e.g., lenticular arrays, and elements produced using holographic and lithographic methods), as well as more advanced engineered diffusers that can produce beams with specifically tailored shapes and intensity profiles, both symmetric and asymmetric. Examples of reflective elements include symmetric and asymmetric mirrors placed in close proximity to the emitting marker and optical elements based on total internal reflection to redirect the emitted radiation.

An alternative embodiment of the present invention that uses one of these other types of optical elements is one where the marker emits in a fairly narrow angular range (e.g., a half-angle of ~5°) and a wide view angle (e.g., +/−60°) is desired in at least one direction. In this case, a negative optical element can be used. For example, a negative cylindrical lens or Fresnel lens can be used to provide the desired illumination pattern. Alternatively, an engineered diffuser designed to produce the desired output pattern can be placed in front of the marker. Such devices are particularly useful in cases where the emission pattern is to be modified in both directions (e.g., a beam pattern with +/−20° and +/−60° view angles is to be produced from a source with a symmetric +/−5° emission angle). The advantage of engineered diffusers or beam shaping elements is that virtually any desired beam pattern can be created from a given input pattern (provided that the output is more divergent than the input) and specific intensity distributions (e.g., patterns with constant intensity as a function of angle) can be produced. The disadvantage of these devices is their higher cost and typically lower transmission or efficiency compared with standard optical elements.

System Details: For many common scenarios that use one or more collinear markers with a symmetric emission pattern (FIGS. 6 and 7) for visual tracking, the preferred embodiment using a single cylindrical rod is the simplest and least expensive approach to producing a near optimal operating range in most circumstances. In order to collect the maximum amount of radiation from the source, it is preferable to position the rod adjacent to and centered on the marker (as in FIG. 7). In this case, it turns out that the divergence angle of the transmitted light is, in principle, approximately independent of the rod diameter—as the rod diameter increases, its optical power decreases, but the source moves further from the lens (or center of the rod) such that the output divergence angle remains essentially constant versus rod diameter. This condition holds for the case where the source size is much smaller than the rod. As the source size increases (or rod size decreases), the output beam divergence angle becomes determined more by the relative sizes of the source (marker) and rod and the inherent beam divergence of the source and less by the optical properties of the rod. In addition, for small rod to source size ratios less of the optical power from the source is captured by the rod and the beam shaping effect becomes less efficient. For these reasons, it is desirable to have the rod be large compared to the marker. On the other hand, for many applications, it is desirable for the marker system (including beam shaping optics) to be as compact as possible. Therefore, in practice, the optimum rod (or generally, optical element) size is a tradeoff between compactness, optical efficiency and beam shaping effectiveness.

The preferred embodiment, where the marker is adjacent to the rod, produces the largest output beam divergence angle. As the marker moves further from the rod, along the optical axis, the divergence angle decreases. This is referred to as the virtual image region since the output beam does not come to a focus. When the marker reaches the focal plane (located approximately ¼ of the rod diameter from the edge of the rod), the output beam becomes approximately collimated. As the marker moves past the focal plane, the output beam begins to converge and a real image is formed. Generally, it is preferable to operate in the virtual image region since it has the highest collection efficiency and is the most compact. However, in cases where a divergence angle larger than that achievable in the preferred embodiment is needed, then the real image configuration can be used, where the output divergence angle can be essentially tuned by adjusting the rod to marker distance. Alternatively, a larger beam divergence can be achieved in the preferred virtual image configuration by using a weaker optical element. This can be achieved by several means including a lower index of refraction for the rod material (e.g., a water-filled tube), a partial rod, or, equivalently, a lens with a longer focal length.

The actual output beam divergence angle is a function of several factors. For a point source (or a source much smaller than the rod diameter) located on the optical axis, the output divergence angle can be estimated (using the paraxial approximation) from both the diameter and index of refraction of the rod (or focal length of the lens) and the marker to rod distance. In practice, other effects, such as finite source size and spherical aberration, will affect the resulting output beam divergence angle, which is determined by a combination of all of these effects. For example, for a source (e.g., LED) with a +/−60° emission half angle placed adjacent to an acrylic rod, with a diameter of 8 mm and an index of refraction of approximately 1.5, the output half-angle would be approximately +/−30° using thin lens and paraxial approximations (which assumes that all of the refraction occurs at the principle plane located at the center of the rod and no aberrations). For small emission angles (less than ~30°), these approximations are fairly accurate. For larger emission angles, the actual output divergence angle will deviate from the thin lens estimate, and in general, will be much less. When the finite thickness of the rod, and the fact that refraction takes place at two surfaces, is accounted for, the effect of spherical aberration at large input angles is seen. The result is an output beam divergence angle of approximately +/−12°. The focusing power of the rod is effectively stronger for rays hitting closer to the edges (i.e., larger angles), and therefore the output angles are smaller than expected from the thin lens estimate. In practice, the finite extent of the source as well as other imperfections will lead to an output divergence angle that differs from, and is typically larger than, that calculated.

The output divergence angle can be defined in any of several ways. The conventional definition, and the one typically used to characterize the source, is the angle at which the optical signal falls to half of its maximum value measured at some distance from the source. This is a fixed value that is independent of the distance from the source. When comparing the emission pattern of the original source with the modified pattern following the inclusion of the rod (or lens), a useful measure of the divergence angle is the angle at which the signal levels, with and without the beam shaping element, intersect. This definition is useful as a measure of the relative improvement obtained with the beam shaping element since it defines a divergence angle within which the signal is increased and beyond which the signal is decreased relative to the signal with the unmodified marker. The divergence angle defined in this way is also independent of the distance from the marker. This angle may be larger or smaller than the conventional half-angle of the re-shaped beam, depending on the specific beam shape, how the beam is re-shaped (wider or narrower), and to what extent. However, for the most common scenario where the re-shaped beam is much narrower than the input beam, the angle defined in this way will be larger than the conventional half-angle. Another, perhaps more practical, operational definition is the angle at which the signal falls below some predetermined threshold value. This threshold could be set at the lower limit of the detection system. Because the signal decreases as the distance from the source/marker increases, it is clear that this operational angle decreases as one moves away from the markers as indicated in FIGS. 6 and 7. Each of these definitions will have a different value for the effective divergence angle.

The increase in the signal strength inside the operational region (the volume of space where the signal is above the detection threshold) can be estimated from the beam shaping optics and the properties of the source itself. In general, the increase in the operating region will be approximately proportional to the decrease in the emission angle due to the beam shaping optics. The exact increase will depend on the input and output emission angles in each direction, the losses associated with the optical element, and the method used for signal detection. For the case where the source is symmetrically emitting into a wide angle and the optical element decreases the emission angle in one direction, the increase in signal strength at a location near the peak of the emission (along the axis of the optical element) will be approximately equal to the decrease in the emission angle. For example, if emission half angle in one dimension is decreased from ~60 degrees to ~20 degrees, then the amount of optical power along the optical axis will increase by ~2.5 to ~3 times. The actual change in power depends on several factors, including the angular distribution of the source radiance, both with and without the optical element, and the optical transmission of the beam shaping element. In addition, the measured signal change will depend on the methods used for detection, i.e., whether the detection is linear or nonlinear versus input power, and whether there are saturation, thresholding, or offset effects present in the detection system.

In the simple and idealized case of a uniform distribution with emission angle, 0, and linear detection with no offset or thresholding, the change in the detected signal is inversely related to the change in the solid angle (SA) subtended by the emitted radiation. Thus, the expression for the relative signals with and without the optical element is $SA_1/SA_2$, where $SA_1$ (2) is the solid angle without (with) the optical element. For the general case of asymmetric emission along the x and y dimensions, $SA_{1,2} = \sin(\theta_{x1,2}/2)\sin(\theta_{y1,2}/2)$. For example, in the simple case of a symmetric uniform distribution where the emission angle is reduced from 60 degrees to 20 degrees symmetrically in all directions (e.g., using an ideal lens), and linear detection with no offset or thresholding, then the increase in both power and signal will be ~8.3 times, and if the emission angle is reduced in only one direction (e.g., using an ideal cylindrical lens), then the power and signal will increase by ~2.9 times. In many practical situations, the simple, ideal conditions stated above do not exist (e.g., the radiance distribution is not uniform, the optical element is not ideal (i.e., lossless and aberration-free), and the detection is not purely linear) and therefore, neither the change in power nor the change in detected signal is easily calculated and they should be determined empirically. However, for many non-uniform distributions of interest (e.g., Gaussian-like or cosine), the emission half-angle may be used for 0 in the above expression to give a good approximation to the expected power change as a result of source distribution changes.

For example, in one embodiment of the vision-based remote control system, IREDs with an approximately symmetric cosine angular radiance distribution are used as sources and a cylindrical rod is used as the beam shaping element. In addition, the detection system uses a pixelated image sensor where the detection method is based on a combination of mostly-saturated single pixels in conjunction with spot size (in pixels) to determine the signal strength. As the signal changes due to, for example the user moving within the operation region, the number of saturated pixels and thus the signal strength will change. The exact dependence of the signal with the power depends on several factors but the primary factors are the spatial shape of the marker image on the sensor, the saturation level, and the threshold for detection. In general, typical spot shapes (e.g., Gaussian) will lead to a nonlinear dependence of the signal on optical power where the rate of change of signal with power will tend to decrease as the input power increases above threshold.

For example, for a purely Gaussian spot, the signal will have an approximately logarithmic dependence on the input optical power when the peak power is above the sensor's saturation level. A logarithmic function is characterized by a decreasing slope as the input variable increases. For power levels below saturation (i.e., where the peak signal is less than that required to saturate a pixel) but above the detection threshold, the signal is approximately linear with input power and for power levels below the threshold, the signal is zero of course. For other spot shapes, the dependence of signal strength on input power may deviate from a logarithmic function, but in general the signal versus power function will take on a shape characteristic of detector saturation, i.e., decreasing sensitivity (slope) as the input power increases. For example, for spots with an exponential-like spatial behavior, the signal versus power becomes closer to the square of a logarithm.

Also, this analysis assumes that the basic size or shape of the imaged spot does not change as the power changes. In cases where the size or shape of the spot does change as the power changes, then the functional form of the signal and the degree of saturation will also deviate. For example, in a system where the true (i.e., unsaturated) marker image is spatially resolved by the pixelated sensor, then the size of the image may change as the user's distance from the POD or view angle changes. In this case, the signal will become more linear as a function of input optical power (assuming that the power changes are due to distance/view angle changes). However, under most typical operating conditions (e.g., the user is at least 1 meter from the POD and the effective marker size is a few millimeters or less), the marker image size is on the order of or less than that of a sensor pixel, so the detection will generally retain the nonlinear behavior described above.

To determine how the measured signal varies with distance from the source, it is necessary to factor in the dependence of power reaching the sensor versus distance from the source. Generally, as the sensor moves away from an optical source, the optical power incident on the sensor will decrease as the inverse of the square of the distance between the source and sensor. This is the well-known "inverse-square law" for determining how radiation power falls off as an observer moves away from a source. In practice, this law applies when the following conditions hold as the distance changes: the orientation of the normal vector to the sensor surface with respect to the source-sensor vector remains constant (i.e., the user does not change their pointing direction), and the sensor's position with respect to the emission distribution of the source remains at the same angle (i.e., the user moves along a straight line connecting the sensor and source). The second condition is not necessary in the case where the emission distribution is constant versus view angle, since for a given distance from the source, the power is the same regardless of the sensor position. Other conditions that are needed for the inverse power law to hold, but which are generally always valid in practical situations, are that the source to sensor distance is large compared with the effective sensor size (i.e., the size of the limiting aperture in the detection system) and the intensity distribution across the aperture is essentially constant. Both of these conditions are a consequence of a finite sensor size. However, in virtually all cases of interest for the present application, both of these conditions will be true. For example, a typical sensor system will have an aperture size of no more than a few millimeters and the closest the sensor will ever be to the source is several centimeters. Therefore, the largest angle subtended by the sensor aperture will be only a few degrees (and typically much less), and so the effects of a finite sensor size can typically be neglected and the inverse square power law will hold in essentially all situations of interest.

Optimization of the Operating Region: When the inverse square law power dependence on distance is combined with the signal dependence on power and the known source distribution, it is then possible to estimate how the detected signal will depend on the location of the user. Of interest here is the region inside of which the system will operate, i.e., is above a pre-determined threshold. This requires defining a minimum (and perhaps maximum) signal level, and then the locus of points in space where the signal crosses this level will form the boundary of the operational region. In general, the size and shape of the operational region will depend on the properties of both the sensor system and the optical source, such as the sensitivity and dynamic range of the sensor, the properties of the imaging optics (e.g., f/#), and the optical power and spatial distribution of the emission pattern of the source. Note that, in cases where there is wireless (e.g., RF) communication between the handheld device and the base unit (which may be co-located with the markers), then the maximum range of operation may be limited by that of the communication subsystem. Typically, however, the optical range will be the limiting factor for the system. Of particular interest here is the manner in which this operational region changes with the emission pattern of the source and especially the case where the emission angle (in one or both dimensions) is reduced.

As the emission angle is reduced (while keeping the other system parameters substantially unchanged), the range of operation (i.e., distance from the source to the user) is extended in directions close to the peak of the emission angle. This is easily understood—the available optical energy is directed more in the forward direction and less in peripheral directions, and therefore the distance at which the optical power (and thus signal level) reaches the minimum needed for proper operation is extended. This extended range is the primary purpose of the beam shaping optical element. However, because the total optical power from the source is not increased (and may be slightly decreased due to losses from the optical element), the range necessarily decreases in the peripheral directions as illustrated in FIG. 7. In determining the proper beam shaping element, a balance between extended range in the forward direction and reduced range in peripheral directions may be maintained. One practical approach to determining the optimal beam shaping element is to first decide over which viewing angles (in both horizontal and vertical directions) the system should operate at a reasonable distance from the source. From this information and the known emission properties of the source, the required properties of the optical element(s) can be determined. These properties include the focal length, size, and location with respect to the source, of the element. In general, some, or all, of the beam shaping elements' properties may be different in each direction.

The extended range in some preferred directions at the expense of reduced range in others will also modify the shape, and thus the volume and cross-sectional and surface areas, of the associated operational region. In general, as the distribution of emission angles becomes narrower, the volume of space enclosed by the operational region actually increases. In fact, for a fixed amount of available power, a broad or uniform distribution will correspond to the minimum operational volume and surface area and a very narrow or near collimated beam will produce the maximum volume and surface area. This effect is perhaps counterintuitive when conservation of energy is considered. In fact, one might think that either the operational volume or its surface area would remain constant. For a uniform emission distribution, the surface area is a measure of the total power of the source since the sensor is effectively integrating all the power emitted by the source as it moves along the surface while pointing at the source. However, as the source distribution narrows or becomes non-uniform, the sensor moving along a surface of constant power, while pointing at the source, does not represent a measure of the total power. In effect, at each position along the surface for a non-uniform distribution, the sensor is detecting some of the same light it detected at previous and subsequent positions, whereas for a uniform distribution, each position of the sensor detects a distinct portion of the light. The narrower the distribution, the more overlap there is in the portion of the light detected at each position. In other words, the narrower the distribution, the further the sensor has to move along the surface defining the operational region before it detects a distinct portion of the source radiation. Therefore, for a given source power, a narrower distribution will result in a larger operational region. This effect is illustrated in FIG. 8.

The increase in the size of the operational region is related to the angle, Q, between the sensor surface and the surface of the operational region. For a perfectly uniform distribution, this angle is zero at all positions along the surface (the sensor is always parallel to the surface of the operational region), but for non-uniform distributions, the angle increases from zero when the sensor is directly in front of the source (i.e., at the peak of the distribution) and increases as the sensor moves along the surface of the operational region. The narrower the distribution, the more rapidly this angle increases from 0° at the peak of the emission to ~90° near the source. The size of the operational region will be inversely proportional to a function of $\cos(\Omega)$ that is spatially averaged over the operational surface. Therefore, in the limit of a collimated beam, where the angle approaches 90° over most of the surface, the size of the operational region approaches infinity. In practice, limitations such as finite source size, and fundamental effects such as diffraction result in a lower limit for the emission angle (or beam divergence) and thus an upper limit for the size of the operational region.

The exact functional dependence of the operational volume and surface area on the emission distribution depends on many factors and is, in general, difficult or impossible to calculate. Some of these factors include the detection method (which determines how the effective signal depends on distance from the source), how the source distribution (both its shape and width) changes in both horizontal and vertical directions, and any changes in the effective source power due to, for example, losses introduced by the beam shaping element. For certain specific situations, it may be possible to calculate or estimate this function, but in most cases, an empirical measurement is the most practical and accurate method for determining the effect of the beam shaping element on the operational region size.

As a specific example, a symmetrically emitting IRED source with a +/−60° emission half angle was measured to have an operational region with a range in the forward direction of ~17 ft (5.2 m), a volume of ~4300 ft$^3$ (122 m$^3$), and a surface area of 1190 ft$^2$ (110 m$^2$). After the inclusion of a rod-shaped optical element (diameter=8 mm) near the output face of the IRED, the effective emission angle in one dimension is reduced to approximately +/−20° and is substantially unchanged in the other dimension. In this case, the measured range increases to ~32 ft (9.8 m), the volume increases to ~5900 ft$^3$ (167 m$^3$), and the surface area increases to ~1760 ft$^2$ (164 m$^2$). This represents a near doubling of the range of operation of the system, but also an increase of ~50% and ~36% in the area and volume, respectively, of the operational region. These increases come at the expense of reduced range in one dimension, and generally, this is a dimension where reduced range operation is sufficient or desired. Note that these measurements include the effect of any power reduction resulting from the inclusion of the optical element (estimated to be ~10% in this case). Also note that the relative change in the size of the operational region is an inherent property of the geometrical changes in the source emission distribution and does not depend on the particular detection method used.

The previous discussions have focused on the upper limit on the operational range, i.e., how far from the marker(s) the system will function. In addition, a lower range limit may exist as well, i.e., how close to the marker(s) the system will function. Just as the maximum distance is limited primarily by the minimum detectable signal, the minimum distance is generally limited by the maximum detectable signal. A maximum allowable signal can result from either a fundamental limitation, such as a sensor whose response ceases to change for increasing power (e.g., saturation), or a limitation imposed by the detection system or method, such as an electronic or numerical maximum or cutoff level.

Using the detection method described above, sensor saturation is not a limiting factor since the pixels are already saturated under normal operating conditions. Instead, the minimum distance is generally limited by the largest image size that can be processed. As the sensor moves closer to the markers, the image spot size, and thus the signal, increases. However, the larger the spot, the more pixel data that must be processed until a maximum limit is reached. This maximum depends on the details of the processor or controller used and other system properties, such as transmission speed, memory size, etc. The image spot size is also a function of the properties of the sensor and imaging system. In particular, the sensor exposure, gain, and threshold all affect the effective spot size and thus signal level. Since these parameters can typically be automatically adjusted, it is possible to extend both the minimum and maximum ranges in a practical manner by appropriate decreases and increases in one or more of these settings. In addition, the optical power of the source itself may be adjusted in order to extend both upper and lower range limits. However, each of these adjustable parameters has their own limitations that will ultimately determine the range of operation in practice. This may be illustrated by way of example.

In a typical scenario, as the user moves around inside the operational region, the system parameters (source power, sensor settings) generally remain constant. In fact, the nominal operating region is defined assuming specific, fixed system parameters. However, as the user moves toward the edge of the operational region, the signal will approach either its minimum or maximum levels. At this point, one or more of the system parameters may be adjusted to move the signal away from the edge of its range. Typically, the source power will be set to close to its maximum level under normal conditions, so in order to achieve increases in the range, the sensor settings will be adjusted. Normally, gain and/or exposure levels will be increased, which effectively increases the sensitivity of the sensor and permits the detection of weaker optical power levels. In principle, reducing the electronic threshold setting for the sensor will also increase the signal level, however, in practice, the threshold is usually set to discriminate against electronic background and noise as well as ambient or background optical signals (e.g., room lights). Therefore, the sensor threshold, once set, is typically not adjusted during operation. Increasing the sensitivity of the sensor will extend the operating range; however, there are limits to this method. Obviously, any sensor will have upper limits for its gain and exposure levels, which sets the ultimate limit. However, prior to reaching these levels, other practical effects may become relevant. Generally, electronic noise will limit how high the gain may be increased and ambient or background light will limit how high the exposure may be increased. Therefore, the sensor settings may be adjustable over a fairly small range before background and noise effects begin to degrade the system performance. In other words, it is ultimately the effective signal to noise ratio (SNR) that limits the maximum range and the SNR will eventually decrease as the sensor moves beyond a certain distance from the source.

When the user is near the lower limit of the operational range and the signal is close to its maximum level for normal operation, the sensor settings may be decreased in order to reduce the signal and permit operation at shorter distances. Once the sensor sensitivity reaches its minimum level (through gain and exposure reductions), the optical power of the source can be reduced to permit even shorter distance operation, if desired. In this manner, the lower limit on operational distance can be made arbitrarily small (assuming that the background signals do not increase significantly).

Note that the preferred method for extending the range in this manner utilizes automatic adjustments to the system parameters, i.e., it is not necessary for the user to make the required adjustments. Dynamic adjustments can be implemented by monitoring the signal levels corresponding to each of the one or markers and then using this information to feed back to the control circuitry for the system. For example, as the user moves away from the source, the signal drops until it reaches the predetermined level ($S_{min}$) that defines the operational range. As the signal approaches $S_{min}$, the sensor controller electronics begin to increase the gain and/or exposure levels of the sensor in order to boost the signal and maintain it above $S_{min}$. This procedure may continue as the user moves further away from the markers until the point at which further increases result in a degradation of the SNR. The result is an operational range that is extended beyond its nominal value. Similarly, as the user moves closer to the markers, the gain and exposure settings may be reduced in order to maintain the signal below its predetermined maximum level ($S_{max}$). Once the sensor sensitivity reaches its minimum level, the user may move closer until $S_{max}$ is exceeded. For distances closer than this, the system will normally cease to operate. However, by transmitting an appropriate signal to the control electronics for the source, the optical power of the source can be reduced, thereby maintaining the signal below $S_{max}$ and permitting, in principle, operation arbitrarily close to the source.

The above discussion on range limitations involves the effect of signal strength on the size of the operational region. Specifically, the signal may remain in the range between $S_{min}$ and $S_{max}$ for the system to function. In some embodiments of the vision-based tracking system, other conditions may limit the size of the operational region. For example, in some two-marker arrangements (see FIG. 6 or 7), the system relies on the detection of both spots in order to function properly. Accurate sensing of properties such as distance from the markers and angular rotation of the handset (i.e., roll) requires that both markers are detected and resolved on the sensor. As the user moves further from the markers, the spot separation on the sensor decreases. At some point, the separation between the spots is too small to be resolved properly by the system and the system performance degrades or ceases. If this distance is less than the maximum range determined by the SNR, then the effective range of the system will be limited by the spot separation. In general, it is preferable and more efficient to design the system to be limited by SNR instead of spot separation. Note that the spot separation limitation applies to any multi-marker arrangement—the separation between all pairs of spots must be sufficient for proper system function. Also note that the spot separation may be affected by other conditions such as the user's view angle with respect to the markers. For example, in some two-marker arrangements, the spot separation has an additional $\cos(\theta)$ dependence, where $\theta$ is the user's view angle. In general, this places a potential additional limitation on the operational region size. However, because the emission for most markers of interest also falls off versus $\theta$, the spot separation limitation on operational range will need to be considered typically only for broad emission distributions and large view angles.

In addition to a minimum spot separation requirement, there is also a maximum spot separation that is tolerable by the system. If the spot separation exceeds this maximum, then the system performance may degrade or cease. The fundamental limit on the spot separation is set by the sensor and imaging system—the spots may all fit simultaneously onto the sensor surface for any location inside the operating region and pointing direction of the user. For a given separation of the physical markers, this condition places a limit on how close to the markers the user may be. In many practical scenarios, such as a living room, the user will rarely, if ever, be close enough to the markers (or screen) that the maximum spot separation will be exceeded. However, in some applications, such as a presenter in front of a large projection display, where large pointing angles may be required, it is possible that the spot separation will limit the performance of the system instead of $S_{max}$. In general, the optimum marker separation is a balance between minimum and maximum operating distances and is typically chosen to be large enough to achieve sufficient accuracy and range, but not so large as to be physically impractical or to limit the minimum operating distance.

Finally, one other factor that can limit the minimum operating distance (and thus the size of the operational region) is the field of view (FOV) of the sensor imaging system. Typically, the system FOV is chosen to be large enough to provide sufficient angular pointing range for the user at some minimum operating distance. If the FOV is too large, then the pointing resolution may be degraded. For a given FOV, the minimum operating distance will depend on the required angular pointing range, and the angular pointing range is limited by the screen size—a larger screen will require a larger pointing range. As an example, for a typical FOV of ~50°, and with the markers placed along one edge of the screen (e.g., centered near the top or bottom), then the FOV-limited minimum operating distance will be approximately twice the vertical dimension of the screen. In this case, the minimum distance will range between ~2 feet for smaller (e.g., PC) screens to ~4 feet or more for larger (e.g., TV) screens. Note that the FOV-limited operating distance can be reduced by increasing the system FOV or by placing the markers inside the screen itself (e.g., near the screen center). One practical method for achieving the latter (described below) would be to use a reflective or projection marker system in which the tracking spots are obtained by detecting light reflected off the screen. In this case, the minimum operating distance can be reduced by ~50%.

Reflective Marker Systems: The discussion so far in this disclosure has focused on marker sources that emit radiation, such as LEDs and IREDs. This is the standard configuration; however, in some applications, it is possible to employ alternative marker arrangements. As described briefly above and disclosed in co-pending application Ser. No. 11/777,073, a reflective marker arrangement can be implemented that may have advantages in some situations. For such an arrangement, light is projected onto a surface (e.g., a wall or screen) from which some or all of the light is reflected. The reflected light may then serve as markers for the vision-based tracking system. This arrangement is particularly useful when projection display systems are used (e.g., front- and rear-projection TV systems, conference room settings). In one embodiment, one or more infrared-emitting lasers is used as the source and directed toward the center of the screen on which the image (e.g., TV, computer, video game) is displayed. The invisible reflected spots are detected by the sensor and the pointing and tracking system operates in a manner similar to that for the standard emissive marker arrangements. This arrangement has several advantages: the projected markers can be positioned at any location on or around the screen and the marker system can be made more compact and portable and does not have to be physically located near the viewing screen.

Generally, the light reflected from a display surface will be approximately Lambertian, meaning that its brightness is the same for all reflected directions or that the light is scattered uniformly from the surface. This results in a cosine dependence for the detected power as the user's view angle changes, similar to that for typical broad emission angle emitters, some of which may be described as Lambertian sources. As for the conventional emissive marker system, in many situations involving projection markers, it may be desirable to modify the typically symmetric distribution of reflected light to more efficiently fill a space, extend the range, or increase the operational region size. Beam shaping optical elements, as described above for the case of emitting markers, could be used for this purpose. For example, a cylindrical lens, half rod, or Fresnel lens could be attached to the screen or display surface. The light projected from the marker system (e.g., a collimated laser) would transmit through the optical element, reflect or scatter from the surface, and then pass back through the optical element toward the user. In this manner, the effective angular distribution of reflected light in one dimension would be reduced and the operational range increased as described earlier. While this type of method for beam shaping for projection marker systems works, it has a few disadvantages that make it impractical in many situations of interest. Among these is the requirement for an optical element to be placed on or near the viewing screen which defeats one of the advantages of the projection marker system—the ability to project the markers to any location. In addition, there is a potential added alignment requirement between the projected beams and the optical element for each use, which is not present for the standard emission marker system (the markers and optical element are co-located and aligned once).

An alternative method for achieving beam shaping in a projection marker system that has several advantages is to use screens that are specially designed to reflect (for front-projection) or transmit (for rear-projection) light asymmetrically. Such screens have been designed for advanced projection display systems for the purpose of increasing the viewing angle, especially in one direction. It turns out that this objective is very similar to that for the vision-based tracking system. In both cases, it is desirable to have a large viewing angle in one dimension and a smaller viewing angle in the other dimension. This makes sense since it is typically the viewer who is using the system. Therefore, screens that are designed for optimal viewing of projection video systems will naturally aid in the required beam shaping for vision-based tracking and pointing systems using projection markers.

In summary, the use of beam shaping elements aids the operation of the vision-based tracking system in at least two ways. By reducing the distribution of emission angles, the operational range in the forward direction is increased, and the total volume of space over which the system will operate is increased (i.e., not only the useful volume), thereby making more efficient use of the available optical power. While both the operational range and volume are maximized by using the narrowest possible emission distribution in both dimensions, the system would work only over a small angular range near the emission peak and would not be useful in many environments (e.g., typical living rooms or conference rooms where large view angles in one dimension are desirable). In practice, the optimal shape of the distribution should be matched to the environment in which it is to operate.

10. Robustness to Background Interference:

One of the technical challenges of any optical tracking system is its robustness to external stimuli. While tracking technologies based on inertial sensors, such as gyroscopes and/or accelerometers are susceptible to drift over time and are fairly temperature dependent, optical tracking suffers none of these weaknesses as it is inherently an "absolute position" and not a "relative motion" tracking system. However, special care may be taken in optical systems to make them robust to unwanted optical stimuli or "false" detection. For example, a vision system designed for tracking a specific object, such as an enemy airplane, through cross-correlation to a reference image library, needs to have extremely good discrimination with respect to, say, a friendly airplane. Good algorithms are central to this determination and require a tremendous amount of processing, but there will always be a slight chance of false negatives (i.e. not properly targeting an enemy airplane) or false positives (i.e. mistakenly targeting a friendly airplane).

Some alternative optical approaches are instead based on tracking points of light generated in the image from embedded light sources such as LEDs, or from localized reflections illuminated, for example, by a floodlight. The computational load on the imaging system is now greatly reduced since the correlation step is largely removed. Tracking of spots is much simpler computationally than tracking of full 3D objects in space, although by no means trivial especially when multiple spots are involved. This is, for example, the case when attempting to track all the body part motions of a man wearing a suit completely covered with equally spaced LEDs or reflectors. Under any circumstance, the tracking system still may accurately discriminate the target light spots from, for example, a nearby lamp. This section focuses on these types of tracking systems, but many of the principles outlined here apply equally to all tracking systems.

There are generally two types of background interference. One involves sources of light unrelated to the reference markers, such as ambient lighting, lamps, sunlight, etc. These background sources can be detected by the imaging system through direct or reflected paths. Generally, the brighter and more "point-like" the sources are, the more likely they will interfere with the detection of the reference markers, and the more diffuse or spread out they are, the less likely they will interfere. The other type of interference involves reflections of the marker light itself. This section will address both types of interference.

Ambient Background: One way to improve the discrimination of target spots against background light is to improve the optical SNR ratio by optically pre-filtering the image scene. For example, if the markers (e.g. LEDs) are infrared emitters with a wavelength of about 950 nm, then placing an optical band-pass filter in front of the optical sensor will ensure that only 950 nm light passes through to the sensor and is seen. The better (i.e., larger suppression of spectral sidelobes) and narrower (i.e., smaller spectral bandwidth) the filter is, the better the system will be at discriminating against unwanted objects at different wavelengths. As applied to the vision-based pointing and tracking system, this approach was disclosed in co-pending applications '387', '405', and '435'. While optical filtering is a very good tool, any outdoor daylight or lighted indoor environment will generally contain some IR components in the filter pass-band. For example, a common incandescent light bulb emits a large amount of IR light that illuminates the scene. As a consequence, no amount of spectral filtering can completely eliminate the risk of false detection. Of course, the brighter the markers, the better the discrimination will be, but there are practical and safety limitations on power levels.

Another common technique for improving the robustness of an image-based tracking system is to use background subtraction or novelty filtering. In background subtraction, an initial image is taken at time t=0 and this image is subtracted from all subsequent images. This approach works fairly well for a system where the camera is fixed at one point in space and tracks objects moving around in a scene. This works when the object of interest is the only thing that is moving and therefore the only object which will show up after the subtraction process. For situations where the background changes slowly, novelty filtering is a better approach because it subtracts consecutive images from each other, and only shows the objects that have changed or moved sufficiently from frame to frame. Neither of these approaches is very good for systems that use a handheld imaging system, since both the scene and the target light spots move at roughly the same rate.

In summary, while vision-based pointing and tracking systems are extremely powerful tools for accurately, and in absolute coordinates, tracking the position and orientation of objects in 3D space, they are susceptible to false readings if proper care is not taken to improve their robustness to false interpretation of the scene. This is especially true for handheld tracking systems used, for example, in free-space pointer remote controls, in which the whole scene changes constantly as the user handles and points the device.

Methods and apparatuses for improving the robustness of optical tracking systems are described herein. Specifically, in one embodiment, synchronized temporal gating and imaging is used to improve the discrimination of tracked images. For a system consisting of a Handheld device with an on-board imaging system, in which the imaging system tracks the location of one or more fixed markers, it is possible to significantly improve the rejection of background light by using temporal gating.

The basic concept of operation is simple. The target markers (e.g., LEDs) placed, for example, on top of a viewing screen, have an operating specification that indicates the maximum power at which they can safely run continuously as well as a peak current for pulsed use. Generally, it is possible to pulse LEDs to emit a series of a high powered bursts of light in a short period of time, while remaining within the operating specifications for the average power. In a preferred embodiment, the repetition rate of the LED is equal to the frame rate of the sensor (e.g., CMOS) in the imaging system. In one embodiment this is 30 Hz. However, simply pulsing the LED offers no improvement because the sensor detects linearly the accumulated photons (light) that impinge on it. That is, a pulsed LED and a DC-driven LED will look essentially identical to the sensor, provided they both emit the same total number of photons during one exposure time. However, if the sensor's sensitivity is time gated to precisely coincide with the pulsed LEDs, then the (SNR) can be greatly improved.

Figure 9:
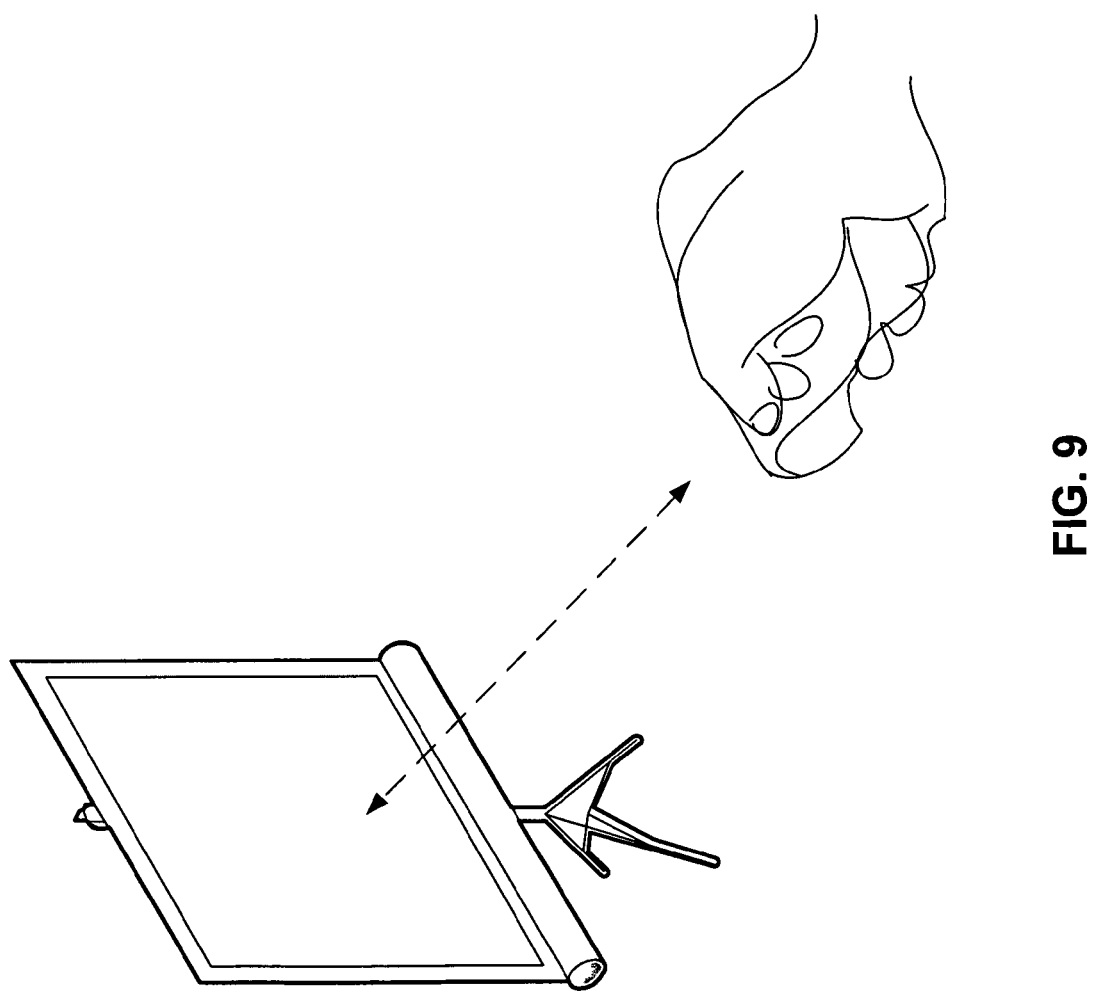
FIG. 9 illustrates a handheld device with an embedded optical tracking unit according to one embodiment.

One embodiment of a complete tracking system is described below in more detail. FIG. 9 illustrates a Handheld device with an embedded optical tracking unit. The Handheld device is being pointed at a TV screen. Above the TV screen is placed two IR LEDs operating at 950 nm.

FIG. 10 shows an idealized picture of what the pre-filtered imaging system would see, namely only the two spots. FIG. 10b shows a cross-section through the spots. From this cross-section it is easy to determine the location of the two spots. By contrast, FIG. 11 shows an example of the similar non-idealized image that would normally appear when there is poor rejection of the background and hence a poor SNR. The objective is to produce a system with images close to the idealized situation of FIG. 10.

To improve the SNR, the first step is to pulse the LEDs in time as shown by the solid line in FIG. 12. The dashed line shows for comparison a similar power DC-driven LED. The signals also include any background light that does not emanate from the markers but does pass through the optical filter in front of the imaging system.

The second crucial step is to turn the imaging system on for short periods of time synchronized with the emission of the pulsed LEDs. This is shown in FIG. 13 as the narrow time windows. The end result is that the SNR is improved approximately by the ratio of the "off" to "on" time, i.e. $T_{off}/T_{on}$ since only light present during the "on" periods is detected. The shorter the pulse and time gating of the sensor, the more the SNR improvement. There will, however, be practical limitations set by the specifications of the LED and sensor as well as the jitter specifications on the timing synchronization between the LED and the sensor. In one preferred embodiment, the timing synchronization is managed by the LED controller which also sends a synchronization signal via RF to the handheld imaging system. In another embodiment, the Handheld contains an additional on-board IR detector that detects when the LEDs are on and then triggers the exposure of the sensor. In yet another embodiment, the controller in the Handheld unit transmits the synchronization signal to the POD whose controller then modulates the LEDs.

It is important to discuss how the imaging system may be turned "on" and "off" to coincide with the pulses. In one embodiment, a mechanical or electromechanical shutter is placed in front of the sensor. In one embodiment the sensor is based on CMOS or CCD technology. All light impinging on the sensor can now be blocked or passed by the shutter. This approach is feasible if the entire sensor can be exposed at the same time. This is not the case for some CMOS sensors as will be described below.

In one preferred embodiment, the sensitivity itself of the sensor is gated. In one embodiment the CMOS sensor has an electronic exposure time that can be set. During this exposure time the sensor is sensitive to light, while it is insensitive at all other times. In a preferred embodiment the CMOS sensor has a pixel buffer that permits the exposure time to be completely independent of the pixel read-off time, up to a maximum of the frame time. Moreover, the exposure pertains to the entire frame at the same time. This is critical for proper operation with time gating.

For other, generally less expensive, CMOS designs the sensors do not have any buffer. In this case there are generally two operating modes. In the default "movie" mode, the exposure time and read-off time can still be set independently of each other, but the entire frame is not exposed at the same time. Instead each line may sequentially be exposed for a certain time and thereafter read off. This has the effect of scanning the photosensitivity in a horizontal band down the sensor. This mode is not useful for the time-gated exposure described above because the exposure on the entire sensor at once may coincide with the pulsing of the LEDs. Fortunately, this can be achieved by operating such sensors in a repeated "snapshot" mode, in which the exposure time and read-off time are sequential—the entire sensor is exposed and then read within the frame period. In one embodiment, the exposure time is set to 1/10 of the frame time. For a 30 Hz frame rate (~33 ms frame period), the exposure time is ~3.3 ms. The LEDs are then set to generate pulses slightly shorter than the exposure time (e.g., ~3 ms) and their timing is set to coincide with the sensor's exposure window. In this way, any light present during the sensor's "off" time is not detected and does not add to the unwanted background signal. This would apply to most common ambient and background lighting. Assuming that the pulsed LEDs generate the same time-averaged power (i.e., their peak power is ~10× higher than DC-driven LEDs), the SNR would be improved by approximately 10×.

Finally, the benefits of improving the SNR are three-fold. Firstly, it is possible to greatly improve the robustness of tracking against external ambient light sources. Secondly, it may permit the tracking system to use less power since less optical power is needed to obtain an acceptable level of robustness and tracking discrimination. It should be noted though that there are other limitations on how low the LED power can be set that would need to be taken into account. Thirdly, the optical power and optical discrimination are but two of the factors that limit the maximum (and minimum) range over which the tracking system works reliably. With a better SNR, the overall system design can be better optimized for cost, robustness, reliability, range, power consumption, and even size by trading off some of these parameters.

Time gating is but one method for improving the system's robustness to ambient lighting conditions. In some cases, it may not be possible or feasible to employ the sensor time gating procedure described above. In some circumstances, other methods may be employed. In general, there are two main physical attributes of the marker images that can be used to help to discriminate them from the surrounding environment, namely their spatial and temporal properties. The discrimination is typically achieved using some form of modulation of the marker power that is distinct from any background signals. Generally, the modulation entails producing either a time-dependent marker signal (e.g., turning the optical power of one or more LEDs on and off in a specific manner), or a space-dependent marker signal (e.g., arranging a spatial pattern for the markers that is distinct from the background). Combinations of the two types of modulations are also possible in which a spatial pattern is temporally modulated. An example of this is an arrangement where the markers each consist of several distinct sub-markers where the sub-markers are sequentially turned on and off such that the spatial pattern of spots that the sensor detects changes in time. In this case, the system is designed to track only the specific spatio-temporal pattern generated by the markers, thereby reducing sensitivity to virtually any background signals.

Both temporal and spatial modulation schemes can be very effective in improving the system robustness; however, each involves a compromise in other aspects of the overall system performance. In the case of simple temporal modulation, where one or more of the markers is turned on and off in a repetitive way at some known rate, the most obvious trade-off is in the effective response time or update rate for the system. For example, one scheme involving temporal modulation entails flashing all of the one or more LEDs in synchrony with the frame exposure (the same rate and proper phase) such that on consecutive frames the sensor detects all of the markers plus background signals followed by only the background (see FIG. 14). By subtracting the signals from these frames, in principle, only the marker images remain with zero or negligible background. In this example, the effective update rate is reduced by a factor of two since two frames are required to determine the coordinates. At least some of this reduction may be compensated by using a sensor with a faster frame rate, or by reducing the effective pixel resolution by reading every $n^{th}$ row or $n^{th}$ pixel. Either method has the effect of increasing the effective frame rate to permit the detection of the modulation. These approaches are similar to the novelty filtering described earlier in this section, and as such, are not as effective when the Handheld unit moves rapidly or when the ambient lighting conditions change rapidly (faster than the frame rate) and thus may not completely cancel upon the subtraction process. As an alternative to subtracting consecutive frames, another algorithm involves accepting only signals corresponding to images that are on (or bright) and then off (or dim) in consecutive frames. After the second of the two consecutive frames, only the signals that satisfy the on/off condition are accepted. Note that, because the pointing of the Handset may have changed from one frame to the next, a region around each image may be checked to determine whether the on/off condition is met. The faster the Handset movement that may be tolerated, the larger the search region may be. It is also possible to use previous frame data to estimate likely motion and thus reduce the required search regions. Although this approach also results in a reduced effective frame rate or response time, it may have advantages over standard frame subtraction in that it permits faster movement. See FIG. 14 for a summary of these two examples of temporal modulation. Other, more complex, modulation schemes may be used to help to reduce the effect of background signals. For example, markers may be flashed in succession or a continuous modulation function (e.g., sinusoidal) may be used in conjunction with standard frequency filtering operations to improve the SNR. These techniques, many of which are standard signal processing approaches to improving a system's SNR, typically involve a compromise between sensor frame rate and system update rate—higher frame rates and/or lower system update rates are required to perform the necessary processing.

Analogous to temporal modulation, spatial modulation, in which a spatial pattern of markers is used in conjunction with some form of pattern recognition, can be also used to improve system robustness. In this approach, the sensor data is read and analyzed. Signals pertaining to only specific patterns (e.g., relative locations of the n marker images) are used to compute the image coordinates. In principle, those patterns can be as simple as one or two bright spots; however, the more complex the pattern, the better the discrimination against background. One important consideration with using spatial (versus temporal) modulation is that the pattern itself may change during normal use. For example, in a simple two-marker arrangement in which the two markers form the pattern, the separation and orientation of the images will change as the user moves and twists the Handheld unit. Thus, it is not possible to match the signal to a single, fixed pattern. By placing, for example, a third spot near one of the other two, then the ratio of the individual image separations as well as the angle between the individual images are constants for different distances and orientations of the Handheld. This fact can be used to help establish the proper pattern for the processor to search for. Other, more complex patterns can be used, but the compromise for all purely spatial modulation schemes is that the amount of image processing required is typically greatly increased since, in general, the entire image may be analyzed. The result is that either a much faster processor may be used or the system update rate may be decreased in order to process the signal.

Combinations of temporal and spatial modulation may also be used. In these schemes, instead of simply modulating the power of the individual fixed markers, the spatial pattern itself is modulated in time. This can further improve the system's immunity to background and spurious signals since the probability of non-marker signals having the same temporal and spatial structure as that of the markers is virtually zero. In one implementation of this approach, each marker is composed of two or more spatially-resolved sub-markers. The sub-markers are then modulated such that some spatial characteristic of the marker system varies in time. For example, the effective spatial separation between the markers or the position of the center point of the markers may be modulated at some specific frequency. The system controller or processor then filters out all signals except for those that appear at the modulation frequency. Standard methods, such as lock-in detection, may be used to aid in improving the SNR. This approach is very similar to the temporal modulation described above except that, instead of turning the fixed markers on and off (or modulating their powers), the markers are always on and so there is always a signal present.

Another approach that does not involve spatial or temporal modulation of the markers is to rely on the fact that the signal strength and/or the size of the marker images remains within well-defined range, or above or below certain thresholds. Thus any signals that fall outside this range are false and therefore rejected or ignored. In some embodiments, the size of the images is proportional to the signal strength, and so either of these two properties may potentially be used. One embodiment of this technique is to first determine the range of image sizes (or signals strengths) that proper marker images will span over the desirable operating conditions of the system. When an image is detected that falls outside this range, then it is ignored. Specifically, the microcontroller reads and stores the sensor's pixel data by scanning each row. For any particular row where the number of consecutive pixels that contain signal is above a certain value, the corresponding image is rejected. In addition, any image whose maximum number of consecutive pixels containing valid signal is less than a certain value is also rejected. Alternatively, once the total size of any image is determined (by scanning all rows containing that image's pixels), if the image size (or signal strength) is below or above the predetermined minimum or maximum values, then that image is also rejected. All other images, up to the number of markers, are used to compute the image coordinates and signal levels. This method is illustrated in FIG. 15. If an improper image is detected, an indication of such may be displayed to the user via an on-screen icon and/or some form of feedback on the Handset (e.g., a vibration or the lighting of an LED). In addition, the screen cursor may also cease to respond to the user's actions when false images are detected. Of course, it is possible that false images will also fall within the same range, so the range should be as narrow as possible without rejecting proper marker images. In addition, this method is aided by the use of dynamic sensor control, as described in section 8, in that the signal levels and image sizes can be maintained within a narrow range over the normal operating conditions of the system. This technique may be simplified further by using only one of the maximum or minimum image size/signal as a criterion for determining proper images. The use of the image size and/or signal strength as a means for rejecting unwanted ambient light sources is generally not as robust as the more sophisticated modulation and gating schemes described above since it is more susceptible to false detection (e.g., images of light bulbs or reflected bright sunlight whose signal strength or size fall within the acceptable range). However, the additional computational requirements and system complexity needed to implement signal/size-based discrimination is relatively small. Therefore, the method can enhance the system robustness without significantly adding to the complexity or cost.

In yet another approach that does not involve modulation of the markers, information about the recent history of the system (e.g., image coordinates) may be used to help discriminate against interfering light sources. In one such embodiment, instead of all pixels on the image sensor in the Handheld unit being read by the microcontroller in the Handheld unit, only pixels surrounding a defined region of interest are read. The region of interest may be determined by the marker image coordinates corresponding to the most recent frame such that, for the current frame, only pixels that are within a specified number of pixels from one of the marker images on the most recent frame are read. This procedure has the effect of limiting the effective field of view of the system, which in turn has the effect of reducing the chances of background or ambient light sources affecting the performance of the system. Note however, that although the field of view is reduced, it is dynamic—as the Handheld unit's pointing direction and other DOFs change, the region of interest and effective FOV may also change. A key to the successful implementation of this method is to achieve the proper balance between reduced effective FOV (and thus improved immunity to interference) and robustness to rapid changes in image coordinates due to rapid changes in pointing and other DOFs.

As a specific example, in a two-marker system, the (x,y) coordinates on the image sensor are, for example, (122,90) and (130,92). The center of these two coordinates is (126,91) and a region of interest is chosen to be slightly larger than the region surrounding these two images, e.g., five pixels on either side of the images. Thus, the new region of interest would be between x=117 to 135 and y—85 to 97, a region much smaller than a typical image sensor containing 200 to 400 or more pixels on a side. On the next frame of the image sensor, only this region of interest would be read by the microcontroller. Any interfering light sources outside this region would then be ignored. As long as the (x,y) coordinates on the subsequent frames remain within this region then the new region of interest can be updated (i.e., shifted and expanded or contracted) based on the new image coordinates. If the coordinates change so rapidly that one or more of them falls outside the new region of interest, then that frame may be skipped and the size of the region of interest is increased on the next frame. This process can continue until both images are once again within the region of interest. In addition to greatly reducing the likelihood of interfering light sources, this method may, in some systems, permit a faster effective frame rate and thus a faster response time since fewer pixels must be read per frame.

Marker Reflections: Another type of background or interference that can cause problems under certain circumstances in the vision-based tracking and pointing system is related to the markers themselves. The marker signals detected by the sensor normally corresponds to light that propagates directly from the markers to the sensor. Under some conditions, however, it is possible for light from the markers that is reflected off of a surface to enter the optical system in addition to the directly emitted light. In these situations, the system may detect more than the expected number of images on the sensor. For example, a two-marker system could have four images that qualify as valid spots on the sensor—two from direct and two from reflected signals. Because the two pairs of images are necessarily displaced with respect to each other on the sensor, there is an uncertainty in the proper image coordinates and this can result in a time-dependent offset (e.g., a jumping back and forth) in the location of the screen cursor when the system is used as a pointing device. In many cases, this offset is directly related to the displacement on the sensor of the reflected images. This is clearly an undesirable effect and measures can be taken to reduce its severity or eliminate it altogether.

Depending on which set of the direct and reflected spots is recognized by the system as the relevant markers, the other DOFs aside from pointing, such as roll angle and distance, may be affected as well. For example, in a 2-marker arrangement, the system will generally recognize only two spots. If the two spots are either the direct spots or the reflected spots, then only the pointing will be affected since the spot separation and tilt will be the same for both direct and reflected spot pairs. However, if one each of the direct and reflected spots is recognized, then any or all of the DOFs can be affected.

In general, the required condition for marker reflections to be detected is that marker light reflected off of some object or surface enters the optical system of the Handheld unit at a small enough angle to intersect the sensor. Thus, the reflected light rays may enter the aperture (e.g., lens) of the optical system within the camera's field-of-view (FOV). The probability that reflections will enter the system and cause interference is a function of several factors, some involving the system design and some involving the environment in which the system operates (e.g., the arrangement of the room). The relevant system elements include the detection method, the emission angle of the markers, and the FOV of the Handheld's camera. In general, the larger the emission angle of the markers and especially the larger the camera FOV, the more likely it is that reflections will affect performance. A common scenario in which this condition is satisfied is when a reflective surface, such as a table (e.g., glass, metal, or polished wood), is situated between the user and the markers (POD), and in particular, when the reflected light entering the system forms a small angle with respect to the surface—a so-called glancing angle reflection.

FIG. 16 illustrates the effect. In these cases, the reflected light rays can be very close in angle to the direct rays and thus are more likely to enter the optical system within its acceptance angle (FOV). Unfortunately, in most cases, surface reflection coefficients increase as the reflection angle becomes closer to glancing, which can compound the problem. Of course, other paths for the reflected marker light are also possible (including multiple reflections), which can cause interference in the optical system. However, single surface reflections of the type described above are by far the most common.

There are a few basic approaches to addressing the potential problem of marker reflections. Ideally, eliminating them completely or significantly reducing their signal strength is the preferred solution. Aside from the obvious solution of removing all reflective surfaces from the area, it is difficult to completely eliminate the reflections because, unlike ambient background sources, the markers are required for the system to function.

One potential solution that may at least reduce the reflection signal's strength is to use known polarization properties of reflected optical signals. As is well-known in the field of optics, the reflection properties of light depend on its state of polarization, and the reflection coefficient of one state (parallel to the plane of incidence) is typically smaller than that of the orthogonal state (perpendicular to the plane of incidence), and, for some reflection angles (near Brewster's angle), can be much smaller. This effect can be used to diminish the magnitude of reflected signals by using polarized light sources as markers (a related well-known technique is used in "polarized" sunglasses to reduce the effect of glare). For example, for the common case of a horizontal reflective surface (e.g., a table), between the POD and the user, vertically polarized light will have a smaller reflection amplitude than either horizontally polarized or unpolarized light. The reflection coefficient depends sensitively on the reflection angle but decreases rapidly as the angle of incidence decreases towards ~57° (Brewster's angle), where the vertically polarized component of the reflected signal approaches zero amplitude. Thus, under the right conditions, the use of vertically polarized marker light can greatly reduce the effect of reflections from of a horizontal surface. Of course, if the reflection angle is too large (e.g., more than ~65°-70°, depending on the detection method), or if the reflecting surface is not perpendicular to the polarization, then the benefits of this approach are diminished.

For most arrangements, the marker light is inherently unpolarized. Thus some technique for polarizing the detected marker light would be required to utilize this method. There are two basic ways in which to polarize the detected marker light—by placing a polarizer at the source (i.e., at the markers), or by placing a polarizer at the sensor (i.e., in the Handheld unit). In either case, approximately 50% of the intrinsic unpolarized marker light will be lost in the process. For applications involving Handheld vision-based pointing and tracking, the preferred embodiment has the polarizer placed at the markers (or POD) in order to ensure that there is a fixed orientation between the reflecting surface and the polarization axis. A polarizer placed only in the Handheld unit would be free to rotate with the unit, thereby changing its orientation with respect to the polarization axis of the light. Thus, this method would be optimized only over a small range of roll angles and therefore is not as effective. Placing polarizers at both the markers as well as the Handheld unit is also possible, though the added benefit using two polarizers is minimal in most situations. Various types of polarizing elements, as known in the art, may be used, such as absorptive (e.g., Polaroid film or wire-grid), or beam-splitting (e.g., birefringent prisms and thin-film polarizers).

An alternative and potentially superior, yet more complex polarization-based method for suppressing reflections is the use of circular polarization. This approach relies on the fact that the state of circularly polarized light becomes approximately orthogonal upon reflection from many surfaces, i.e., right-hand polarization becomes substantially left-hand and vice versa. If a circular polarizer (CP) oriented to pass the direct light from the markers is placed in front of the Handset's optical system, then the orthogonally polarized reflected light can be nearly completely eliminated (see FIG. 17). A circular polarizer, as known in the art, consists of a linear polarizer (LP) followed by a quarter-wave plate (QWP) with its optic axis oriented at +45° or −45° to the plane of polarization. Unpolarized light passing through the polarizer becomes linearly polarized and then its orthogonal components undergo a relative quarter wavelength phase delay after passing through the wave plate resulting in circularly polarized light at the output. If circularly polarized light passes back through the CP (through the QWP first, then the LP), it will be passed or rejected by the LP depending on its state. Since the reflected beam's polarization is approximately orthogonal to that of the direct beam, then the two beams may be separated using a complementary CP placed at the Handset. In addition to the suppression of reflected marker light, the use of circular polarization has the added advantages over linear polarization of being essentially independent of the orientation of the reflecting surface as well as the orientation (roll angle) of the Handset.

The method described above will work very well in the ideal case where the polarization state of the reflected light is very close to orthogonal to that of the direct light. However, in practice, for many types of reflective surfaces under the conditions of interest (i.e., near glancing angles), the polarization of the reflected light will emerge with some degree of ellipticity (due to different reflection coefficients for the different component states) which results in some leakage through the CP at the Handset. The degree of ellipticity depends somewhat on the type of surface but largely on the angle of the reflected light with respect to the surface. In general, for shallow angles (e.g., near retroreflecting), the reflected light remains close to circularly polarized (but orthogonal); as the angle increases, the ellipticity increases until the polarization becomes linear at Brewster's angle; and for larger, more glancing angles, the ellipticity begins to decrease again and the polarization approaches circular at grazing angles. Therefore, under most conditions, the reflected light will attain some degree of ellipticity and result in some leakage through the CP. The amount of leakage through the CP can range from virtually zero for grazing incidence (where reflection coefficients are high) to ~50% for reflected light near Brewster's angle (where reflection coefficients are low). When the effect of the angle-dependent reflection coefficients are taken into account, the total power of the reflected beam incident on the sensor is typically between ~3% and ~6% of the power in the direct beam under virtually all conditions. In addition, in most situations, the POD is arranged to point in the general direction of the user and so the portion of the emitted marker light that contributes to reflected images will typically be smaller than that for the direct images. Also note that the degree of phase delay in the QWP is wavelength and incident angle-dependent. The CP is ideally designed to work at the wavelength of the marker radiation (e.g., ~940 nm) and for normal incidence. Light beams that enter the Pod and Handset CPs at substantially different angles can result in an increased leakage of reflected light. Finally, CPs can be made from inexpensive plastic materials and are commonly used as aids in 3D viewing applications. Therefore, this approach can be implemented with only a small (typically less than $1) additional cost to the system.

The main disadvantages of using polarization to suppress reflections are: a reduction in optical power by ~50%, the added cost of introducing additional elements into the system, and the fact that the effectiveness of the method depends on the specific conditions present during operation—in some cases, the reflections may be completely eliminated and in others, the reflection signals may be only slightly reduced. Therefore, while the use of polarization will virtually always aid in the reduction of reflection interference, it may not ensure that reflections are sufficiently suppressed in arbitrary operating environments (e.g., placement and orientation of reflecting surfaces, reflection angles, etc.). Thus other methods should be considered.

One other method that is quite simple and may be effective in some situations is to block the portion of the light that would be detected via reflection. The preferred manner of doing this would be to incorporate a non-reflecting extendible element on or near the POD. By adjusting the length of this element appropriately, only that portion of the emitted marker light that can potentially contribute to reflections will be blocked. The obvious disadvantage of this method is that some of the marker light that would otherwise be useful for pointing and tracking is not present. However, in many scenarios where a reflecting surface such as a table is placed between the POD and the user, the portion of the marker light being blocked would not be used anyway. This method requires the addition of a scattering or absorbing material (e.g., painted plastic) that can be adjustably set to the proper length just beneath each of the markers. The closer to the markers the blocking elements are placed, the shorter they can be. Light emitted from the markers at the angles that would be reflected into the Handheld unit's sensor is now physically blocked. It is desirable to not block any more light than is necessary so that as much of the viewing angle as possible is retained. This approach is approximately equivalent to using markers with a smaller emission angle (though the angle is reduced only on one side of the marker) and therefore has the similar effect of reducing the effective viewing angle in one direction. If the operating conditions change (e.g., the user moves away from the reflecting surface or the surface itself is moved away), then the blocking element may be adjusted accordingly in order to regain the maximum viewing angle. Clearly, this method is not ideal in general in that it requires careful manual adjustment and potentially limits the angular operating range of the system. But, in some situations, this simple method may be adequate to solve the reflection problem.

The methods described above involve reducing the relative signal strength of the reflected images or eliminating them altogether. Another general approach involves receiving both the direct and reflected signals but discriminating against the unwanted signals during detection or image processing. Different characteristics can be used to discriminate the reflected signals from the direct signals. These include signal properties such as strength, image location, or possibly time.

The simplest of these approaches relies on the fact that, in the vast majority of cases, the reflected signal power will be lower than the directly detected signal. Therefore, a detection threshold can be set between the reflected and direct signal levels, thereby cutting out the reflected signal since it is below the detection threshold. There are two different thresholds that can be adjusted. The individual sensor pixels have an electronic threshold setting that can be adjusted. In addition, a threshold corresponding to the total signal for each marker image can be implemented and set to a user-defined level. Each type of threshold can be used separately or in conjunction and there are advantages and disadvantages to each. The electronic pixel threshold, as described in previous sections, is already used to aid in filtering out some background signals, both optical and electronic. If the detection method is substantially linear (i.e., the sensor pixels are not saturated), then it is possible to adjust the pixel threshold (typically by increasing it) in order to cut out light from reflections. Of course, this approach works well if the reflected signal is significantly smaller than the direct signal. However, in cases where the reflectivity is high (e.g., glancing angle reflections), it becomes more difficult to properly adjust the threshold since the reflected and direct signals are of similar strength. The result of this method can be a reduced dynamic range for the sensor, but it eliminates the unwanted reflections prior to detection and processing.

In some detection methods, many of the individual pixels in the marker image are saturated (i.e., the received optical power exceeds the maximum detectable level for the sensor), and thus the detection is non-linear. In these cases, the signals from individual pixels can be the same for both reflected and direct images (both saturated), and therefore use of the pixel threshold is ineffective in discriminating the two signals. However, the total signal, obtained by integrating the pixel signals, will be smaller for the reflected versus direct images. Therefore, a threshold can be set for the total signal from each image that will reject the weaker reflection signals. An important difference for this approach is that, here, all images may be detected and processed before determining which are the proper direct signals and which are the unwanted reflections. While this places an extra burden on the system controller, methods can be employed to optimize the process. For example, in some non-linear detection methods involving saturated pixels, the detected optical power is proportional to the size of the image, and therefore to total signal when the pixel signals are integrated. In this case, the reflected images will be smaller in size than the direct images. This fact can be used to discriminate against reflections in one of two ways. The preferred method is to program the controller that reads the sensor to reject all images that are less than a specific minimum threshold size and accept those that exceed the threshold. By setting the threshold between the image sizes corresponding to reflected and direct signals, the reflected signals can be ignored as background by the system in real time as the sensor is being read. Since the threshold is fixed in this method, then it is important that some form of automatic gain and/or exposure be used in order to ensure that the thresholding procedure is robust as the input optical power from the marker changes (e.g., as the user moves). Alternatively, the entire sensor can be read, including all direct and reflected images, and the stronger set of images will be accepted. For example, in a 2-marker arrangement, four images may be detected when reflections are present. After each frame is read, the two images corresponding to the two strongest (direct) signals will be interpreted as correct coordinates and sent to the receiver/POD. This approach has the advantage that the signal and image size can be arbitrary and no fixed threshold may be used, but the disadvantage that potentially more images may be detected and processed.

Another signal property that can be used in some situations to discriminate direct and reflected signals is the location of the images on the sensor. In the most common scenarios where reflections can present a problem, the reflecting surface is typically below the user and the Handheld unit. Therefore, reflected light will always enter the optical system such that the reflected image is above the direct image in the sensor coordinate system. This fact can be used in many cases to determine which set of images are direct and which are reflected. In some embodiments of this method, the entire frame is read and analyzed, either in the Handheld controller or at the receiver or host computer. In some other embodiments, it is possible to read and analyze only the images of interest. For example, in the simple case of the Handheld unit roll angle being oriented near 0°, the y-coordinate values of the sensor pixel coordinates for the reflected images will always be higher than those for the direct images, i.e., the reflected images are always physically above the direct images. Therefore, in this case, the n images (in an n-marker arrangement) with the smallest y-coordinates (assuming a standard x-y coordinate system) are interpreted as the correct set. Depending on how the sensor is oriented and how the pixels are read, it is possible to detect and analyze only the n direct images, which obviates the need to read and analyze the entire image sensor. For example, if the sensor is read from the top, then, in most cases, the first images that are read will correspond to reflections. However, if the sensor is read from the bottom, then the direct images will be read first. Any signals that appear on the sensor above the first n images, e.g., reflected images, are ignored (see FIG. 16(b)). The simplest way to arrange this is to orient the sensor such that the first lines that are scanned during normal operation are at the bottom of the sensor when it is oriented near 0°. It is also possible in some image sensors to read the pixels from either side, which is effectively equivalent to rotating the sensor about the x-axis, thereby inverting the y-coordinates ($y_{new} \rightarrow y_{max} - y_{old} + 1$). In general, any method in which the n direct images are the first n signals detected will permit the suppression of marker reflections without the need to perform full image analysis. Note that any image coordinate inversion (in x or y) may be accounted for in the transformation to the screen coordinates in order to maintain proper cursor control for direct pointing. Note also that this type of approach for reducing or eliminating the effect of marker reflections may cause the system to be more susceptible to reflections that occur from the top (i.e., a reflective surface above the POD) as well as other stray (non-marker) images that originate from sources above the POD. Therefore, the optimal solution will typically depend on the environment in which the device is used. Ideally, the user has the ability choose between the different modes of operation (normal or inverted) depending on which source of interference is more prevalent. This choice may be executed by the user with the Handheld device directly via specific button presses, for example, or through the screen user interface by selecting the desired mode as a menu option, for example. In this case, the proper command is transmitted from the POD to the Handset's controller.

This simple procedure works well when the Handheld unit is not rotated significantly in the user's hand (i.e., roll angle near 0°). However, as the unit (and sensor) rotates, the pixel coordinates will change and for large enough roll angles, depending on the separation between the direct and reflected images, the y-coordinates for the two sets of images will not follow the simple rule stated above. If the roll angle is known, either using the methods described in co-pending applications '387', '405', and '435', or some other mechanism, such as conventional tilt sensors, then the effect of the roll angle can be removed from the image coordinates. The coordinates are effectively transformed to a reference frame that is equivalent to that for a non-rotated sensor, and the procedure described above for distinguishing the reflected from direct images can be used.

The third property that can be used, in principle, to distinguish reflected from direct signals, is time. The desired, direct signal will always arrive at the sensor before the reflected signal. Two additional elements may be included in the system in order to use this approach—the markers may be modulated or turned on and off in order to establish a time reference and the sensor may be effectively gated in time in order to separate the direct and reflected signals. In one embodiment, the markers turn on at some point in time, and the signals are received at the sensor at some later time, with the reflected signals arriving at a slightly later time than the direct signals. The pixels are read using a precise clock that permits the system to determine which n images arrived first and these are then processed by the controller as the correct images. The main difficulty with this approach is that the time scales involved are very short. For example, in a typical scenario, the path difference between the direct and reflected beams can be a few centimeters or less. This corresponds to a time difference on the order of 100 picoseconds. This means that the sensor pixels may be read on a time scale shorter than this in order to discriminate properly. This requires extremely fast clock speeds of greater than 10 GHz. Standard CMOS- and CCD-based image sensors currently do not operate at these speeds. Other, more advanced detector technologies, such as photodiode arrays using high-speed photodiodes could, in principle, be used instead.

Note that any combination of the approaches described above for reducing or eliminating the effects of reflections can be used. For example, polarizers placed at the markers and/or Handset to reduce the relative reflected signal strength can be used in conjunction with intensity-based thresholding (e.g., setting a signal level or image size threshold) in the Handheld unit to enhance the effectiveness of reflection discrimination.

Figure 18:
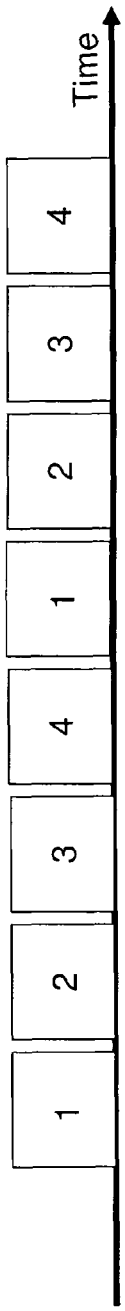
FIGS. 18-19 are diagrams illustrating multi-user configurations according to one embodiment.

11. Multi-User Implementation:

Due to the short, bursty nature of the communication between the POD and the Handheld unit, it is possible to implement time-division-multiplexing to allow multiple handsets to communicate with the same POD on the same frequency. One method involves the use of a beacon-style protocol so that each new handset can be inserted into the proper timeslot when it is turned on. In one embodiment, described here, four users are supported, as illustrated in FIG. 18. The maximum number of users is ultimately limited by the speed of the data transmission between the Handheld and the POD/receiver.

In the following, the 1 POD/4 Handset scenario is described. Key points that need to be addressed are changing frequency channels and ensuring proper association between the Handset and the POD. From the WavIt software programming standpoint, the main difference to note is that 4 users may be active at any given time.

1. User Information:

All button presses and coordinates continue to be sent in data packets under "type=1". The user number is now obtained by looking at the "Buttons'" $14^{th}$ and $15^{th}$ bit (e.g., 0110000000000000).

Figure 19:
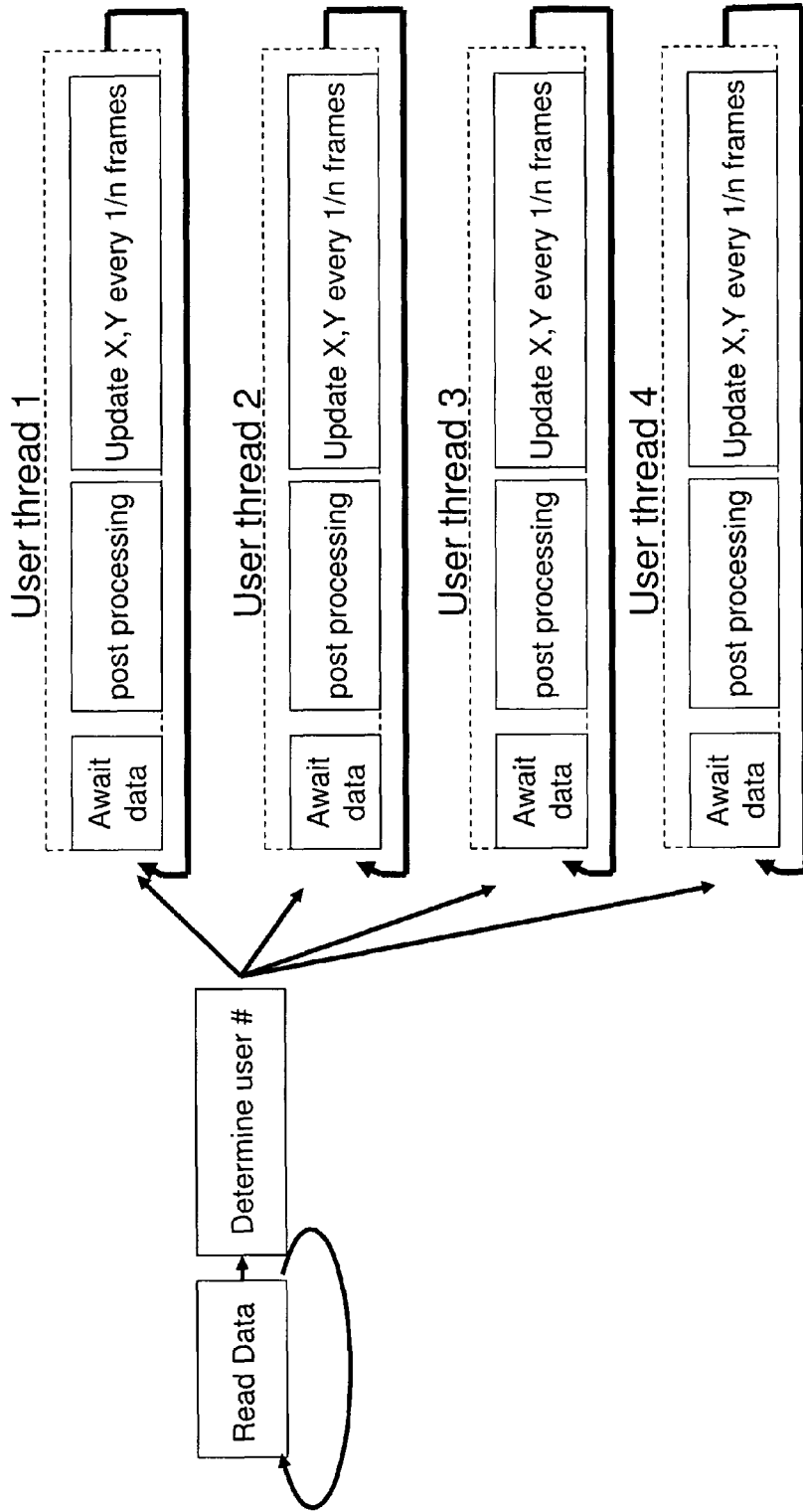

2. Building Arrays and 4 User Threads and 1 Reading Thread and 1 Sending Thread:

As soon as the user number has been determined, all the information regarding button presses and coordinates should be stored in arrays specific to the user number. The main routine should now immediately be free to return to the Read Routine to await new data, which could be from a different user. This procedure is shown in FIG. 19.

3. User Threads:

Each of the user threads should be structured as follows:
Await data from main routine.
Perform post processing (e.g., rotation compensation, interpolation, smoothing).
Update X, Y screen coordinates every 1/n frames (normally n=3).
Then go to step 1 and await new data.
If the WavIt program is stopped the wait routine (1) should also stop.

4. Multi-User Mouse Control:

Windows operating system currently only supports one input device (e.g., mouse). There are several scenarios where multiple mouse capability is desirable:

Presentation and Collaborative work on the same screen: More users can point-and-click or draw at the same time.
Gaming: People play with or against each other.
Two handed applications: Applications where two hands are better than one (e.g., navigate a landscape with one hand while pointing with the other).
Passing the baton: Instead of passing the physical remote around, people can interact more quickly by passing a virtual baton.

There are several strategies for dealing with the operating systems multiple-cursor shortcoming:

Write Special Applications: This strategy is best in that it allows the application to fully exploit the degrees of freedom and multi-user capability, but it is the most time consuming from an implementation point of view. This can be used for WavIt-specific functions such as "drawing on screen" or "laser-less pointing" (i.e. moving multiple virtual mouse "sprites" around on a screen). This approach may also be used in some capacity to emulate multiple controllers in games.

Emulate multiple mice by time slicing: This approach is possible but has many implementation issues. The paper "A multi-cursor X window Manager supporting control room collaboration", G. Wallace et al., provides a short overview and a successful implementation. The challenges include:

Showing multiple cursors that are clearly distinguishable.
Properly activating mouse events (i.e. "mouse over", "click").
Determining who has focus and the question of multiple focuses.
Having clear cursor association with individual focus windows.
Determining who decides which window is on top (Z-order of windows).
Ability to be application non-specific.
Until these issues are resolved, this approach will generally not be used.

Use token-based time sharing: This approach basically assumes that while there may be many cursors on the screen, there will typically be a single user trying to press buttons and activate events at any given time. A user can assume control by pressing on the central button, for example. Therefore, when a user clicks on an icon, they take over the mouse control. Each user may have a visually distinguishable on-screen "sprite" that moves and responds to their actions. For example, a colored ball sprite (red, green, blue, or yellow) may appear for each user, with the screen cursor indicating control attached to one of the sprites (e.g., the blue one). When another user (e.g., red) presses the center button, the screen cursor locks to their ball, indicating that the red user has taken cursor control.

12. Elimination of Roll Ambiguities:

The standard two-marker arrangement permits tracking of four or five DOFs, depending on the specific implementation. One of these DOFs is the roll angle, or the degree to which the Handheld unit is tilted in the user's hand about the pointing direction (i.e., an axis perpendicular to the sensor's surface). In the standard two-marker arrangement, the two markers are substantially identical to each other in that there is no distinction made in the system between them. This fact can lead to a degeneracy or ambiguity in the roll or tilt angle when the Handheld unit is tilted past +/−90°. For example, a roll angle of +100° appears the same to the system as a roll angle of −80°. In general, roll angles of $\phi$ and $180°+/-\phi$ are indistinguishable in this configuration. In practice, this results in a usable tilt range less than +/−90°. For some applications, this limitation may be acceptable; however for others, the ability to tilt the Handheld unit beyond +/−90° may be desirable. A simple example of the latter is one where the Handheld unit is operated upside down (roll=180°). Ideally, the system should recognize this condition and properly compensate the detection of the other DOFs (e.g., pointing) for the inverted orientation. Other modes of operation in which the unit is tilted at large angles include manipulating or rotating objects on a screen past +/−90° and virtual dial functions such as volume adjustment. In general, the larger the detectable tilt range, the larger the dynamic range for any tilt-based function that can be obtained.

The basic solution to eliminating this ambiguity is to break the symmetry in the two-marker arrangement. Thus, any mechanism that permits the distinction between the two markers can, in principle, be used to eliminate the ambiguity. In general, there are several properties of the markers that could be used to distinguish one from the other(s)—optical power/signal strength, size, shape, and spatial or temporal pattern. In many cases, there is a tradeoff between complexity and effectiveness of the different approaches and the optimal method may depend on other aspects of the system, such as the detection method. For example, in the simple two-marker system, one marker can be made to have a stronger signal (e.g., higher power) than the other, and this fact can be used to uniquely identify each marker using a simple comparison between the respective marker signals. This simple approach does work in principle, however, for some configurations, it may not be practically feasible.

In many arrangements, it is desirable to maximize the operational range of the system. In these cases, the marker powers are generally operated at, or near, their maximum practical levels. For example, for LED-based markers, the LEDs are generally run with close to the maximum current that can be safely used, typically around 90-100 mA for standard high-power IREDs. In order to use power-based marker distinction, one of the markers (e.g., A) would have to be operated at a sufficiently lower power, $P_A$, than the other (e.g., B) in order to ensure that its signal will virtually always be smaller than $P_B$. The degree to which $P_A$ is reduced below $P_B$ will depend on the inherent variations in the marker signals over the system's operating range. If the inherent signal variations are small (both temporal fluctuations in the individual signals are small and the spatial distributions for the markers' optical powers are well-matched), then $P_A$ may be only slightly smaller than $P_B$ (e.g., $P_A \sim 0.8 P_B$) in which case the operating range is only slightly reduced. On the other hand, if there are large variations in the signals or large differences between the marker's spatial patterns, then $P_A$ will have to be much smaller than $P_B$ (e.g., $P_A < 0.5 P_B$) in which case the effective operating range is more significantly reduced. Techniques such as signal averaging and precise marker alignment can be used to help reduce the effects of signal variations.

In addition, some arrangements use signal differences between the markers in order to detect other DOFs, such as the user's view angle. In those arrangements, using signal differences to also distinguish the markers may add complexity to the system or have other undesirable effects such as further reduced operating range. Therefore, it is advantageous to have other marker characteristics available on which marker distinction can be done.

Other marker distinctions can be based on the size and/or shape of the markers (or, more precisely, the size or shape of their images on the sensor). A simple example of this approach is to have marker A measurably larger than marker B, independent of the respective optical powers of the two markers. Other examples include using markers with different shapes, aspect ratios, or spatial orientations. A common requirement of such methods that use size or shape for marker distinction is that the marker images may be spatially analyzed in some way. Some or all of this analysis can be performed by a processing element in the Handheld unit or by a processor in the receiver (e.g., POD) or computing (e.g., PC) unit. For example, spatially elongated markers may be used in which marker A has its major axis horizontally aligned and marker B has its major axis vertically aligned (see FIG. 20(a)). By sensing and analyzing the spatial distribution of the pixels comprising the markers' images (e.g., determining the orientation of the markers' axes), the Handheld device's roll angle can be uniquely obtained.

One disadvantage of using marker shape or size is the requirement for more complex image analysis versus simply determining the images' signal strength and location, which is the preferred detection method since it requires the least amount of processing and/or data transmission. A variation on the methods described above that retains some of the advantages of each is to incorporate a third marker (or, in general, an additional marker to any symmetric marker arrangement) that is located such that the spatial symmetry of the two-marker arrangement is broken. An example of this is shown in FIG. 20(b). In general, any asymmetric arrangement of the three markers can be used (e.g., where the third marker, C, is closer to marker A than marker B), but there is a tradeoff that may be considered. The more asymmetric the arrangement (i.e., the closer marker C is to either A or B), the better the ability to resolve the roll ambiguity, especially at large user distances or large view angles. However, if markers A (or B) and C are too close together (which can occur for large distance or view angle), then the images of the markers may not be easily distinguished as separate markers. This may place an upper limit on the range over which the system can resolve any roll ambiguities. In general, there is an optimum arrangement of the three markers that will balance the elimination of roll ambiguities and operating range.

One simple solution to marker separation/operating range limitation is to place marker C much closer to A or B such that the two markers are detected as a single image. If the markers are all of approximately equal power, then there will be an inherent asymmetry in the signal strength from the two sides of the image, with the side containing marker C being approximately twice as strong as the other side. This approach is essentially equivalent to the previously described approach that uses the relative signal power between the two markers, but without the reduction in range. The difference here is that the power required to operate the markers is approximately 50% higher due to the addition of a third marker. Equivalently, one of the two markers may be operated at a higher power to achieve an equivalent arrangement.

The arrangements described so far use either the signal strength or spatial properties of the markers in order to distinguish one from the others. Another marker property that can be used, and has some advantages in some situations, is its temporal pattern or signature. This is especially useful in cases where the roll ambiguity does not have to be determined or updated at the same rate as the pointing function since the use of timing generally requires a slower effective response (or the use of a sensor with a faster response).

One simple embodiment of the use of timing is to flash one of the markers on and off on alternate image frames while keeping the other marker(s) on during all frames as illustrated in FIG. 21. After every two frames, the image whose signal changed from "on" to "off" or "off" to "on" will be known to be marker A, for example, and the image whose signal is essentially unchanged is known to be marker B. Consecutive frame subtraction is a standard method that may be used to perform this operation. If only one of the markers (marker B in this example) is used as the reference for pointing, then the update rate for pointing will be unaffected, but the update rate for the other DOFs that require multiple markers would be decreased (e.g., from 30 Hz to 15 Hz) since it requires two frames in order to detect both markers. In this case, the peak power on marker A could be higher (e.g., the IRED is driven with approximately twice the current in its "on" state) so that the time-averaged power from the two or more markers is the same.

In many cases, the roll ambiguity does not require rapid or constant updating since it is a relatively rare occurrence (when the user twists the Handset beyond +/−90°). Therefore, the modulation or flashing of one of the markers can be made to be less frequent or activated under specific conditions, e.g., when the roll angle exceeds ~60°. In one embodiment, one of the n markers, e.g., marker A, is simply blinked off every $m^{th}$ frame, where m can be a relatively large number, e.g., 10. Depending on the coordinates of the marker that is turned off for one frame relative to those of the other marker(s), it can be determined whether the roll angle is $\phi$ or $\phi+/-180°$. In this way, the tracking of all DOFs is maintained except for brief periods when one of the markers is blinked. Following each blinking period, the roll angle is corrected, if necessary, based on the coordinates the modulated marker.

An alternative arrangement that, in some cases, could avoid the need to reduce the effective update rate of the system is to modulate the power of one of the markers instead of turning it off and on. The advantage of this approach is that if power of the modulated marker is always above the detection threshold, then the update rate for tracking the system's DOFs does not have to be reduced and it is only the roll ambiguity that will require more than one frame to resolve. The degree of modulation required for this method depends on several factors (e.g., signal size, noise) but basically needs to be high enough in order for the system to determine which of the markers is being modulated. However, if the modulation amplitude is too high, then the modulated signal will periodically fall below the detection threshold. Thus, there is a tradeoff—the higher the degree of modulation, the more robust the marker discrimination, and the lower the degree of modulation, the less the range and coordinate determination is affected. In general, the degree of modulation should be just enough in order to discriminate the markers.

It also important to note that, in order for the modulation of the marker power to be properly detected, the reading of the sensor pixels may be synchronized with the optical source modulation. The timing of the sensor pixel readout is set by a master clock. The synchronization requirement means that the signal that modulates the marker power (e.g., the IRED current) may be locked to the same master clock and with the appropriate delay so that the start and end of a frame readout coincides with the start and end of high or low period of the marker modulation. This form of electrical synchronization is a common technique known in the art.

As a specific example of the embodiment described above, in a two-marker arrangement, marker A is modulated such that its signal varies by approximately 20% over two consecutive frames and marker B is driven normally (i.e., DC). Under most circumstances, the signal from each marker will not vary by more than ~10% over consecutive frames. The sensor is read every ~33 ms, corresponding to a ~30 Hz update rate. This degree of modulation is small enough that the system will operate normally for pointing and tracking of the standard DOFs with an update rate of ~30 Hz. Every two frames (~15 Hz), the marker signal strengths from the image sensor are analyzed by the control unit or PC to determine which of the two signals has undergone a cycle of modulation of ~20% and this signal is determined to be from marker A. The correct modulation can be determined in any number of ways, as known in the art, for example, by temporal (e.g., looking for "up/down" or "down/up" transitions or by frame subtraction) or frequency analysis (e.g., FFT) of the signals. This procedure permits the elimination of roll ambiguities at an update rate of ~15 Hz for a system operating at ~30 Hz.

Under some circumstances, this simple procedure may not be sufficient. Specifically, if the intrinsic signal fluctuations become larger than the modulation, then marker discrimination will become difficult or impossible. This is more likely to occur, for example, when the signal from the modulated marker is relatively small, for example, near the edge of the operating range (i.e., large distances and/or view angles). There are two potential remedies for the case where the signal is too noisy. One is to use signal averaging techniques, as known in the art, to effectively reduce the effect of noise. By averaging, for example, the signals from alternate or $m^{th}$ frames, the presence of modulation will become apparent.

The number of frames that may be averaged depends on the relative degree of modulation compared with the noise present in the signals. The consequence of signal averaging is that the effective response time for marker discrimination will be increased though the detection of the other DOFs will be largely unaffected. An alternative remedy to combat increased signal noise is to increase the modulation amplitude of the marker power. In practice, this solution applies to the case where the signal noise increases during use since the initial modulation amplitude (~20% in this example) is set to be larger than the expected signal noise. Either of these approaches (signal averaging or increased modulation) may be used separately or they can be used in combination. Ideally, both of these methods are employed dynamically and they are used only when necessary. For example, if a user moves or points from a relatively low noise to higher noise area (e.g., by moving farther away from the POD or pointing to a different area of the screen) such that the initial 20% modulation of marker A is insufficient to discriminate the markers after two frames, then averaging of additional frames is performed. The frame averaging increases until the criterion for modulation is met for one of the marker signals. If the signal then moves back to a lower noise region such that the modulation criterion is exceeded by some predetermined amount, then the frame averaging may be reduced. The modulation criterion may be determined by the size of a spectral signature or by the size of consecutive jumps in the signal strength of one marker versus the others, or by any other standard method as known in the art. Alternatively, when the modulation criterion is not met, a signal may be sent to the markers that effectively increases their modulation amplitude until the criterion is met for one of the markers. Similarly, if the criterion is exceeded by a predetermined amount, then the modulation may be decreased. In general, the use of signal averaging will slow the system response and the use of increased modulation will reduce the operation range of the system. This form of dynamic averaging and/or modulation adjustment permits an optimum tradeoff between range, response time, and system performance.

Other methods for marker distinction may be employed, most of which are variations or generalizations of the ones described here. For example, in systems that use a standard color-sensitive image sensor, markers may be distinguished based on their respective colors (e.g., marker A is red, marker B is green). While this simple approach works in principle, it is not preferred because of the requirement for both color sensors and visible markers. Color sensors are generally more expensive than monochrome (black and white) and discrimination of ambient light becomes difficult or unfeasible. In addition, the presence of visible markers in the system may be considered an undesirable distraction. However, in applications where the use of visible markers and color sensors is feasible, this simple approach is ideal.

A variation of this approach that overcomes some of its drawbacks is to use an IR-based version of color discrimination. This would retain the ability to easily discriminate markers from ambient lighting and would permit the use of invisible markers. For example, markers A and B may be chosen to emit IR light with a center wavelength around 850 nm and 950 nm, respectively. These wavelengths are both in the near IR where they are invisible yet detectable by standard CMOS sensors, they correspond to commonly available IR emitting devices, and they are far enough apart spectrally that standard filter technology can be used to distinguish them. In this case, the required sensors would have the proper IR filtering integrated into them such that each pixel is sensitive to one of the IR bands. This is essentially the IR equivalent of the standard color (RGB) sensor design. The disadvantage of this approach is that the sensors with the properly designed integrated IR filters are not currently standard devices and would require a custom design. Also, the pixel resolution for a given sensor may be reduced by a factor of two since only alternate pixels are sensitive to each marker wavelength. Technically, however, this is a nearly ideal approach based on its simplicity and performance. An alternative, yet related, approach is to use a more recently developed sensor type that does not require the integration of individual filters on each pixel and relies on the inherent wavelength-dependent penetration depth of light in silicon. Such sensors, referred to as "direct image sensors" (e.g., Foveon X3), are based on recently developed technology designed for color digital imaging, but could be extended into the IR and would provide a simple means to enable marker discrimination without a reduction in pixel resolution. In addition to the lack of a requirement for the standard mosaic filter overlay (e.g., Bayer pattern), it is also possible that the requirement for long-pass (visible blocking) filtering will be reduced due to the natural absorption of shorter wavelengths by the silicon itself.

Temporal patterns other than the simple alternate frame modulation described above that distinguish at least one marker from the others may also be useful. For example, turning off or modulating one of the markers every $m^{th}$ frame, where m is greater than 2, may have some benefits in some situations. Specifically, the update rate for marker discrimination and thus complete roll detection (without ambiguity) will be reduced, but the other DOFs will be less affected. In some scenarios, this may be a preferred arrangement.

Another fairly simple approach to resolving potential roll ambiguities that will suffice in many situations, yet obviates the need for marker distinction based on physical differences between the markers (e.g., modulation, intensity, wavelength, etc), is to use information about the recent history of the Handset's roll to determine the current roll angle. For example, it may be assumed for the majority of applications that the user's roll angle does not change drastically from one frame to the next. Therefore, an algorithm can be employed that computes both possible roll angles and accepts the angle closest to the previous value as the more likely, and therefore correct, one. This method relies on there being a correct initial value for the roll angle from which future values are tracked. For example, when the unit is first turned on and begins tracking its coordinates, an orientation is assumed or, in some cases, may be entered by the user. This orientation (assumed or known) determines the unique initial roll angle. In general, the assumed initial roll angle will be between −90° and +90° for a Handset that is held upright in its normal operating orientation. If it is known that the Handset is initially inverted about the z-axis, then the initial roll angle would be between 90° and 270° (or equivalently, between −90° and −270°). From this point on, each time the two possible roll angles, $\phi$ and $\phi+/-180°$ are calculated from the measured coordinates, the value of $\phi$ that is closer to the previous one is chosen as the correct one. This procedure continues until the system is reset or re-initialized. In general, the roll angle will be calculated each time the coordinates are updated, which is typically at the sensor frame rate (e.g., ~30 Hz). Therefore, for most user activities that involve changes in the roll angle, the angle should be easily tracked from its initial value. Specifically, in order for an error to occur due to the roll angle changing so rapidly that the assumed condition for resolving the ambiguity (i.e., the angle closer to the previous angle is correct) is violated, the user would have to rotate the Handset about the z-axis more than ~90° during one update period. Assuming that this update period corresponds to a frame period of ~33 ms, then the user would have to exceed a rotation rate of ~2700 deg/s in order to lose proper tracking of the roll. This is clearly an excessive rotation rate that is very unlikely to occur in most situations.

The advantages of this method are that it is fairly simple to implement and it does not involve any modification to the physical properties of the markers. The main disadvantages of the method are that it is fundamentally a relative tracking procedure, and it requires some form of initialization. The initialization may be addressed quite simply by assuming a default (e.g., upright) initial orientation unless otherwise specified. This assumption may cover the vast majority of typical use scenarios. The relative tracking aspect has the drawback (like all relative tracking methods) that it requires constant updating to operate properly. If, at any time, an error occurs that leads to the roll angle being inverted, then this error will persist until the system is reset or initialized, i.e., there is no absolute reference as in the other methods described above in which one marker is distinguished from the others. This potential drawback could be addressed by incorporating some form of periodic or occasional orientation reference to correct the roll angle if it is in error. For example, one of the markers may be flashed briefly, as described above for the temporal modulation schemes, once every second or so in order to properly identify one of the markers and correct or reset the proper orientation if necessary. Between the flashes, the relative method for roll ambiguity is used to keep track of the angle. In this way, all coordinates and DOFs are tracked for the vast majority of time and the roll angle is reset only occasionally. More sophisticated procedures could also be used in which the period of the reset flash of the marker is a function of the rate of change of the roll angle or the roll angle itself. In one approach, the reset rate is directly proportional to the calculated rotation rate—the faster the roll angle changes, the faster the flashing. In another approach, the flashing occurs only (or more rapidly) when the roll angle approaches and passes +/−90°. These types of methods help to overcome the inherent weakness of this approach, i.e., that it is not absolute.

The methods described above are optical in nature and all have some benefits and drawbacks. Other methods and sensing mechanisms that do not rely on the optical signals from the markers to detect roll angles (without ambiguity) may be combined with the basic optical tracking and pointing to provide the required roll information. The simplest example of this is the use of a standard tilt sensor. Tilt sensors may be based on various physical mechanisms (a fluid-based mechanical level is a common example), but they all make use of the earth's gravitational field as an absolute reference from which a tilt angle is measured. The use of one or more mass and spring systems is another traditional technique that can be used to detect an object's tilt. In recent years much progress has been made in the performance, size, and cost of inertial-based sensors that can also be used to sense tilt. Micro-electro-mechanical (MEMs)-based systems have been developed into extremely small and inexpensive accelerometer and gyroscopic inertial sensors from which tilt sensors can be made. A preferred arrangement for the present application of roll detection makes use of a two- or three-axis accelerometer module with its axes aligned along the x, y, and/or z axes, with the z axis being the one about which the roll angle is measured. A two-axis model would detect roll and the three-axis model is sensitive to roll and pitch (rotation about the x axis). Such devices are commonly available from companies such as Analog Devices. The signals from the two or three individual accelerometers are processed to provide the requisite data for tilt measurements. These procedures are well-known by those skilled in the art.

With an appropriately aligned tilt sensor placed in the Handset, the roll angle may be measured over the full 360° range without any ambiguity (e.g., +90° and −90° are easily distinguished). The sensor should be aligned such that one of its axes is aligned approximately along the z axis, or optical axis, of the Handset's optical system. The signals from the tilt sensor may be processed in the Handset's microcontroller or transmitted to the POD along with the image coordinates and processed in the POD's microcontroller or the computer connected to the POD.

Accelerometer-based tilt sensors are absolute in that the angles that they measure are with respect to a fixed reference (earth's gravity). It is also possible to use rate-based inertial sensors to determine the Handset's roll angle. For example, gyro-based sensors are sensitive to the rate of rotation about the gyro's axis. Therefore, if an initial reference is provided (e.g., by using the optical markers and some assumption about the initial orientation), then the gyro signals can be used to track the Handset's angular rotation rate about the z axis, which can then be converted into roll angle. While this approach works in principle, it has the drawback that it is inherently relative and therefore the gyro signal may be constantly tracked in order to accurately measure the roll. In addition, drift in the gyros can leads to errors in the roll angle. Therefore, the use of gyros is less preferable than accelerometers for detecting the Handset's tilt or roll angle.

Finally, any combination of the methods described above involving intensity, spatial, temporal, wavelength discrimination, relative roll angle tracking, or inertial tilt sensing may be employed and will be understood by a person skilled in the art.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system comprising:
  a handheld device having a pixelated sensor, an optical filter for passing a predetermined frequency band of radiation to the sensor, and a transmitter;
  electronic equipment having a display;
  at least two spaced-apart markers, each of which are positioned proximate to the display, the markers providing radiation at the frequency band passed by the optical filter, wherein the handheld device includes an imaging element that produces an image of the two of more spaced-apart markers on the pixelated sensor; and
    a processor coupled to receive image data of the image of the markers on the sensor and to compute coordinate data of the image on the sensor from the image data, the coordinate data requiring less data than the image data, the processor being coupled to the transmitter to transmit the coordinate data to the electronic equipment, wherein coordinates of a screen cursor are stabilized the coordinate data from the handheld device in conjunction with a following procedure performed for each X, Y display coordinate:
      determining whether a cursor speed is less than a predetermined threshold value, and
    while the cursor speed is less than the predetermined threshold value, obtaining a current coordinate by averaging previous M_coordinate values, wherein M is a pre-defined value, and wherein the coordinate values are derived from the coordinate data from the handheld device.

2. The system of claim 1, wherein displayed coordinates of the screen cursor (X,Y) are determined from the cursor coordinates of a most recent frame $(X_{new}, Y_{new})$ and the cursor coordinates of a previous frame $(X_{old}, Y_{old})$ in the following manner:
  for i=1 to N, where N is a number of sub frames, $X(i-1) = X_{old} + (i/N)*X_{diff}$, where $X_{diff} = X_{new} - X_{old}$ and $Y(i-1) = Y_{old} + (i/N)*Y_{diff}$, where $Y_{diff} = Y_{new} - Y_{old}$, and wherein time between displayed cursor updates is Frametime/N, where the Frametime is less than or equal to a period of time required to update data used to determine the cursor coordinates.

3. The system of claim 1, wherein a desired action on the display is initiated by a user of the handheld device pointing to a specific region while pressing a control key on the handheld device.

4. The system of claim 1, wherein a desired action on the display is initiated by a user orienting the handheld device to a specific angle about its pointing axis while pressing a control key on the handheld device.

5. The system of claim 1, wherein a desired action on the display is initiated by a user changing a distance between the handheld device and the screen while pressing a control key on the handheld device.

6. The system of claim 1, wherein the coordinates of the display cursor are determined by relative changes in a sequence of absolute coordinates and the display cursor's previous coordinates.

7. The system of claim 1, wherein a degree of freedom value of the handheld device is based on both one or more of its absolute coordinates and a previous degree of freedom value.

8. The system of claim 1, wherein the handheld device controls the coordinates of the display cursor, and upon an action taken by a user of the handheld device, the cursor coordinates attain a reduced sensitivity to changes in one or more degrees of freedom of the handheld device.

9. The system of claim 1, wherein the handheld device is caused by an event to adjust one or more of the following settings of the sensor based on an action taken by a user of the handheld device: a) gain; b) exposure; and c) threshold.

10. The system of claim 9, wherein the event is a change in a detected signal level by the handheld device such that the signal level crosses one of a set of pre-defined thresholds.

11. The system of claim 1, wherein one or more beam shaping optical elements is placed on or in proximity to the two or more optical markers, and wherein the beam shaping optical element is configured to modify a pattern of the radiation emitted or reflected by the markers.

12. The system of claim 1, wherein sensitivity of the sensor and optical power of the markers are both caused to modulate such that the sensitivity is high during periods of high marker power and the sensitivity is low during periods of low marker power.

13. The system of claim 1, wherein an optical power of one or more of the markers is caused to modulate such that the modulated marker power is high and then low during consecutive frames of the sensor, and such that markers are identified following each pair of the consecutive frames.

14. The system of claim 1, wherein only image data whose sizes are within a specified range are interpreted by the system as the marker data.

15. The system, comprising:
a handheld device having a pixelated sensor, an optical filter for passing a predetermined frequency band of radiation to the sensor, and a transmitter;
electronic equipment having a display;
at least two spaced-apart markers, each of which are positioned proximate to the display, the markers providing radiation at the frequency band passed by the optical filter, wherein the handband device includes an imaging element that produces an image of the two or more spaced-apart markers on the pixelated sensor; and
a processor coupled to receive image data of the image of the markers on the sensor and to compute coordinate data of the image on the sensor from the image data, the coordinate data requiring less data than the image data, the processor being coupled to the transmitter to transmit the coordinate data to the electronic equipment, wherein the handheld device, whose N pixels are read sequentially from pixel 1 to pixel N, is caused to reverse the order in which the pixels are read so that the pixels are read sequentially from N to 1.

16. The system of claim 1, wherein a second handheld device is added and transmits its coordinate data to the electronic equipment such that the coordinate data is contained in a time slot that is unique to the second handheld device.

17. The system of claim 1, wherein at least one of the two or more markers is distinguished from the remaining the two or more markers in a manner that is detectable by the handheld device.

18. The system of claim 17, wherein the distinction of the one or more markers is used to determine a roll angle of the handheld device.

19. The system, comprising:
a handheld device having a pixelated sensor, an optical filter for passing a predetermined frequency band of radiation to the sensor, and a transmitter;
electric equipment having a display;
at least two spaced-apart markers, each of which are positioned proximate to the display, the markers providing radiation at the frequency band passed by the optical filter, wherein the handheld device includes an imaging element that produces an image of the two or more spaces-apart markers on the pixelated sensor; and
a processor coupled to receive image data of the image of the markers on the sensor and to compute coordinate data of the image on the sensor form the image data, the processor being coupled to the transmitter to transmit the coordinate data to the electronic equipment, wherein a roll angle of the handheld device is calculated from the coordinate data of the images of the markers on the sensor such that, if more than one roll angle is consistent with the image coordinates, then the calculated roll angle is chosen to be the one closest to the previous calculated roll angle.

* * * * *